(12) United States Patent
Robinson et al.

(10) Patent No.: US 12,238,177 B1
(45) Date of Patent: Feb. 25, 2025

(54) MID-LINK FORENSIC SYSTEM FOR REMOTE APPLICATION ENVIRONMENT

(71) Applicant: Netskope, Inc., Santa Clara, CA (US)

(72) Inventors: James S. Robinson, Indianapolis, IN (US); Vadon Willis, Nashville, TN (US); John Khotsyphom, St. Louis, MO (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 18/424,701

(22) Filed: Jan. 26, 2024

(51) Int. Cl.
*H04L 67/1396* (2022.01)

(52) U.S. Cl.
CPC ................ *H04L 67/1396* (2022.05)

(58) Field of Classification Search
CPC ........... H04L 12/4633; H04L 41/0894
See application file for complete search history.

(56) References Cited

U.S. PATENT DOCUMENTS

| | | |
|---|---|---|
| 5,440,723 A | 8/1995 | Arnold et al. |
| 6,513,122 B1 | 1/2003 | Magdych et al. |
| 6,622,248 B1 | 9/2003 | Hirai |
| 7,080,408 B1 | 7/2006 | Pak et al. |
| 7,298,864 B2 | 11/2007 | Jones |
| 7,376,719 B1 | 5/2008 | Shafer et al. |
| 7,735,116 B1 | 6/2010 | Gauvin |
| 7,966,654 B2 | 6/2011 | Crawford |
| 8,000,329 B2 | 8/2011 | Fendick et al. |
| 8,296,178 B2 | 10/2012 | Hudis et al. |
| 8,793,151 B2 | 7/2014 | DelZoppo et al. |
| 8,839,417 B1 | 9/2014 | Jordan |
| 9,197,601 B2 | 11/2015 | Pasdar |
| 9,225,734 B1 | 12/2015 | Hastings |
| 9,231,968 B2 | 1/2016 | Fang et al. |

(Continued)

FOREIGN PATENT DOCUMENTS

| | | |
|---|---|---|
| EP | 1063833 A2 | 12/2000 |
| JP | 6518844 | 5/2019 |

OTHER PUBLICATIONS

Khan, Yunus, "An Efficient Cloud Forensic Approach for IaaS, SaaS and PaaS Model", NUST School of Electrical Engineering and Computer Science (SEECS), downloaded on Sep. 1, 2023 from IEEE Xplore, 6 pgs.

(Continued)

*Primary Examiner* — Gil H. Lee
(74) *Attorney, Agent, or Firm* — MUGHAL GAUDRY & FRANKLIN PC

(57) ABSTRACT

The present disclosure provides an electronic inspection method and system comprising user endpoints, end-link servers belonging to a tenant, and a mid-link server. The mid-link server connects the user endpoints with an end-link server through tunnels. The mid-link server models an interaction in the tunnels using a model of an application layer. The mid-link server receives communication from the user endpoints through the tunnels, differentiates between a data object, and stores the data object based on a plurality of policies and context developed. The mid-link analyzes the model and the data object in the tunnels and determines the context according to a policy. The mid-link server performs the electronic inspection between a plurality of end-link servers and a plurality of user endpoints by inspecting the data object from the plurality of tunnels.

20 Claims, 34 Drawing Sheets

(56) References Cited

U.S. PATENT DOCUMENTS

| | | | |
|---|---|---|---|
| 9,280,678 | B2 | 3/2016 | Redberg |
| 9,524,389 | B1 | 12/2016 | Roth |
| 9,811,662 | B2 | 11/2017 | Sharpe et al. |
| 9,998,496 | B2 | 6/2018 | Narayanaswamy et al. |
| 10,084,825 | B1 | 9/2018 | Xu |
| 10,237,282 | B2 | 3/2019 | Nelson et al. |
| 10,334,442 | B2 | 6/2019 | Vaughn et al. |
| 10,382,468 | B2 | 8/2019 | Dods |
| 10,484,334 | B1 | 11/2019 | Lee et al. |
| 10,826,941 | B2 | 11/2020 | Jain et al. |
| 10,862,916 | B2 | 12/2020 | Hittel et al. |
| 11,032,301 | B2 | 6/2021 | Mandrychenko et al. |
| 11,036,856 | B2 | 6/2021 | Graun et al. |
| 11,244,045 | B2 | 2/2022 | Lunsford et al. |
| 11,265,329 | B2 | 3/2022 | Koottayi et al. |
| 11,281,775 | B2 | 3/2022 | Burdett et al. |
| 11,425,169 | B2 | 8/2022 | Narayanaswamy et al. |
| 11,677,788 | B1 | 6/2023 | Badana et al. |
| 11,757,944 | B2 | 9/2023 | Wu et al. |
| 2002/0099666 | A1 | 7/2002 | Dryer et al. |
| 2003/0055994 | A1 | 3/2003 | Herrmann et al. |
| 2003/0063321 | A1 | 4/2003 | Inoue et al. |
| 2003/0172292 | A1 | 9/2003 | Judge |
| 2003/0204632 | A1 | 10/2003 | Willebeek-Lemair et al. |
| 2004/0015719 | A1 | 1/2004 | Lee et al. |
| 2005/0010593 | A1 | 1/2005 | Fellenstein et al. |
| 2005/0271246 | A1 | 12/2005 | Sharma et al. |
| 2006/0156401 | A1 | 7/2006 | Newstadt et al. |
| 2007/0204018 | A1 | 8/2007 | Chandra et al. |
| 2007/0237147 | A1 | 10/2007 | Quinn et al. |
| 2008/0069480 | A1 | 3/2008 | Aarabi et al. |
| 2008/0134332 | A1 | 6/2008 | Keohane et al. |
| 2009/0144818 | A1 | 6/2009 | Kumar et al. |
| 2009/0249470 | A1 | 10/2009 | Litvin et al. |
| 2009/0300351 | A1 | 12/2009 | Lei et al. |
| 2010/0017436 | A1 | 1/2010 | Wolge |
| 2011/0119481 | A1 | 5/2011 | Auradkar et al. |
| 2011/0145594 | A1 | 6/2011 | Jho et al. |
| 2012/0278896 | A1 | 11/2012 | Fang et al. |
| 2013/0159694 | A1 | 6/2013 | Chiueh et al. |
| 2013/0298190 | A1 | 11/2013 | Sikka et al. |
| 2013/0347085 | A1 | 12/2013 | Hawthorn et al. |
| 2014/0013112 | A1 | 1/2014 | Cidon et al. |
| 2014/0068030 | A1 | 3/2014 | Chambers et al. |
| 2014/0068705 | A1 | 3/2014 | Chambers et al. |
| 2014/0259093 | A1 | 9/2014 | Narayanaswamy et al. |
| 2014/0282843 | A1 | 9/2014 | Buruganahalli et al. |
| 2014/0359282 | A1 | 12/2014 | Shikfa et al. |
| 2014/0366079 | A1 | 12/2014 | Pasdar |
| 2015/0100357 | A1 | 4/2015 | Seese et al. |
| 2016/0323318 | A1 | 11/2016 | Terrill et al. |
| 2016/0350145 | A1 | 12/2016 | Botzer et al. |
| 2017/0026395 | A1 | 1/2017 | Mumcuoglu et al. |
| 2017/0064005 | A1 | 3/2017 | Lee |
| 2017/0093917 | A1 | 3/2017 | Chandra et al. |
| 2017/0250951 | A1 | 8/2017 | Wang et al. |
| 2020/0050686 | A1 | 2/2020 | Kamalapuram et al. |
| 2020/0076835 | A1* | 3/2020 | Ladnai ................ H04L 63/0263 |
| 2021/0136133 | A1 | 5/2021 | Ithal et al. |
| 2022/0138322 | A1 | 5/2022 | Sharma et al. |
| 2022/0188690 | A1* | 6/2022 | Rawat .................... G06V 10/82 |
| 2022/0239681 | A1* | 7/2022 | Newman ............ G06F 11/3006 |
| 2023/0132478 | A1 | 5/2023 | Robinson et al. |
| 2023/0156013 | A1 | 5/2023 | Armada |
| 2023/0216766 | A1* | 7/2023 | Lukens ............... H04L 43/0888 709/224 |

OTHER PUBLICATIONS

Kumari, Noble et al., "A Novel Framework For Multi Source Based Cloud Forensic", Proceedings of the Sixth International Conference on Computing Methodologies and Communication (ICCMC 2022)IEEE Xplore Part No. CFP22K25-ART; ISBN: 978-1-6654-1028-1, pp. 1-7.

Manral, Bharat et al., "A Systematic Survey on Cloud Forensics Challenges, Solutions, and Future Directions", ACM Computing Surveys, Nov. 2019, vol. 52, No. 6, Article 124, pp. 124-124:38.

Masmoudi, Fatma et al., "From Event to Evidence: An Approach for multi-tenant cloud services' accountability", The 31st IEEE International Conference on Advanced Information Networking and Applications, IEE Computer Society, Mar. 2017, Taipei, Taiwan, pp. 1082-1089.

Park, Jun-Hak et al., "A Study on Cloud Forensics and Challenges in SaaS Application Environment", 2016 IEEE 18th International Conference on High Performance Computing and Communications; IEEE 14th InternationalConference on Smart City; IEEE 2nd International Conference on Data Science and Systems, pp. 734-740.

Pichan, Ameer A et al., "Digital Forensics Investigation Frameworks for Cloud Computing and Internet of Things", Faculty of Science and Engineering School of Electrical Engineering, Computing and Mathematical Sciences, Presented for the Degree of Doctor of Philosophy of Curtin University, Jun. 2022, pp. iii-xxiii and 1-252.

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

Huckaby, Jeff Ending Clear Text Protocols,' Rackaid.com, Dec. 9, 2008, 3 pgs.

Nevvton, Harry "fabric," Newton's Telecom Dictionary, 30th Updated, Expanded, Anniversary Edition, 2016, 3 pgs.

Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.

Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.

McCullagh, Declan, "How safe is instant messaging? A security and privacy survey," CNET, Jun. 9, 2008, 14 pgs.

Beck et al. "IBM and Cisco: Together for a World Class Data Center," IBM Redbooks, Jul. 2013, 654 pgs.

Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54.

Zetter, Kim, "Revealed: The Internet's Biggest Security Hole," Wired, Aug. 26, 2008, 13 pgs.

Adya et al., 'Farsite: Federated, available, and reliable storage for an incompletely trusted environment, SIGOPS Oper. Syst. Rev. 36, SI, Dec. 2002, pp. 1-14.

Agrawal et al., "Order preserving encryption for numeric data," In Proceedings of the 2004 ACM SIGMOD international conference on Management of data, Jun. 2004, pp. 563-574.

Balakrishnan et al., "A layered naming architecture for the Internet," ACM SIGCOMM Computer Communication Review, 34(4), 2004, pp. 343-352.

Downing et al. , Naming Dictionary of Computer and Internet Terms, (11th Ed.) Barron's, 2013, 6 pgs.

Downing et al., Dictionary of Computer and Internet Terms, (10th Ed.) Barron's, 2009, 4 pgs.

Zoho Mail, "Email Protocols: What they are & their different types," 2006, 7 pgs. available at https://www.zoho.com/mail/glossary/email-protocols.html#:~: text=mode of communication.—,What are the different email protocols%3F, and also has defined functions.

Niit, Special Edition Using Storage Area Networks, Que, 2002, 6 pgs.

Chapple, Mike, "Firewall redundancy: Deployment scenarios and benefits," Tech Target, 2005, 5 pgs. available at https://www.techtarget.com/searchsecurity/tip/Firewall-redundancy-Deployment-scenarios-and-benefits?%20Offer=abt_pubpro_Al-Insider.

(56) References Cited

OTHER PUBLICATIONS

Fortinet, FortiGate—3600 User Manual (vol. 1 , Version 2.50 MR2) Sep. 5, 2003, 329 pgs.
Fortinet, FortiGate SOHO and SMB Configuration Example, (Version 3.0 MR5), Aug. 24, 2007, 54 pgs.
Fortinet, FortiSandbox—Administration Guide, (Version 2.3.2), Nov. 9, 2016, 191 pgs.
Fortinet, FortiSandbox Administration Guide, (Version 4.2.4) Jun. 12, 2023, 245 pgs. available at https://fortinetweb. s3.amazonaws.com/docs.fortinet.com/v2/attachments/fba32b46-b7c0-11ed-8e6d-fa163e15d75b/FortiSandbox-4.2.4- Administration_Guide.pdf.
Fortinet,FortiOS- Administration Guide, (Versions 6.4.0), Jun. 3, 2021, 1638 pgs.
Heady et al., "The Architecture of a Network Level Intrusion Detection System," University of New Mexico, Aug. 15, 1990, 21 pgs.
Kephart et al., "Fighting Computer Viruses," Scientific American (vol. 277, No. 5) Nov. 1997, pp. 88-93.
Wang, L., Chapter 5: Cooperative Security in D2D Communications, "Physical Layer Security in Wireless Cooperative Networks," 41 pgs. first online on Sep. 1, 2017 at https://link.springer.com/chapter/% 2010.1007/978-3-319-61863-0_5.
Lee et al., "A Data Mining Framework for Building Intrusion Detection Models," Columbia University, n.d. 13 pgs.
Merriam-Webster Dictionary, 2004, 5 pgs.
Microsoft Computer Dictionary, (5th Ed.), Microsoft Press, 2002, 8 pgs.
Microsoft Computer Dictionary, (4th Ed.), Microsoft Press, 1999, 5 pgs.
Mika et al. "Metadata Statistics for a Large Web Corpus," LDOW2012, Apr. 16, 2012, 6 pgs.
Oxford Dictionary of Computing (6th Ed.), 2008, 5 pgs.
Paxson, Vern, "Bro: a System for Detecting Network Intruders in Real-Time," Proceedings of the 7th USENIX Security Symposium, Jan. 1998, 22 pgs.
Fortinet Inc., U.S. Appl. No. 62/503,252, "Building a Cooperative Security Fabric of Hierarchically Interconnected Network Security Devices." n.d., 87 pgs.
Song et al., "Practical techniques for searches on encrypted data," In Proceeding 2000 IEEE symposium on security and privacy. S&P. 2000, May 2000, pp. 44-55.
Dean, Tamara, Guide to Telecommunications Technology, Course Technology, 2003, 5 pgs,.
U.S. Appl. No. 60/520,577, "Device, System, and Method for Defending a Computer Network," Nov. 17, 2003, 21 pgs.
U.S. Appl. No. 60/552,457, "Fortinet Security Update Technology," Mar. 2004, 6 pgs.
Tittel, Ed, Unified Threat Management For Dummies, John Wiley & Sons, Inc., 2012, 76 pgs.
Fortinet, FortiOS Handbook: UTM Guide (Version 2), Oct. 15, 2010, 188 pgs.
Full Definition of Security, Wayback Machine Archive of Merriam-Webster on Nov. 17, 2016, 1 pg.
Definition of Cooperative, Wayback Machine Archive of Merriam-Webster on Nov. 26, 2016, 1 pg.
Pfaffenberger, Bryan, Webster's New World Computer Dictionary, (10th Ed.), 2003, 5 pgs.

\* cited by examiner

1000

Event Log Entry

```
[
{
"id" : "906782",
"src_country" : "USA",
"src_zipcode" : "94301",
"src_region" : "Washington D.C",
"src_ip" : "28.101.322.761",
"user_login" : "abc@tenant.netskope.com",
"app" : "salesforce",
"activity" : "upload",
"org" : "tenant.netskope.com",
"numbytes" : "705412",
"timestamp" : "15894534784",
"url" : "abc11.salesforce.com/tenant/status244",
}
]
```

MID-LINK FORENSIC SYSTEM FOR REMOTE APPLICATION ENVIRONMENT

BACKGROUND

This disclosure relates in general to internet security systems and, but not by way of limitation, to user access control amongst other things.

Generally, cloud services are increasingly used for various business functions, including customer relationship management (CRM) software, accounting, security, etc. As businesses rely on the cloud services for data creation, editing, and storage, new challenges arise, such as the risk of users losing sensitive corporate data. Also, due to easy Internet access from multiple devices, information of enterprises is exposed to unsecured networks. Thus, the enterprises are prone to theft or hacking and potential data leak with external parties. As the number of cloud services grows, data can leak in several ways in enterprise, such as unauthorized file attachments, cloud-based storage, or improper collaboration with external parties. Moreover, the data leaks can lead to business losses, internal investigations, or reputation management, etc.

Further, enterprises want to control user activities on computing devices that are used for work. However, traditional information technology (IT) and network architecture approaches offer limited control over data protection. The chaotic spread of bring your own device (BYOD) policies makes locking down of the computing devices problematic. Also, data loss prevention (DLP) solutions currently available in the market are exposed to evolving threats. Cloud storage, for example, poses a significant risk to the enterprises, as continuous synchronization occurs between endpoints and the cloud services without oversight. Cloud-based computing on BYOD devices creates issues that conventional security systems find difficult to handle.

SUMMARY

The present disclosure provides an electronic inspection method and system comprising user endpoints, end-link servers belonging to a tenant, and a mid-link server. The mid-link server connects the user endpoints with an end-link server through the tunnels. The mid-link server models an interaction in the tunnels using a model of an application layer. The mid-link server receives a communication from the user endpoints through the tunnels, differentiates between a data object, and stores the data object based on a plurality of policies and context developed. The mid-link analyzes the model and the data object in the tunnels and determines the context according to a policy. The mid-link server performs electronic inspection between a plurality of end-link servers and a plurality of user endpoints by inspecting the data object from the plurality of tunnels.

In an embodiment, the present disclosure provides a method for the electronic inspection between a plurality of end-link servers of a plurality of tenants and a plurality of user endpoints by a mid-link server. In one step, the mid-link server is configured between an interaction of the plurality of user endpoints and the plurality of end-link servers. The mid-link server receives a communication at the mid-link server passing between the plurality of end-link servers and the plurality of user endpoints using a plurality of tunnels. Each of the plurality of tenants includes the plurality of user endpoints, and the mid-link server is configured between the plurality of user endpoints and the plurality of end-link servers. The mid-link server models a plurality of interactions in the plurality of tunnels using a model of an application layer hosted by the mid-link server. The mid-link server differentiates between a data object within the model of the application layer and analyzes the model and the data object within the plurality of tunnels based on a plurality of policies. The mid-link server determines a context that is a function of the data object and the model. The mid-link server triggers a policy of the plurality of policies based on the context; and stores the data object and the plurality of interactions upon the triggering of the policy of the plurality of policies.

In another embodiment, a system for electronic inspection is defined between the plurality of end-link servers of the plurality of tenants and the plurality of user endpoints with the mid-link server. A tunnel between the user endpoint and the mid-link server and another tunnel between the end-link server and the mid-link server. The tunnel is configured to transmit traffic from the user endpoint and the end-link server to the mid-link server. The mid-link server receives a communication by passing between the plurality of end-link servers and the plurality of user endpoints using a plurality of tunnels. Each of the plurality of tenants includes the plurality of user endpoints and the mid-link server is positioned between an interaction of the plurality of user endpoints and the plurality of end-link servers. The mid-link server models a plurality of interactions in the plurality of tunnels using a model of an application layer hosted by the mid-link server. The mid-link server differentiates between a data object within the model of the application layer and analyzes the model and the data object within the plurality of tunnels according to a plurality of policies. The mid-link server determines a context that is a function of the data object and the model. The mid-link server triggers a policy of the plurality of policies based on the context; and storing the data object and the plurality of interactions upon the triggering of the policy of the plurality of policies.

In yet another embodiment, a computer-readable media is discussed having computer-executable instructions embodied thereon that when executed by one or more processors, facilitate a method for an electronic inspection system between a plurality of end-link servers of a plurality of tenants and a plurality of user endpoints by a mid-link server. The mid-link server receives a communication by passing between the plurality of end-link servers and the plurality of user endpoints using a plurality of tunnels. Each of the plurality of tenants includes the plurality of user endpoints and the mid-link server is positioned between an interaction of the plurality of user endpoints and the plurality of end-link servers. The mid-link server models a plurality of interactions in the plurality of tunnels using a model of an application layer hosted by the mid-link server. The mid-link server differentiates between a data object within the model of the application layer and analyzes the model and the data object within the plurality of tunnels according to a plurality of policies. The mid-link server determines a context that is a function of the data object and the model. The mid-link server triggers a policy of the plurality of policies based on the context; and storing the data object and the plurality of interactions upon the triggering of the policy of the plurality of policies.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment only, and is not intended to limit the scope, applicability, or configuration of the disclosure. The ensuing description on the preferred exemplary embodiments will provide those skilled in the art with an enabling description for implementing a preferred exemplary embodiment. It is understood that various changes may be made in the function and arrangement of elements without departing from the spirit and scope as set forth in the appended claims.

Figure 1:
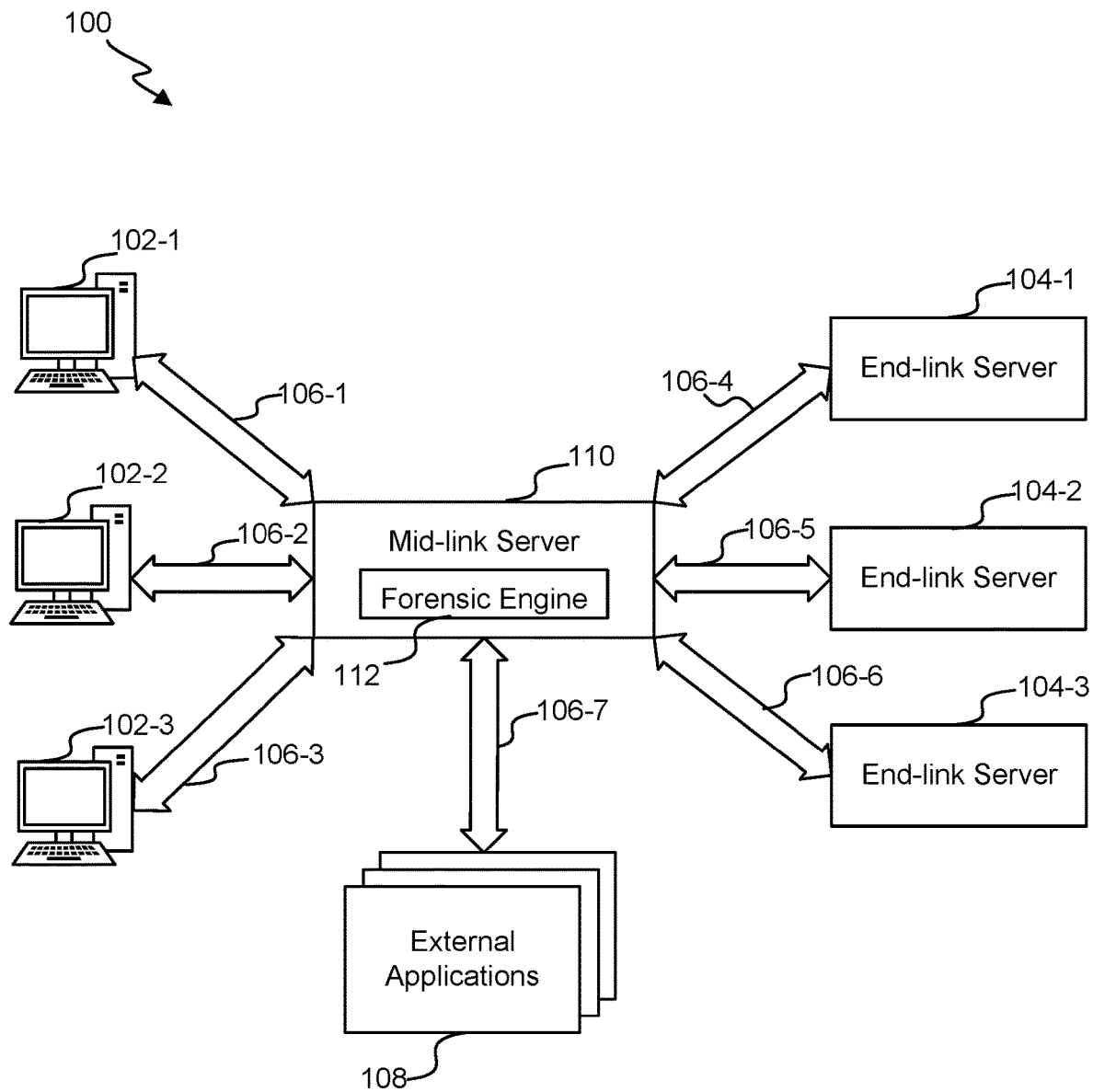
FIG. 1 shows a block diagram of an electronic inspection system for providing a multi-tenant security and logging.

Referring first to FIG. 1, a block diagram of an electronic inspection system 100 for providing a multi-tenant security and logging in an embodiment is shown. The electronic inspection system 100 includes user endpoints 102 (102-1, 102-2, 102-3), end-link servers 104 (104-1, 104-2, 104-3), tunnels 106 (106-1, 106-2, 106-3, 106-4, 106-5, 106-6, 106-7), external applications 108, and a forensic engine 112 configured in a mid-link server 110. A user endpoint 102 is a user device or a client device such as smartphone, tablet, a personal computer (PC), an Internet of Things (IoT) device, or any other computing device designed to communicate with an end-link server 104 via encryption links. The user endpoint 102 consists of any popular operating system (OS) that runs local and remote software applications, for example a Software as a Service (SaaS) application can run using a local web browser. The user endpoint 102 accesses remote content and processing within an enterprise (i.e., behind the firewall) across public and/or private networks.

The end-link servers 104 are software solutions that are SaaS applications or local applications, which are hosted and maintained by third-party vendors and provided to users over a network such as the Internet. The end-link server 104 includes content sites such as websites, streaming content, application websites etc., in order to provide different services to the user endpoint 102. The end-link server 104 also permits the user endpoint 102 to upload and download content from the content sites.

Through the tunnels 106, the user endpoint 102 routes some interaction to the mid-link server 110 that inspects a controlled software environment for the user endpoint 102 to interact with the end-link server 104. The traffic in the tunnel 106 includes information of websites, web applications, streaming, browsing, web activities, activities performed on the mobile application or in-app activities, online transactions, and other activities. Communications in the tunnels 106 occur over a variety of networks, e.g., private networks, a virtual private network (VPN), a multiprotocol label switching (MPLS) circuit, or Internet via protocols. Examples of protocols include EDGE, 3G, long-term evolution (LTE), Wi-Fi, and WiMAX, and may use approximate application programming interfaces (APIs) and data interchange formats.

Various data interchange formats are applicable e.g., representational state transfer (REST), JavaScript object notation (JSON), extensible markup language (XML) etc. Additionally, a variety of authorization techniques, such as username/password, open authorization (OAuth), Kerberos, SecureID, digital certificates, and more, are used to secure communications through tunnels 106. At the end of the electronic inspection process, the mid-link server 110 teardown the tunnels 106 if they are no longer in use. If a new communication is received, the tunnel 106 is established again by the mid-link server 110.

The mid-link server 110 for the electronic inspection system 100 resides as a "man-in-the-middle" and intentionally takes over some or all of the processing, application execution, and/or the content sites at the end-link server 104 and the user endpoint 102 interaction. The mid-link server 110 stores a data object, performs an electronic inspection, provides incident recovery process, and responds to any threat/incident via the forensic engine 112. The forensic engine 112 connected with the end-link server 104 can be leveraged to scan the logs and configuration of the end-link server 104 to see if there were any detected issues, correlations, and/or analytics from the threat and other engines.

The mid-link server 110 accesses different types of data depending upon the kind of security threat or policy breach. Data of an application layer in the mid-link server 110 is referred as "data objects" from here on. The data objects are formulated by activities of the user endpoint 102 and the end-link server 104, and from traffic in the tunnels 106. The data objects comprise of data that is generated by application running on the end-link server 104, accessed from a storage or a database, exchange through a protocol in the tunnels 106, or generated and consumed by the user endpoints 102 and tenants connected with the mid-link server 110. The data objects include files, folders, browser displays, video streams, water marks, and state captures at the user endpoint 102 and/or the end-link server 104.

The forensic engine 112 provides detection, inspection, and recovery against a threat/incident on the end-link server 104. The forensic engine 112 further provides API visibility and a graphical user interface (GUI) for a forensic investigator to perform electronic inspection of an incident itself. The end-link server 104 is inspected by the mid-link server 110 for a policy-controlled experience. For example, the content sites at the end-link server 104 may have specific applications disabled, filtered, or modified by the mid-link server 110. In such a case, the user endpoint 102 behaves differently than if it were to directly connect to the content sites of the end-link server 104. For example, the policy may specify access to a website based on the risk determined by the policy breach.

The mid-link server 110 also exports its data in raw or processed form to the external applications 108. The external applications 108 are independently operated and maintained by the enterprise and are available in any enterprise. The purpose of exporting the data to the external applications 108 is to enable the user to manage and investigate the data on its own and to make a backup log or permanent storage for the mid-link server 110.

Figure 2:
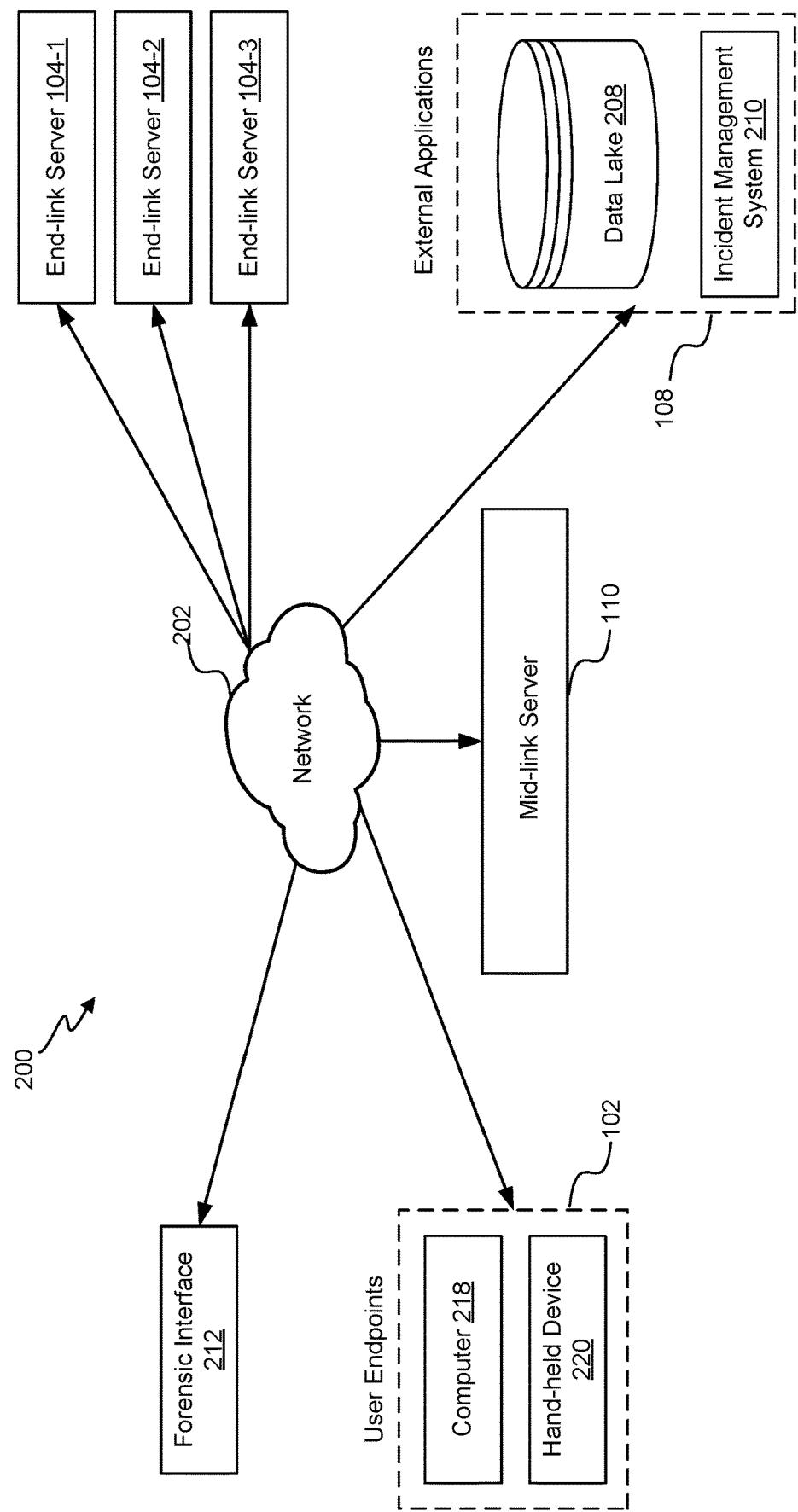
FIG. 2 shows a block diagram of an embodiment of the electronic inspection system for inspection of an end-link server over a network.

Referring next to FIG. 2, a block diagram of an embodiment of the electronic inspection system 100 for inspection of the end-link server 104 over a network 202 is shown. The electronic inspection system 100 includes the network 202 that is either public or private, a forensic interface 212, the user endpoints 102 (e.g., a computer 218, a handheld device 220), end-link servers 104 (104-1, 104-2, 104-3), the mid-link server 110, and the external applications 108. The external applications 108 are independently managed by the enterprise and includes a data lake 208 and an incident management system 210.

The data lake 208 is a centralized and flexible repository that allows enterprises to store large amounts of structured and unstructured data of any size. Unlike traditional databases that require structured data with predefined schemas, the data lake 208 contains raw data of all types, including text, images, states, videos, etc. The data lakes 208 are commonly used for advanced analytics, machine learning, and data mining. The data lakes 208 often integrate data catalogs or metadata management system to manage and store data independently.

The incident management system 210 is an independent application used by enterprises to identify, respond to, and resolve incidents effectively. The incident management system 210 maintains the safety of users, protect assets, and ensure business continuity. Features of the incident management system 210 include incident identification, classification, response planning, response coordination, and communication. The incident management system 210 further includes incident tracking, documentation and reporting, incident resolution and recovery, post-analysis incidents, training, and operating the system to handle more such incidents.

The network 202 is any internet network providing a connection between the user endpoints 102, the end-link servers 104, the forensic interface 212 and the mid-link server 110. The forensic investigator analyzes the security of the application. The forensic investigator can be any third party software or personnel hired by the enterprise to examine the incident or status of security in the application. The artifacts collected by the mid-link server 110 are exported to the external applications 108 if the forensic investigator wants, for further analysis in the incident management system 210 and/or storing in the data lake 208.

The mid-link server 110 supports multi-tenancy so that functionality and data of different enterprises are isolated while running on the same infrastructure. For example, the user endpoint 102 can be connected to a number of the end-link servers 104 that have many tenants of its own kept separate by the mid-link server 110. Even though tenants share resources with other tenants outside their enterprise, different tenants are not aware of each other, and their data is kept separate.

The mid-link server 110 also provides visibility and access of a threat vector across multiple tenants that are facing a risk of getting compromised. The threat vector represents a known threat that has occurred at the end-link server 104 of some other tenant. The mid-link server 110 provides the information and precautionary measures to the tenants, so the tenants prepare themselves against any future encounter with the threat vector. The details of the visibility of known threats are explained in later sections.

The mid-link server 110 creates a model of the application layer that records the data objects and creates a context. Through the policies and the context, the interactions and the data objects are modelled and stored using the model of the application layer. The modelling of data objects, interactions, and browser data includes rendering using the model of the application layer at the mid-link server 110.

The modelling provides security and visualization of the interactions and the data objects for the model of the application layer. The interactions are created from the communications between the user endpoint 102 and the end-link server 104. Notice that the model of the application layer provides an instantaneous depiction or view of the interactions between the user endpoint 102 and the end-link server 104. On the other hand, the context pulls additional information of the tenants and establishes relationships between the tenants and the data objects in the tunnels 106.

Figure 3:
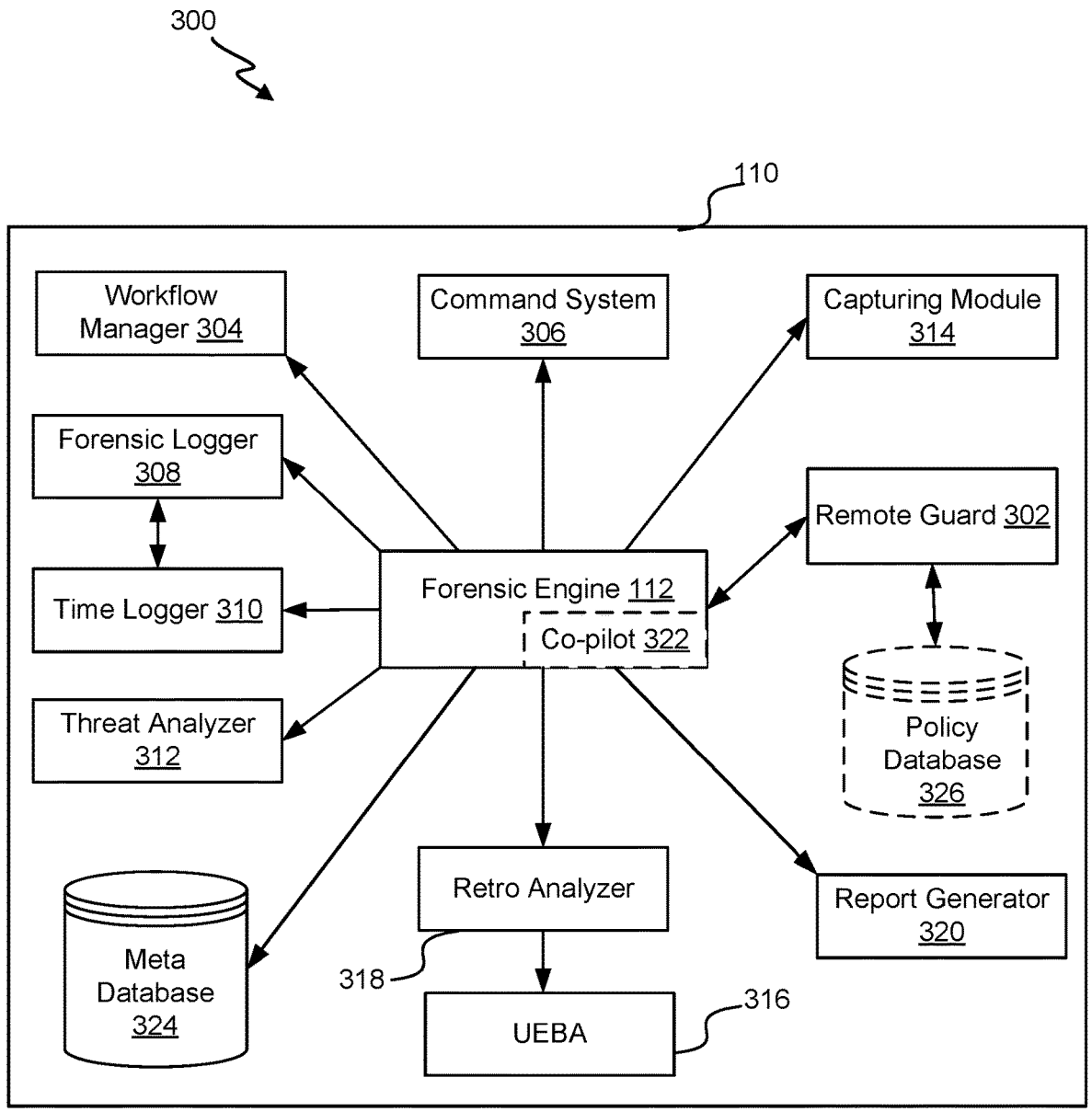
FIG. 3 represents a block diagram of an embodiment of a mid-link server that performs electronic inspection of the end-link server.

Referring next to FIG. 3, a block diagram 300 of an embodiment of the mid-link server 110 that performs the electronic inspection of the end-link server 104 is shown. The mid-link server 110 includes the forensic engine 112 with a co-pilot 322 configured within. The mid-link server 110 includes a remote guard 302, a workflow manager 304, a command system 306, a forensic logger 308, and a threat analyzer 312. The mid-link server 110 further includes a capturing module 314, a user entity behavior analyzer (UEBA) 316, a retro analyzer 318, a report generator 320, and a meta database 324.

The remote guard 302 is configured within the mid-link server 110, to aid the electronic inspection in case of event escalation. The remote guard 302 enables the mid-link server 110 to identify and manage the use of the end-link server 104, regardless of whether the end-link servers 104 are managed or unmanaged. The remote guard 302 prevents sensitive data from being exfiltrated from the tunnels 106 by risky insiders or malicious cybercriminals and stops malicious insiders from copying sensitive content from business email to personal email accounts. The use of the remote guard 302 empowers the mid-link server 110 by providing graph-based detections and visualizations to expose hidden risks and security gaps. When risky configurations or policy drifts are detected, the remote guard 302 generates a flag and remediation instructions.

The workflow manager 304 designs and ensures the smooth execution of events or incidents in various stages following an incident response (IR) process. The IR process comprises of four stages, namely: detection and reporting, triage and analysis, containment and neutralization and post-incident activity. The command system 306 enables the commands that are scripts of tasks for inspection of the end-link server 104. The command system 306 locks down or makes applications receive operations for the incident. The forensic logger 308 comprises of a time logger 310 and other loggers. The forensic logger 308 tracks specific actions and records them for a timeline. The threat analyzer 312 is an engine that takes data and input of the users and systems from the meta database 324, a policy database 326, and other modules, for inspection and to raise a threat flag. The capturing module 314 captures multiple types of states, based on the policies, at different instances to monitor the activity of the user endpoint 102 or the tenant.

The UEBA 316 uses machine learning algorithms to create a baseline of user behavior patterns and assign scores to the user endpoint 102. The UEBA 316 is integrated within the retro analyzer 318 that scans history of user activities and assigns scores to the end-link servers 104, the user endpoints 102, and the data objects present within the tunnels 106. The report generator 320 creates reports based on actions taken during inspection process, to aid the enterprise or the forensic investigator. Similarly, the co-pilot 322 employs visualization tools and uses artificial intelligence to guide and recommend some actions to the forensic investigator at the forensic interface 212. The meta database 324 stores scores of the data objects, the user endpoints 102, the tenants and the end-link servers 104. The meta database 324 stores unique markers of the data objects, generated by the threat analyzer 312, and states of activities on the application layer model, captured by the capturing module 314. The policy database 326 stores policies and rules of the user endpoints 102 and tenants, user identities and data of the enterprise etc. The policy database 326 of the remote guard 302 helps in policy enforcement at the mid-link server 110. In some implementations, the policy database 326 can be relational database management systems (RDBMSs), object-oriented database management systems (OODBMSs), distributed file systems (DFS), no-schema database, or any other data storing systems or computing devices.

Figure 4:
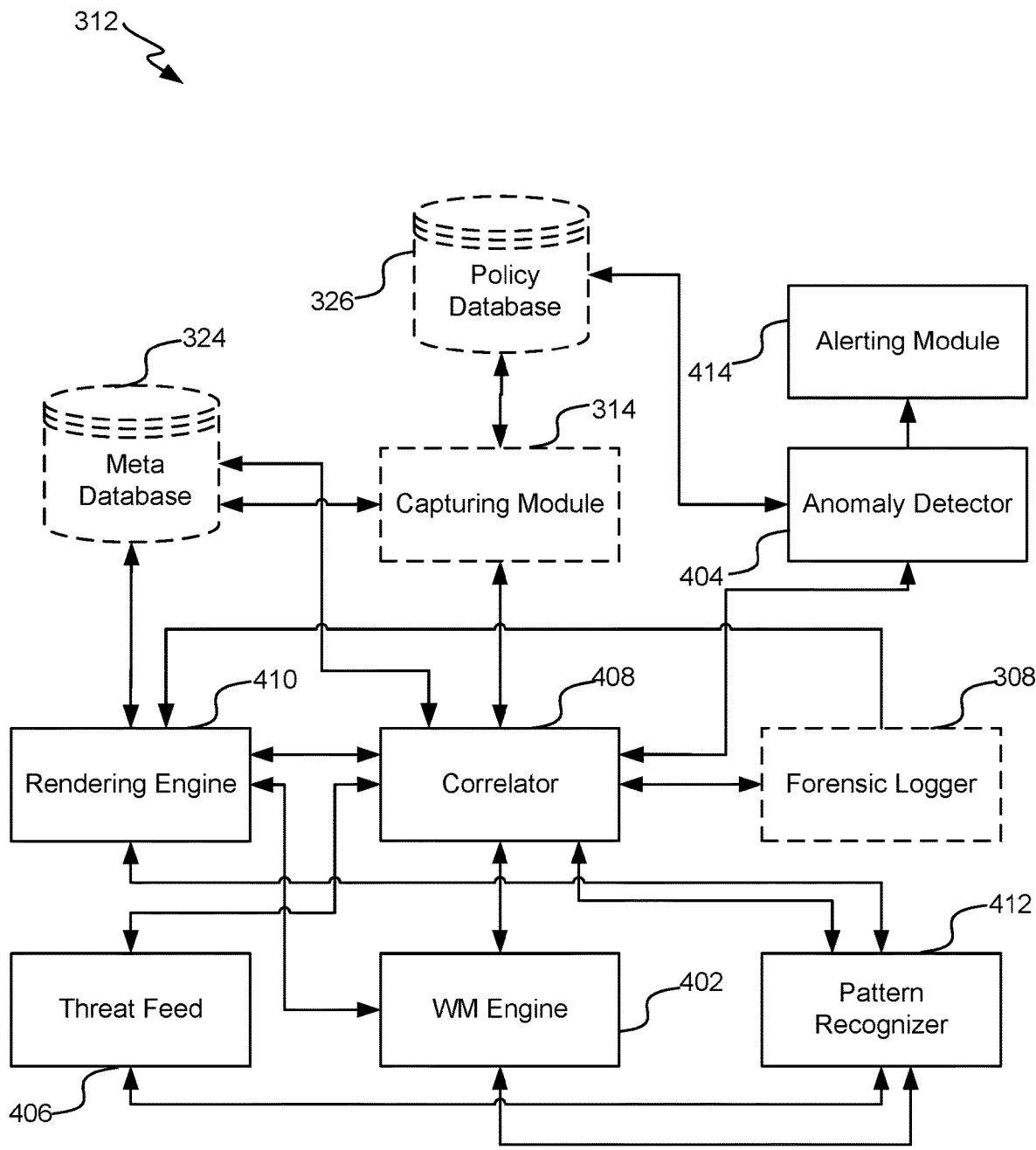
FIG. 4 shows a block diagram of a threat analyzer employed at the mid-link server to detect security threats and incidents in the end-link server.

Referring next to FIG. 4, a block diagram of an embodiment of the threat analyzer 312 of the mid-link server 110 and its mechanism of detecting, correlating, and analyzing the threat is shown. The threat analyzer 312 includes a water marking (WM) engine 402, an anomaly detector 404, a threat feed 406, a correlator 408, a rendering engine 410, a pattern recognizer 412, and an alerting module 414. The threat analyzer 312 interacts with the capturing module 314, the meta database 324, the policy database 326, and the forensic logger 308 of the mid-link server 110 to analyze and alert the user regarding an incoming threat.

The threat analyzer 312 of the mid-link server 110 is the main component used to investigate and analyze security incidents that have occurred within the end-link server 104. The primary function of the threat analyzer 312 is to gather relevant data objects, process the data objects, and provide insights into the incidents. The threat analyzer 312 collects the data objects from various sources within the end-link server 104 like the forensic logger 308 and the meta database 324. The sources of collecting the data objects include a risk score, a log, user activity records, network traffic, and system configuration data. Take an example where a user calls after their SaaS application on the end-link server 104 has been compromised or they think it has. The organization can leverage the forensic engine 112 connected with the end-link server 104 to scan the logs and configuration of the SaaS application and see if there were any detected issues from the threat and other engines.

The rendering engine 410 of the threat analyzer 312 in the forensic engine 112 models multiple interactions and data objects from the tunnels 106. The rendering engine 410 models browser data for the application layer model by decrypting the website security protocols. The rendering engine 410 is connected to the WM engine 402 along with the pattern recognizer 412 and the correlator 408 of the threat analyzer 312. The rendering engine 410 also takes input from the meta database 324 and the forensic logger 308 of the mid-link server 110.

The WM engine 402 refers to a "watermarking engine" that embeds a unique marker in the data objects being modelled. The WM engine 402 renders the data objects that are sensitive as instructed by the policy. The unique markers created by the WM engine 402 are stored in the meta database 324 corresponding to the ID of each data object and the user who accesses it. The WM engine 402 is connected to the rendering engine 410, the correlator 408, and the pattern recognizer 412. In this way when the data object is leaked to the network 202, the threat analyzer 312 matches the unique marker of the leaked data object with the stored unique markers. The threat analyzer 312 retrieves the ID of the user endpoint 102 who has access to that data object. The mid-link server 110 takes further steps once the culprit is determined.

The correlator 408 determines the data from the end-link servers 104, the user endpoints 102, the tenants and the tunnels 106 to establish relationships and the context. The context provides intelligence to identify and differentiate data objects from the tunnels 106 in the correlator 408 with respect to the information and activities of each of the user endpoints 102. For instance, the correlator 408 can link user login data with the data object access logs to determine if a user's actions are suspicious.

The context includes connection-specific information and builds relationship of the data objects with the user endpoints 102 and the tenants. The context further consists of information that is not categorized as a data object, such as information from the interactions. For example, in the case where the tenants are communicating over a network and information is being shared through a shared screen, the shared screen provides the context. The shared screen or content of the shared screen cannot be stored or analyzed as the data object. Similarly, the data generated or consumed by the interactions of the tenants across a multi-tenant environment is used as the context. The context provides a memory or stores the additional information in the interactions of tenants over a period of time. By using the context, the storing of the data objects in the forensic logger 308 becomes less frequent and lower memory is utilized. For example, a file that is present at various locations in the end-link server 104 but remains un-edited is now being saved once by the mid-link server 110. Similarly, the data object that is being edited by multiple user endpoints 102 will be stored differently based on the context extracted from the tunnels 106.

The anomaly detector 404 looks over the role and rules-based policy implementation. The main function of the anomaly detector 404 is to detect breach in policies. This involves identifying any activity like login times, multiple failed login attempts, or unauthorized access to sensitive data that is against the defined policies. It compares incoming data with a database of known attack signatures to identify common attack vectors.

The threat analyzer 312 incorporates the threat feed 406, that is an intelligence feed formed by utilizing a pattern recognizer 412. The threat feed 406 has the information of the known threats that have occurred at different tenants of the end-link server 104. The threat feed 406 uses this information to create the threat vector. The Pattern recognizer 412 is a machine learning module, to recognize the known threats which provide real-time information about emerging threats and known malicious actors. The threat feed 406 provides transparency of the threat information across the end-link server 104 in different tenants facing a risk of getting compromised to combat the same threat timely. This integration allows for more accurate threat detection and identification. For example, Zoom™ is a tenant of the end-link server 104 and is attacked by malware. The threat feed 406 takes the information and attributes of the attack and the pattern recognizer 412 uses machine learning to create the threat vector of the attack. The threat vector is then communicated across the tenants by the mid-link server 110. The threat vector alerts other tenants about the known threat lurching over the network 202. In this way, the other tenants e.g., LinkedIn™ will be better prepared to fight that attack in future.

The alerting module 414 generates threat flags and notifications when it detects a potential security incident or a suspicious activity. The threat flags initiate the action that provides remedy for a breach and are sent to security analysts or administrators for further investigation. The threat analyzer 312 ensures that the relevant data is preserved for analysis purposes through the meta database 324. For example, the threat analyzer 312 signals the capturing module 314 that when prompted, captures the state of the interaction or the user device at the time of the incident. The meta database 324 stored different kinds of objects such as memory dumps, a type of threat, states of the data objects, the interactions, network traffic captures, and the artifacts.

Figure 5:
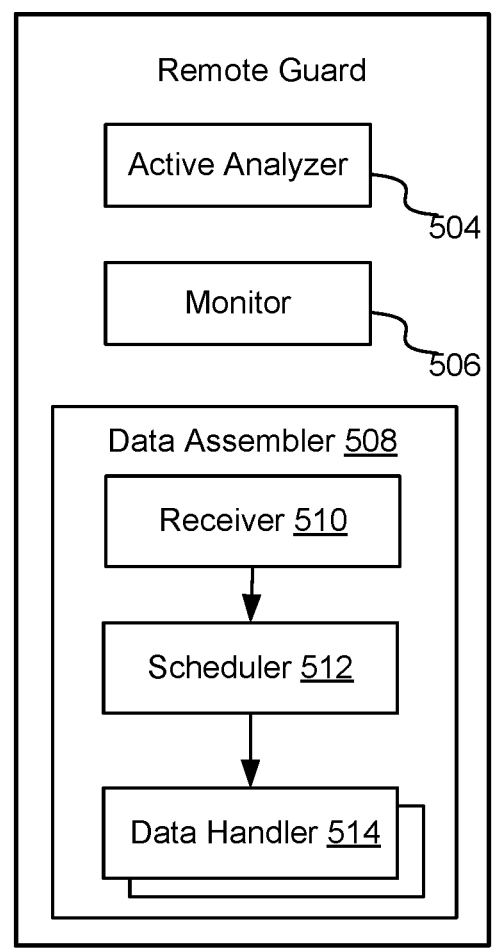
FIG. 5 shows a block diagram of a remote guard of the mid-link server.

Referring next to FIG. 5, a block diagram of the remote guard 302 of the mid-link server 110 is shown. The Remote guard 302-1 is an already existing SaaS Security Posture Management (SSPM) application integrated with the forensic engine 112, or any other cloud posture management application. The remote guard 302-1 continuously checks security posture by comparing the end-link server 104 settings with security policies and industry benchmarks such as national institute of standards and technology (NIST), international organization of standardization (ISO) and more.

When risky configurations or policy drift are detected, the remote guard 302-1 generates alerts and remediation instructions. The remote guard 302-1 uses predefined security and compliance rules across industry benchmarks and standards, enables rapid deployment of security and compliance initiatives at the end-link server 104. The remote guard 302-1 supports graph-based detections and visualizations support cross-application rules that stitch together the context between the end-link servers 104. The remote guard 302-1 further provides visibility into connected and third-party services to expose and mitigate additional risk and defines custom rules and policies to fit specific needs of some enterprise. The third-party services include security service app firewall that controls input, output, and access from, to, or by an application, by monitoring and potentially blocking the input, output, or system service calls that do not meet the configured security services policy.

Many possible third-party services can be selected by the tenants for processing data flows of their users. The services selected for the tenant are referred to in the service chain for the tenant. A single tenant can have multiple service chains configured for different types of data packets and service chains can be reconfigured as the needs of a tenant evolve. Third-party services also include an IP network address translation (NAT). NAT can remap one IP address space into another by modifying network address information in the IP header of packets while they are in transit across a traffic routing device.

A comprehensive set of APIs enables easy integration into existing security and automation workflows to prevent business disruption, and unified view of flags and events from across the network 202. The Remote guard 302-1 includes an active analyzer 504, a monitor 506, and a data assembler 508. The data assembler 508 includes a receiver 510, a scheduler 512, and a data handler 514.

The remote guard 302-1 includes the active analyzer 504 and the monitor 506 to identify, analyze and assemble the user endpoints 102 and the related set of policies. The data assembler 508 receives notifications of user events from the end-link server 104 at the receiver 510, on behalf of the user endpoint 102, or the administrator of the instance or account. The end-link servers 104 are also integrated with bots or scripts which generate updates to the objects in the remote applications via API calls. In an example, a sync application or download bot generates many potential API call events, such as 10,000 operations in one sequence, which produces a series of operations for a single user within the enterprise. The single queue leads to delays for the light-demand users, due to a single heavy-demand user. The Data assembler 508 receives these updates as notifications.

The receiver 510 acquires and evaluates the pushed notifications which trigger compliance checking of users and identification of power users. The receiver 510 sends notifications to the scheduler 512 which schedules processing to the data handler 514. The data handler 514 processes the data stream in connection with the end-link server 104. The remote guard 302-1 identifies the user endpoints 102 that generate more notifications than the number that can be processed. This alleviates the issue that would occur due to creating operations and scheduling work at the data handler 514 without information about the number of operations. As an overwhelming number of notifications would lead to head of line blocking and cause processing of the notifications of the user endpoints 102 to be delayed.

Figure 6:
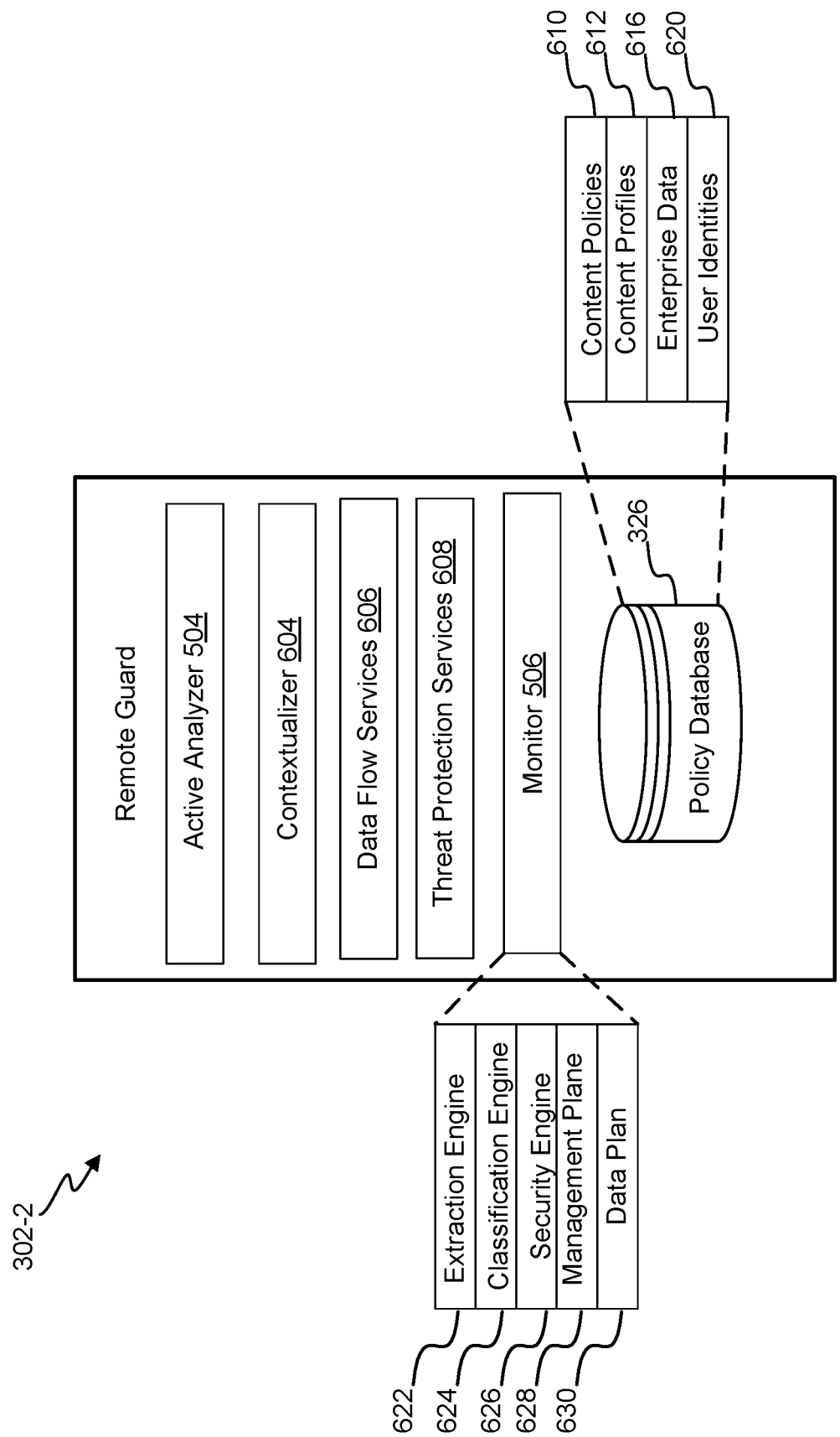
FIG. 6 shows a block diagram of the remote guard that can be used as another embodiment of the present disclosure.

Referring next to FIG. 6, a block diagram of the remote guard 302 that is used as another embodiment of the present disclosure. The remote guard 302-2 consists of the active analyzer 504, a contextualizer 604, data flow services 606, threat protection services 608, the monitor 506, and the policy database 326. The contextualizer 604 creates the context based on the information retrieved from the tunnels 106. The contextualizer 604 uses the monitor 506 to inspect the end-link servers 104 and assemble the data objects. In an example, the identification of sensitive documents is based on prior inspection of the document. The user endpoints 102 usually manually tag documents as sensitive, and this manual tagging updates the document metadata with the unique marker in the end-link servers 104. The policies can also label the data objects as sensitive. It is then possible to retrieve the document metadata from the end-link servers 104 exposed APIs and use them as an indicator of sensitivity.

The data flow services 606 in the remote guard 302-2 automatically forwards traffic from the user endpoint 102 to the end-link server 104 while ensuring that security and access policies are enforced. The data flow services 606 determines if the user endpoint 102 is looking to access the network 202 or the end-link server 104. The data flow services 606 are configured to auto-route traffic which can be based on protocols, as well as can be application-specific. This also includes automatic installation of the user endpoint 102 and secure sockets layer (SSL) certificates during enrolment of the client device of the user endpoint 102 prior to accessing the end-link server 104. Finally, the data flow services 606 provide visibility into application usage of the user endpoint 102 and supports a lightweight tunnel communication. For example, a lightweight tunnel can be HTTP-based. With the data flow services 606, there is no requirement for proxy auto-configuration (PAC) files, an Internet protocol security (IPSec) VPN, authentication cookies, or the user endpoint 102 setup.

The threat protection services 608 scans the files for malicious entities and takes the steps to mediate the threat using third-party services. The threat protection services 608 includes a similarity calculator for determining the level of similarity between new and old values for file size, file name, file extension and other properties that represent file features. Also included in the threat protection services 608 is a determinator which utilizes the results of the similarity calculator for deciding which files need threat scanning. Also included in the threat protection services 608 is an alert generator for signaling that the file contains malware. One example of the threat protection services 608 is a native service implemented by the security service provider.

Another threat protection service 608 is IPsec, a suite of protocols used in VPNs to authenticate and encrypt the packets of data sent over an internet protocol network (IPN). Another threat protection service 608 is an app firewall that controls input, output, and access from, to, or by the application, by monitoring and potentially blocking the input, output, or system service calls that do not meet the configured security services policy. Another threat protection service 608 is a proxy analyzer that examines and classifies data files as sensitive or not using content evaluation techniques. The proxy analyzer can function as a firewall service in one implementation.

The monitor 506 of the remote guard 302-2 further includes an extraction engine 622, a classification engine 624, a security engine 626, a management plane 628, and a data plane 630. The policy database 326 of the remote guard 302 includes content policies 610, a content profile 612, an enterprise data 616, client's information 618, and user identities 620. The monitor 506 is one or more virtual computing devices and/or resources. For example, the monitor 506 is one or more Amazon™ elastic compute cloud (EC2) instances. The policy database 326 is Amazon™ sampling strategies and statistics training materials (S3TM) storage. Other computing—as service platforms such as Rackspace, Heroku or Force.com from Salesforce™ could be used in place of the remote guard 302-2 on direct physical computers or traditional virtual machines. Additionally, one or more engines are used, and one or more points of presence (POPs) are established to implement the security functions.

Examples of the computing devices are a workstation, a server, a computing cluster, a blade server, and a server farm, or any other data processing system or a computing device. The engines are communicably coupled to the databases via a different network connection. For example, the extraction engine 622 is coupled via the network 202 (e.g., the Internet), the classification engine 624 is coupled via a direct network link and the security engine 626 is coupled by yet a different network connection. These functions collectively provide a secure interface between the end-link server 104 and an enterprise network. Although the term "cloud application security broker" can be used to describe the remote guard 302-2, more generally the system provides application visibility and control functions as well as security.

A control plane can be used along with or instead of the management plane 628 and the data plane 630. The specific division of functionality between these groups is an implementation choice. Similarly, functionality is sometimes highly distributed across several points of presence (POPs) to improve locality, performance, and/or security. In one implementation, the data plane 630 is on premises or on the VPN and the management plane 628 of the remote guard 302-2 is located in the cloud services or with corporate networks, as described herein. For another secure network implementation, the POPs are distributed differently.

In an example, 35,000 end-link servers 104 are resident in libraries that intersect with servers in use by the computers, tablets, cell phones and smart watches in the enterprise network. The user endpoints 102 in the enterprise network include management clients with a web browser and the forensic interface 212 provided by the mid-link server 110. The management clients are the personnel who are responsible for implementing policies using the remote guard 302-2 as per the requirement of the end-link server 104. The forensic interface 212 administers the content policies 610, according to one implementation. The remote guard 302-2 is the multi-tenant system, that allows the user of the management client to change the content policies 610 associated with their enterprise, according to some implementations.

In some implementations, APIs are provided for programmatically defining and/or updating policies. In such implementations, the management clients include one or more servers, pushing updates, and/or responding to pull requests for updates to the content policies 610. Both systems can coexist; for example, some companies use a corporate identities directory to automate identification of the user endpoints 102 within the enterprise. These companies use corporate identities while using a web interface for tailoring policies to their needs. The management clients are assigned roles and access to the remote guard 302-2 data, controlled based on roles of access to the data objects like, read-only vs. read-write access.

The content profile 612 includes tenant and data object metadata, values associated with data object or with the data object ID and a series of data objects with the same data object ID and different data object hashes. The data object hashes include word count, character count, paragraph count, author, etc. as well as a deep hash of component section of the file, including core.xml, document.xml or another programming script.

The enterprise data 616 includes data of the enterprise, including but not limited to, intellectual property, non-public financials, strategic plans, customer lists, and personally identifiable information (PII) belonging to customers or employees. The enterprise data 616 further includes patient health data, source code, trade secrets, booking information, partner contracts, corporate plans, merger, and acquisition documents, and other confidential data. In particular, the term "data of the enterprise" refers to a document or a file, a folder, a webpage, image, or any other text-based document. The user identities 620 are the indicators that are provided by the remote guard 302-2 to the user endpoint 102, in the form of a token, a unique identifier such as a universally unique identifier (UUID), or a public-key certificate. In some cases, the user identities 620 are linked to a specific user and a specific device. The same user can have a different user identity on their mobile phone and their computer.

In one implementation, a cryptographic certificate signed by the remote guard 302 is used as the user identities 620. In other implementations, the user identities 620 are solely unique to the user or are identical across user devices. Embodiments also interoperate with single sign-on (SSO) solutions and/or corporate identity directories. Such embodiments may allow policies to be defined in the directory, e.g., either at the group or user level, using custom attributes. Hosted services configured with the mid-link server 110 are also configured to require traffic via the mid-link server 110. This is done through setting an internet protocol (IP) range restrictions in the hosted service to the IP range of the system and/or integration between the system and SSO systems. For example, integration with an SSO solution can enforce client presence requirements before authorizing the sign-on. Other embodiments may use "proxy accounts" with the end-link server 104 vendor e.g., a dedicated account held by the mid-link server 110 that holds the only credentials to sign into the service.

In other embodiments, the user endpoint 102 encrypts the sign on credentials before passing the login to the end-link server 104, indicating that the mid-link server 110 owns the password. The policy database 326 stores the client's information 618 that includes information from one or more tenants stored in form of tables of a database image used to form an on-demand database service (ODDS), which is implemented in many ways, such as a multi-tenant database system (MIDS). The database image includes one or more database objects.

In some implementations, the gathered data objects are processed and/or normalized. In some instances, the data object includes structured data and its functionality targets specific data constructs (entities, nodes, relationships etc.) provided by the end-link server 104. Non-structured data, such as free text, is also provided by, and targeted back to the end-link server 104. Both structured and non-structured data are capable of being aggregated by the contextualizer 604. For instance, the assembled data objects are stored in a semi-structured data format like JSON, Binary JSON (BSON), XML, Avro or thrift object, which consists of string fields (or columns) and corresponding values of potentially different types like numbers, strings, arrays, objects, etc. JSON objects are nested, and the fields are multi-valued, e.g., arrays, nested arrays, etc.

The JSON objects are stored in the meta database 324 which stores the parsed JSON objects using key spaces that are equivalent to a database in structured query language (SQL). Each key space is divided into column families that are similar to tables and comprise of rows and sets of columns. In one implementation, the contextualizer 604 includes a metadata parser (omitted to improve clarity) that analyzes incoming metadata and identifies keywords, events, user IDs, locations, demographics, data object type, time stamps, and so forth within the data received. Parsing is the process of breaking up and analyzing a stream of text into keywords, or other meaningful elements called "targetable parameters."

A list of targeting parameters becomes input for further processing such as parsing or text mining, for instance, by a matching engine (not shown). Parsing extracts meaning from available metadata. In one implementation, tokenization operates as a first step of parsing to identify granular elements (e.g., tokens) within a stream of metadata. But parsing them goes on to use the context that the token is found in to determine the meaning and/or the kind of information being referenced. Parsing extracts metadata values and identifies property groups to be hashed for an incoming file. Because metadata analyzed by the contextualizer 604 are not homogenous (e.g., there are many different sources in many different formats), that employ at least one metadata parser for each end-link server 104.

Figure 7:
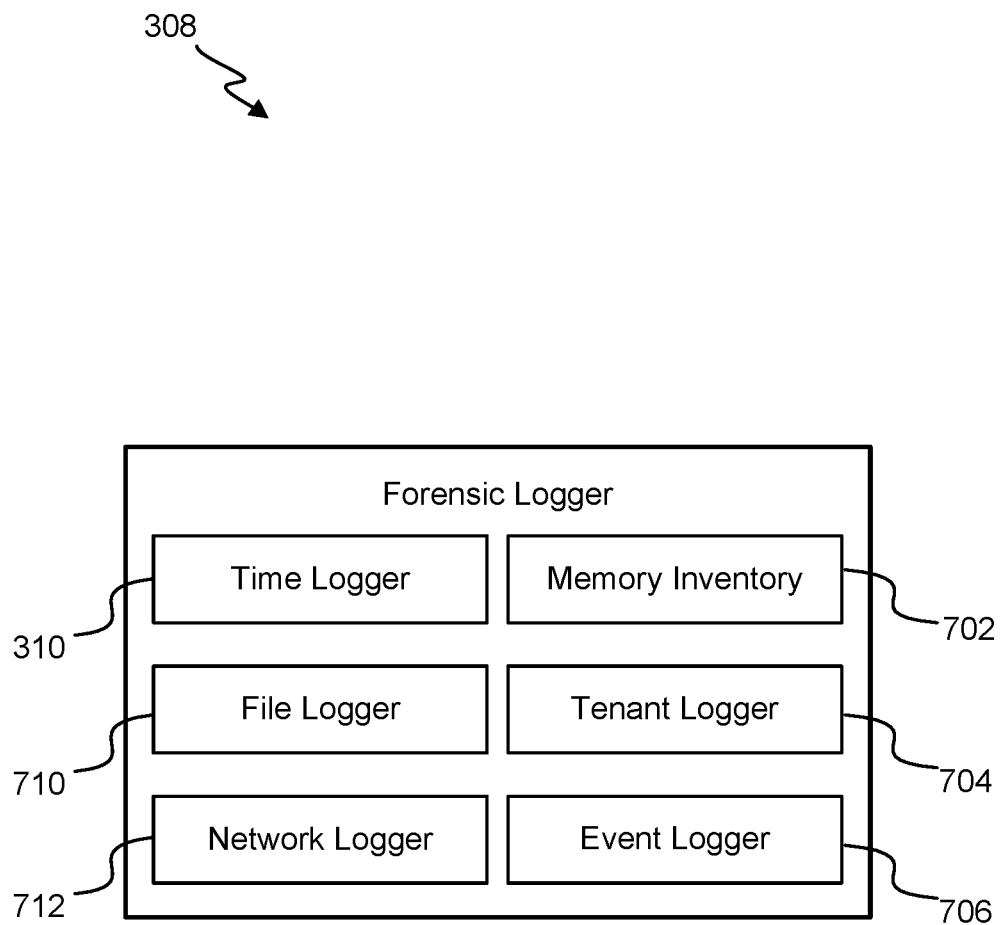
FIG. 7 shows a block diagram of a forensic logger.

Referring next to FIG. 7 a block diagram of the forensic logger 308 is shown. The forensic logger 308 is a software tool or system used to record and to keep the log of information about activities performed at the end-link server 104 or on the network 202. The forensic logger 308 generates an audit trail of events and actions including, for example, event logs, time stamps, file logs etc. The forensic logger 308 uses time stamps mapped to activities to put together a timeline. The timeline can be analyzed by the forensic investigator, or the forensic engine 112 can also do it with automation. The forensic logger 308 includes a memory inventory 702, a tenant logger 704, an event logger 706, a time logger 310, a file logger 710, and a network logger 712.

The memory inventory 702 captures information related to cloud infrastructure's memory usage. The memory usage includes details about the allocation and deallocation of memory resources, which helps in detecting anomalies and malicious activities.

In the multi-tenant environment, the tenant logger 704 maintains records of the tenant or client's activities and resources. The tenant logger 704 ensures isolation between tenants and provides insights into any tenant-specific security incidents or compliance violations.

The event logger 706 captures a wide range of events and activities of users of the end-link servers 104 across the network 202. This includes user logins, configuration changes, application-specific events, and security-related incidents. An entry of event log that is a primary source of information for electronic inspection, is generated by the event logger 706.

The time logger 310 records timestamps for various events and actions occurring within the network 202. The time logger 310 establishes the sequence of events during the forensic investigation, ensuring the accuracy of timeline.

The file logger 710 keeps a record of the files that are stored and accessed on the end-link server 104. The file logger 710 stores logs associated with file creation, modification, access, and deletion events. This information is required for tracking data breaches, unauthorized access, or data exfiltration.

The network logger 712 monitors the connections within the end-link server 104 and keeps track of traffic on the network 202. The network logger 712 logs details of incoming and outgoing network requests, IP addresses, ports and protocols that helps in detecting suspicious and unauthorized network activity during forensic investigations. The forensic logger 308 is designed to work with cloud-native services and APIs provided by the end-link server 104.

Figure 8:
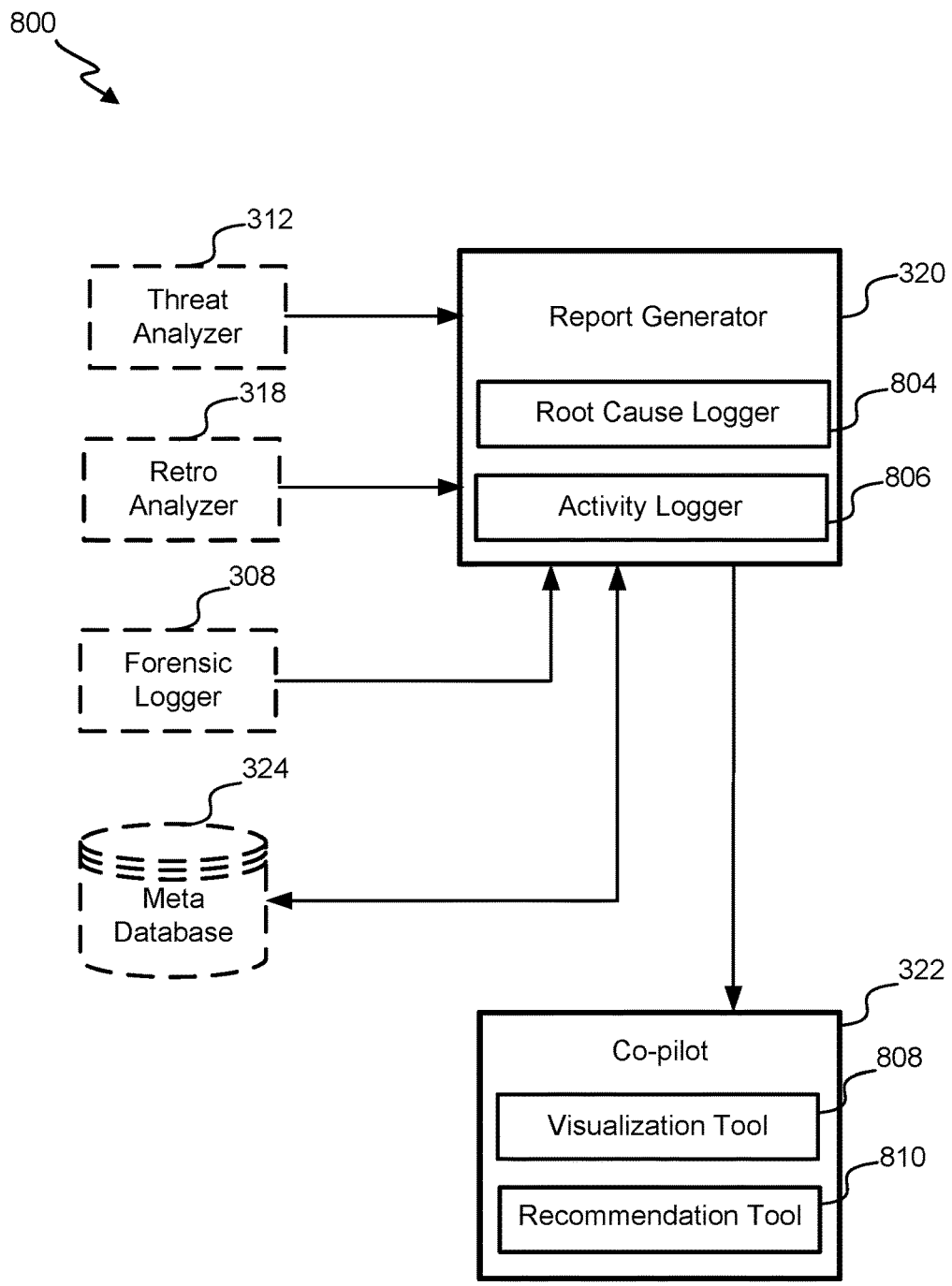
FIG. 8 shows a block diagram of a report generator interacting with a co-pilot of the mid-link server.

Referring next to FIG. 8, a block diagram of the report generator 320 interacting within the co-pilot 322 of the mid-link server 110 is shown. The report generator 320 is employed to compose a detailed report containing details of the reasons and impact of a security threat or an incident. The report generator 320 includes a root cause logger 804 and an activity logger 806. The activity logger 806 writes down the steps taken either by the threat analyzer 312, the retro analyzer 318 or the forensic logger 308 at the mid-link server 110, and each query made by the mid-link server 110.

The root cause logger 804 fetches the incident relevant information from the meta database 324. The root cause logger 804 deploys natural language processing (NLP) techniques to generate a text (.txt, .doc, .pdf) file. The text file contains details about the root cause of the incident or threat, reasons that lead to the incident and how the problem was tackled by the mid-link server 110. The report generator 320 notes down the flow of instructions and the steps taken in the IR process. The report generator 320 sends out the text file to the co-pilot 322 that interacts with the forensic investigator.

A visualization tool 808 of the co-pilot 322 helps the forensic investigator better understand and interpret data by presenting data-driven stories, monitoring data changes and deriving meaningful insights from the data. The visualization tool 808 transforms raw data into visually appealing charts, graphs, and dashboards, allowing for intuitive data exploration. Using the visualization tool 808, users, or the forensic investigator easily identifies patterns and outliers, facilitating insightful decision-making processes. A recommendation tool 810 in the co-pilot 322 provides recommendations and security measures using machine learning algorithms, to fight a particular malware attack in future or to prevent some kind of breach from happening again in future. The report created by the report generator 320 is visible at the forensic interface 212 for the help of the forensic investigator.

Figure 9:
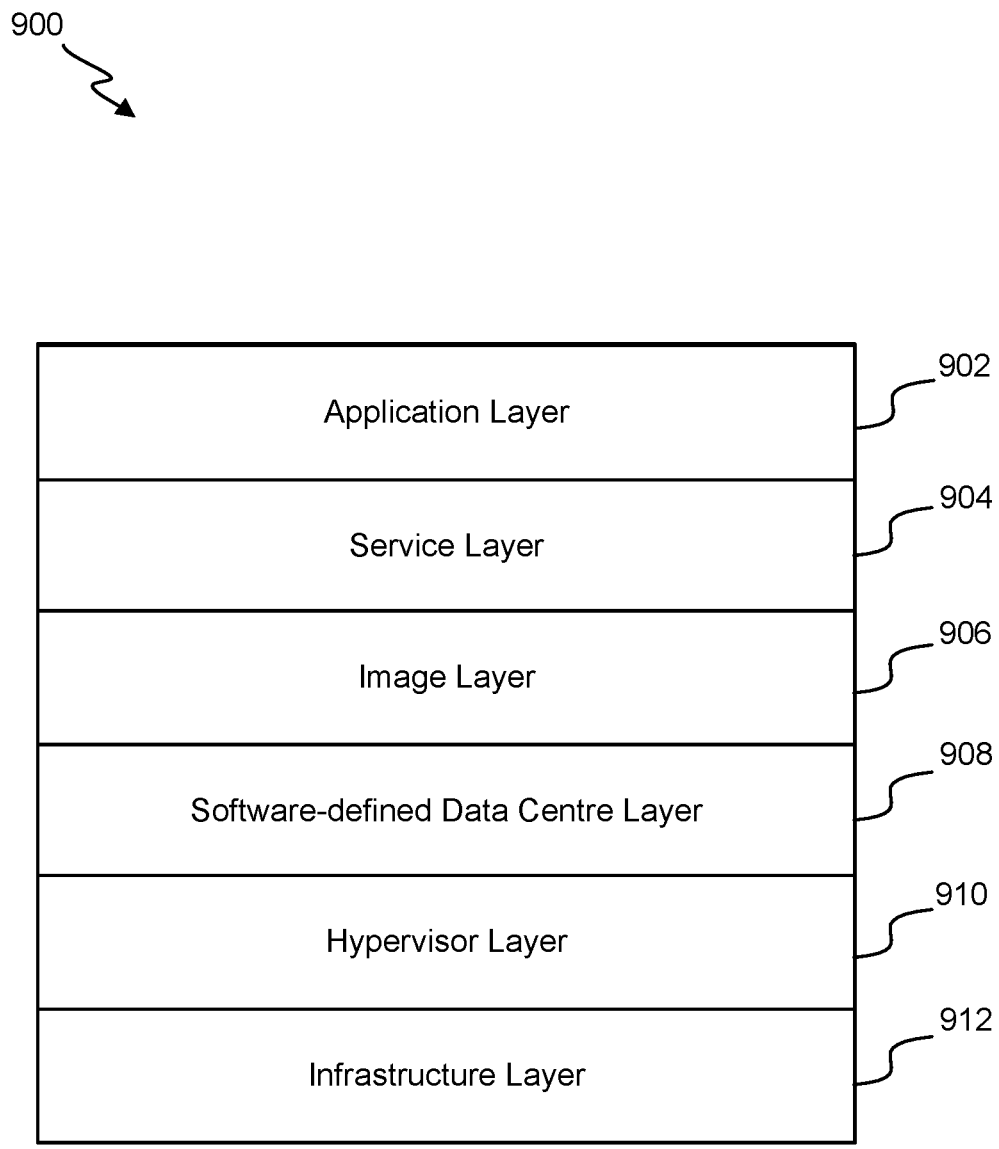
FIG. 9 shows a block diagram of a cloud OSI model for the end-link server.

Referring next to FIG. 9, that shows a block diagram of a cloud open systems interconnection (OSI) model 900 for the cloud computing environments in an embodiment. The cloud OSI model 900 for the cloud computing environment partitions the flow of data in a communication system into six layers of abstraction. The cloud OSI model 900 for the cloud computing environment includes, in order, the application layer 902, a service layer 904, an image layer 906, a software-defined data center layer 908, a hypervisor layer 910, and an infrastructure layer 912. The layers serve a class of functionality to the layer above it and are served by the layer below it. Classes of functionality are realized in software by various communication protocols.

The infrastructure layer 912 includes hardware, such as physical devices in a data center, that provides the foundation for the rest of the layers. The infrastructure layer 912 transmits and receives unstructured raw data between a device and a physical transmission medium. For example, the infrastructure layer 912 converts the digital bits into electrical, radio, or optical signals.

The hypervisor layer 910 performs virtualization, which allows the physical devices to be divided into virtual machines that are bin packed onto physical machines for efficiency. The hypervisor layer 910 provides virtualized computing, storage, and networking. For example, OpenStack® software that is installed on bare metal servers in a data center provides virtualization cloud capabilities. The OpenStack® software provides various infrastructure management capabilities to cloud operators and administrators and utilizes the infrastructure-as-Code concept for deployment and lifecycle management of a cloud data center. In the Infrastructure-as-Code concept, the infrastructure elements are described in definition files. Changes in the files are reflected in the configuration of data center hosts and cloud services.

The software-defined data center layer 908 provides resource pooling, usage tracking, and governance on top of the hypervisor layer 910. The software-defined data center layer 908 enables the creation virtualization for the infrastructure-as-Code concept by using REST APIs. The management of block storage devices is virtualized, and the user endpoint 102 is provided with a self-service API to request and consume those resources without requiring any knowledge of where the storage is actually deployed or on what type of device. Various computing nodes may be balanced for storage.

The image layer 906 uses various operating systems and other pre-installed software components. Patch management is used to identify, acquire, install, and verify patches for products and systems. Patches are used to correct security and functionality problems in software. Patches are also used to add new features to operating systems, including security capabilities. The image layer 906 focuses on computing. The instances within the cloud computing environments are provided at the image layer 906.

The service layer 904 provides middleware, such as functional components that applications use in tiers. In some examples, the middleware components include databases, load balancers, web servers, message queues, email services, or other notification methods. The middleware components are defined at the service layer 904 on top of particular images from the image layer 906. Different cloud computing environment providers have different middleware components.

The application layer 902 interacts with software applications on a cloud that implements a communicating component. The application layer 902 is the layer that is closest to the user endpoint 102. Functions of the application layer 902 include identifying communication partners, determining resource availability, and synchronizing communication. Applications within the application layer 902 include custom code that makes use of middleware defined in the service layer 904.

Various features discussed above are performed at one or more layers of the cloud OSI model 900 for cloud computing environments. For example, the forensic investigation and the incident response is performed at the application layer 902. Various scripts are updated across the service layer 904, the image layer 906, and the software-defined data center layer 908. Further, APIs operate at the application layer 902, that is at a web browser. The mid-link server 110 of the present disclosure performs the electronic inspection by rendering the model of the application layer 902 according to the policies and the context. The interactions between the user endpoint 102 and the end-link server 104 are modelled using the model of the application layer 902 at the mid-link server 110.

Figure 10:
FIG. 10 shows an event log entry generated by the forensic logger.

Referring next to FIG. 10, an event log entry 1000 generated by the forensic logger 308 is shown. The event log entry 1000 is in a JSON-style representation. The event log entry 1000 is not exhaustive of the fields that are logged but highlights the features. The event log entry 1000 indicates user-by-user and file-by-file data regarding interaction of the user endpoint 102 with one or more end-link servers 104.

Figure 11:
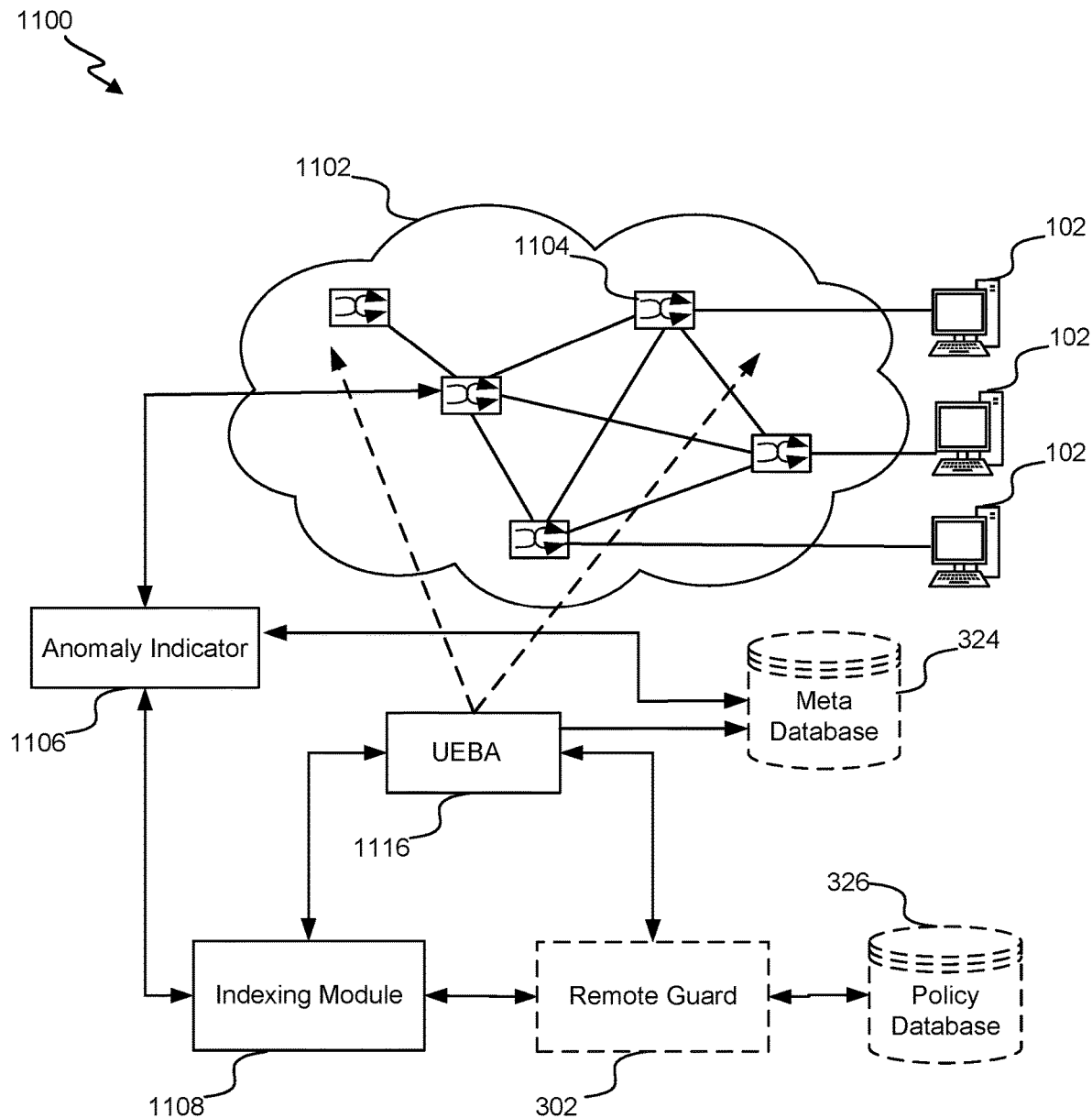
FIG. 11 shows an enterprise environment subjected to be analyzed by a retro analyzer.

Referring next to FIG. 11, a block diagram 1100 that schematically shows an enterprise environment that is subjected to be analyzed by the retro analyzer 318 is shown. The enterprise environment in this example is contained in a facility, such as an office or a campus, with the user endpoints 102, and the enterprise network 1102 that has protected local packet communication. The user endpoints 102 are interconnected by switches 1104 in the enterprise network 1102, while each of the switches 1104 connect the enterprise network 1102 to the network 202, such as the Internet. The switches 1104 comprises of bridges, routers, or any other suitable type of network switching element. The UEBA 316 collects behavioral information from one or more sensors in the enterprise environment that are distributed within the enterprise network 1102. The UEBA 316 then processes this information according to the policies defined in the policy database 326 and generates behavioral intelligence and baseline of user activity. Various commercially available products are used for this purpose.

An anomaly indicator 1106 of the retro analyzer 318, receives behavioral intelligence from the UEBA 316, as well as information from and regarding the user endpoints 102. The behavioral information gives information about different data objects that are commonly accessed by separate tenants and the user endpoints 102 connected to the end-link server 104. Any unusual activity is assigned a score based on the threat posed by that unusual behavior by an indexing module 1108. The score is a metric associated with the user endpoints 102 and the metric is a data point or observation that indicates the unusual activity of the user endpoint 102. The metric or the score quantifies the deviation of the user endpoints 102 from their baseline behavior. In this application, the terms "scores", "risk scores" and "metrics" are used interchangeably.

The threat posed by the data objects includes the possibility of propagation of malware, viruses, ransomware or trojans etc. When such a compromised data object is uploaded to a cloud storage service or shared with others on the end-link server 104, it infects the user endpoints 102 or the cloud infrastructure itself. This contamination of the compromised data object leads to widespread malware distribution. The compromised data objects are used in phishing attacks. For example, an attacker sends a malicious file via email or a shared link, tricking users into downloading and opening it, which leads to a malware infection or a theft of credentials. Attackers also use compromised data objects to launch distributed denial-of-service (DDoS) attacks from cloud resources.

Numerous algorithms are used to compute how much of a threat certain anomalous behavior poses. The score is computed against each of the policies triggered by user behavior. The policies are fetched from the policy database 326 of the remote guard 302. Based on these inputs, the anomaly indicator 1106 computes and outputs the threat flags with respect to a total score and events in the enterprise environment.

The anomaly indicator 1106 analyzes numerous scores, like scores of the end-link servers 104 and data objects stored in the meta database 324, to generate the threat flags. The flag is raised when the metric or the score indicates an increased unusual activity of the user endpoint 102. If the score of the user endpoint 102 triggers a policy, the remote guard 302 modifies the policies to increase the frequency of logging the data objects for the user endpoint 102.

The indexing module 1108 calculates the risk scores at varying levels of granularity in the network 202. The total score value for an individual user is a weighted combination of a user rate of collaboration of the user, risk score of a user location of the user endpoint 102, vulnerability characteristics of the user endpoint 102, and a risk score of the user. The user's rate of collaboration depends on the number of the shared data objects a user is working on. The collaboration rate further depends on the access privileges applicable to the shared files. If the user endpoint 102 has written privileges over a shared data object, it increases the risk of malware spreading as compared to read-only privileges.

The risk score is assigned to the location based on historical interactions. The historical interactions can include the historical logs or historical data. For example, if the user endpoint 102 or tenant is in a location from where malware infected documents have regularly originated, such a location is given a low-risk score. The vulnerability characteristics of the user endpoint 102 are determined by the operating system and applications and services running on the user endpoint 102. For example, if the user endpoint 102 has the older version of the operating system, the user endpoint 102 is assigned the low-risk score. The user risk score is calculated based on historical data and historical interactions such as previous malware detections and results from user-level security evaluations.

The risk score of the data object is calculated based on the shared information about the data object. For example, if the data object is shared outside the network 202, it is assigned a high-risk score. If the data object is shared within the network 202, it is assigned a low-risk score. The degree to which some file is shared internally or externally also impacts the data object risk score. The data object hygiene is further refined based on an analysis of data object write privileges and sharing amongst internal or external groups.

The indexing module 1108 calculates an external surface exposure value for the data object based on the identities of the external users sharing the data object. Note that the external users do not belong to the end-link server 104, but they are given access to a shared data object by a user belonging to the end-link server 104. The access privilege is a write privilege or a read-only privilege of the data object. The indexing module 1108 aggregates the external surface exposure for the data objects shared to external users to determine external surface exposure for the enterprise. In this application, some concepts are claimed and explained in the context of "data objects" or "files." These concepts apply equally to "folder objects" or "folders."

The user data object sharing information is used by the system to calculate user rate of sharing data objects through the end-link server 104 and the user rate of opening files shared through the end-link server 104. Based on this, for individual users, a user rate of collaboration is calculated. The number of users with write-access privileges to the data object is determined using the identities of the users sharing the data object and the user access privilege information. Similarly, the number of users with read-access privileges to the data object is also determined using the identities of the users sharing the data object and the user access privilege information.

The identities of users sharing the data objects and the user access privilege information is used to determine number of users in the end-link server 104 having access to data object, number of users outside the organization having access to the data object, and whether the data object is shared within the end-link server 104 group. Based on this, for individual data objects, the risk score is calculated.

The risk score is calculated for the user endpoints 102 based on the location of a user, the user endpoint 102 vulnerability characteristics of the user, the user rate of collaboration of the user, and the risk score of the data objects connected to the user endpoint 102 or the tenant. The risk score calculation also considers individual data objects connected to the users in the end-link server 104 and the identities of the user endpoints 102 sharing the data objects. The user access privilege information that is used to determine number of users outside the end-link server 104 with file write privileges and number of users outside the end-link server 104 with file write privileges is also considered. Based on this, an external surface exposure for the end-link server 104 is calculated.

The risk score is also calculated for the end-link servers 104 based on the external surface exposure of the end-link server 104, user risk scores of the users in the end-link server 104, occurrence recency, and severity of the latest spread of malware. The risk score for the end-link servers 104 further depends on the number of managed and unmanaged devices in a network, and a security patch level configured on the end-link server 104 devices.

Table I shows a pseudo-code for computing the risk score for the user endpoint 102. In a single interaction with the end-link server 104, the user endpoint 102 triggers various policies and the total score here referred as interaction score, is aggregate of the risk scores. The mid-link server 110 identifies the policies violated by the user endpoint 102 in a single interaction, and for each such policy, the mid-link server 110 repeats steps 9-20. Some policies have more weight and thus the mid-link server 110 assigns an initial score triggered policy; the risk score is assigned by human experts based on their field experience and security research.

Then, the mid-link server 110 simply sums up the scores from the triggered policies within an interaction to make up the final interaction score. Some policies are prone to trigger more across the user endpoints 102. Policies with frequent triggers are less informative in the security aspect than those that are rarely triggered. Frequently triggered policies contribute to score inflation for interactions, resulting in an increase of false positive rate and a decrease in precision rate.

To mitigate the issue with score inflation, risk score is adjusted dynamically based on a variety of factors from the behavior profiles. Here in this embodiment, the risk score adjustment is for peer group-based policies. For example, if this is the first time for this user's peer group to trigger some policy. The corresponding risk score is adjusted based on how close the User endpoint 102 is related with the said peer group from the past activity histories.

The risk score is further modified to reduce the false positives associated with frequently triggered policies i.e., another adjustment factor is applied to the risk score. The adjustment factor is based on the Bayesian method to weigh the score contribution of policies according to their historical triggering frequencies. The more frequently the policy is observed to trigger in history, the smaller the adjustment weight is. Finally, the interaction score is the sum of the risk scores of the triggered policies, weighted by data-driven adjustment factors. The adjustments are dynamic and learned from data periodically.

TABLE I

Figure 12:
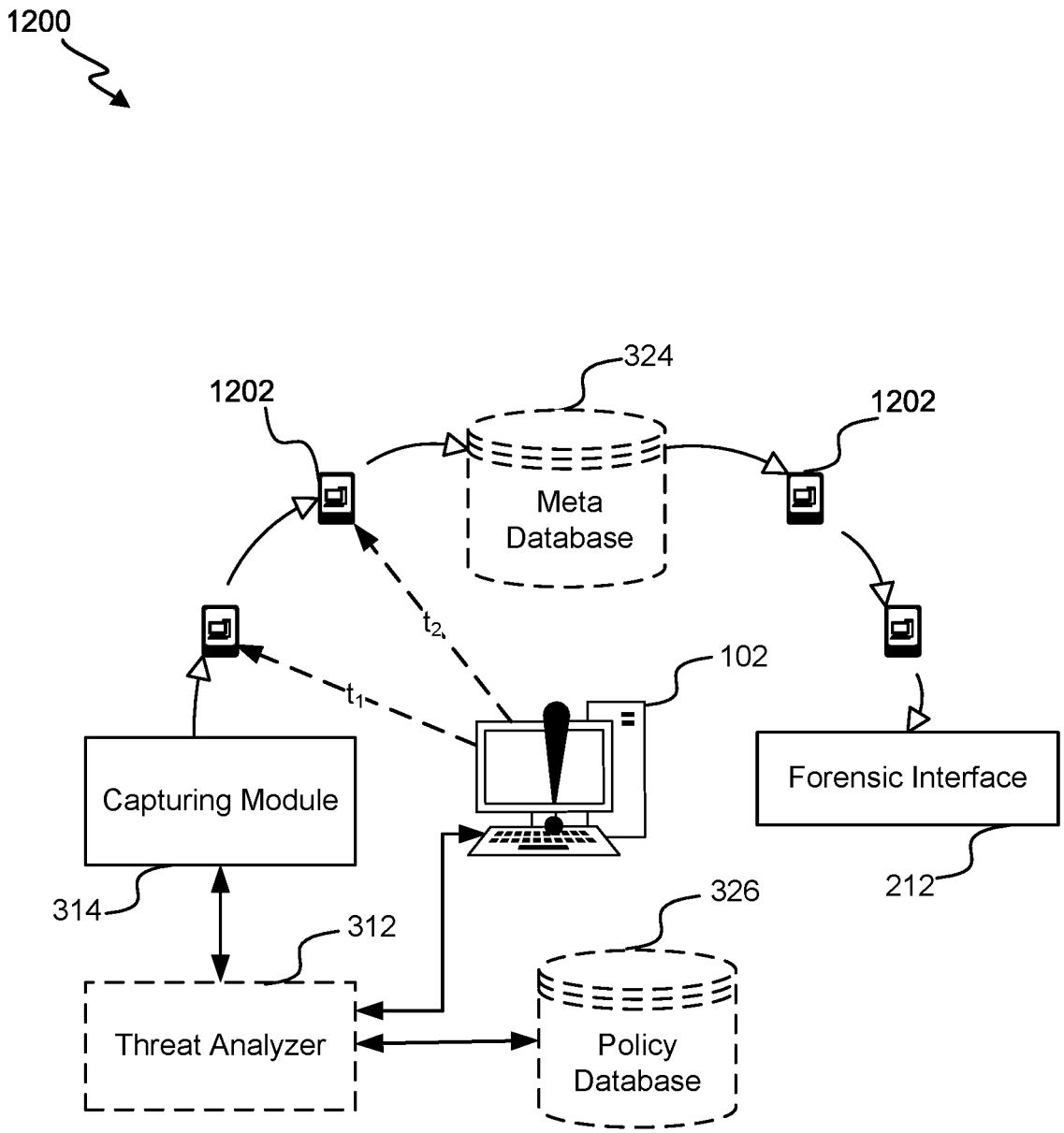
FIG. 12 shows an exemplary method of capturing states of activities on the end-link server.

Pseudo code for risk scores computation of user endpoint 1. def assign_risk_score(policy):
2. return
3. def adjust_risk_score_peer_group(policy):
4. return
5. def calculate_adjustment_factor(policy):
6. return
7. Repeat
8. Fetch P[x]
9.  For ( i : i == x : i++ ) do
10.     If P[i] =! historical_triggering_policies.list[y]
11.        frequency = 1;
12.     else
13.        frequency ++;
14.     risk_score = assign_risk_score(i);
15.     risk_score += adjust_risk_score_peer_group(i);
16.     adjustment_factors[i] = calculate_adjustment_factor(i);
17.     risk_score *= (1 − adjustment_factors[i]);
18.     risk_scores[i] = risk_score;
19.     interaction_score += risk_score;
20.  End for
21. Until P[x]
22. Output interaction_score Referring next to FIG. 12, shows an exemplary method 1200 of capturing states of activities on the end-link server 104. The method is further designed to create a representation for performing electronic inspection by the mid-link server 110 in an embodiment. The method includes capturing the states 1202 of interactions being carried out on the model of the application layer 902 of the remote software environment. The states 1202 at the instance level in the end-link server 104 allow for easy, instant, point-in-time recovery, providing protection against any kind of malware, and accidental or intentional file deletion.

The capturing module 314 acquires different types of states depending upon the requirements. For example, capturing states of interaction keystrokes between the user endpoint 102 and the end-link server 104 and capturing tunnel states to analyze traffic. The capturing module 314 also captures the states of file being accessed and edited and captures display state of an instance at the end-link server 104. The threat analyzer 312 detects the anomalous behavior in the User endpoint 102 and if the policy is triggered, the threat analyzer 312 raises a corresponding threat flag. The capturing module 314 upon receiving the threat flag, starts capturing the states 1202 at different time intervals based on the policies stored in the policy database 326.

The captured states 1202 are stored in the meta database 324 of the forensic engine 112 and are used for electronic inspection later. The captured states are used for creating the representation of interactions at the application layer 902 from the data objects stored at the mid-link server 110. The forensic investigator retrieves the states 1202 stored in the meta database 324 and creates the representation of interactions or activities of the user endpoint 102, on the forensic interface 212. In one case of the electronic inspection process, the representation created through the states 1202 helps the forensic investigator to identify the source who triggered a particular policy.

Accordingly, the mid-link server 110 takes policy remediation actions against a corrupt source. The corrupt source refers to the source of the policy trigger and generation or entry of any malicious entity in the network 202 or the enterprise. The malicious entity is generated or spread through the user endpoints 102, the end-link servers 104, the tunnels 106, tenants or any data object. The malicious entity poses a potential threat to the security of the enterprise, the end-link servers 104 or the network 202. In another embodiment, the states 1202 are used to identify and recreate the data objects that got compromised due to a malware attack at the end-link server 104.

Figure 13:
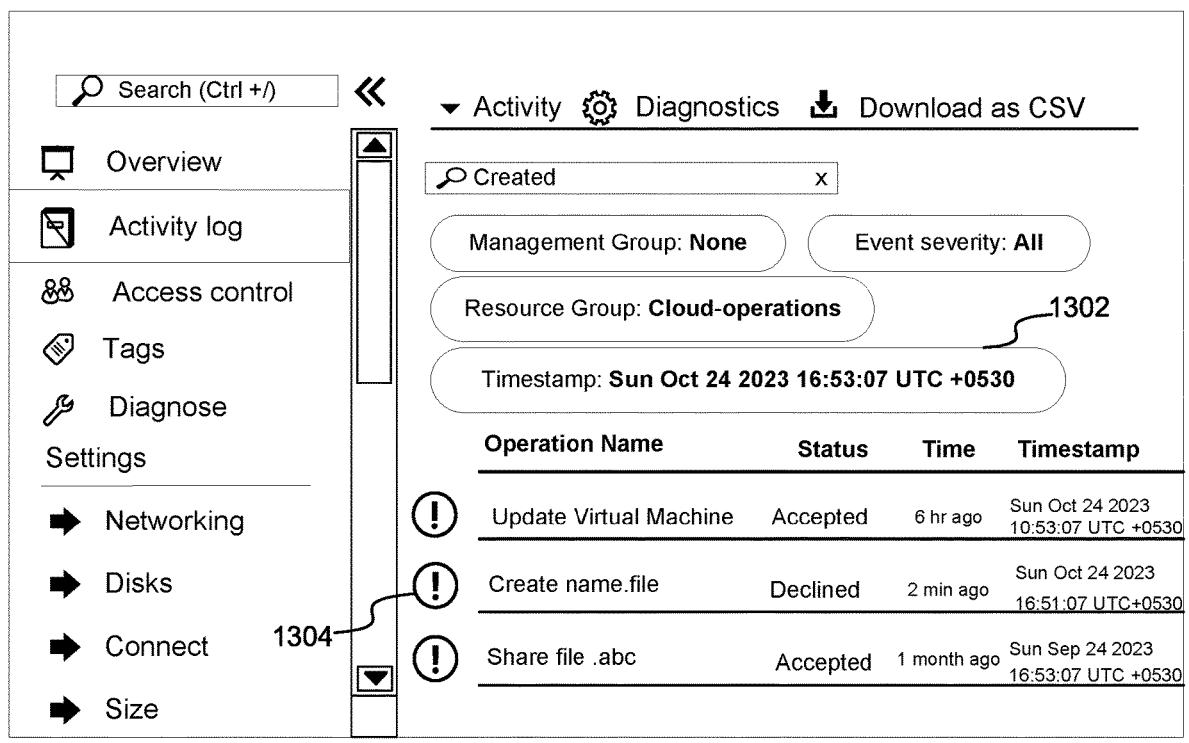
FIG. 13 shows a GUI acquired by a capturing module of the mid-link server.

Referring next to FIG. 13, that shows a graphical user interface (GUI) 1300 created by the state 1202 acquired by the capturing module 314 of the mid-link server 110. The state 1202 is the exemplary representation of details of a GUI displayed on a screen of the user endpoint 102. Other representations of states are also created by the capturing module 314. The timestamp of the moment when the state 1202 was captured is shown at section 1302. The state 1202 also indicates the operations and activities of the User endpoint 102, and the status of those activities. For example, the state of operation of the operation, whether it was successful or not, and exact timestamp along with the location of the user endpoint 102 while performing that activity section 1304. Such information, 1302 and 1304, extracted from the representation created by the states 1202 helps in the electronic inspection of the end-link server 104 for a particular security problem.

Figure 14:
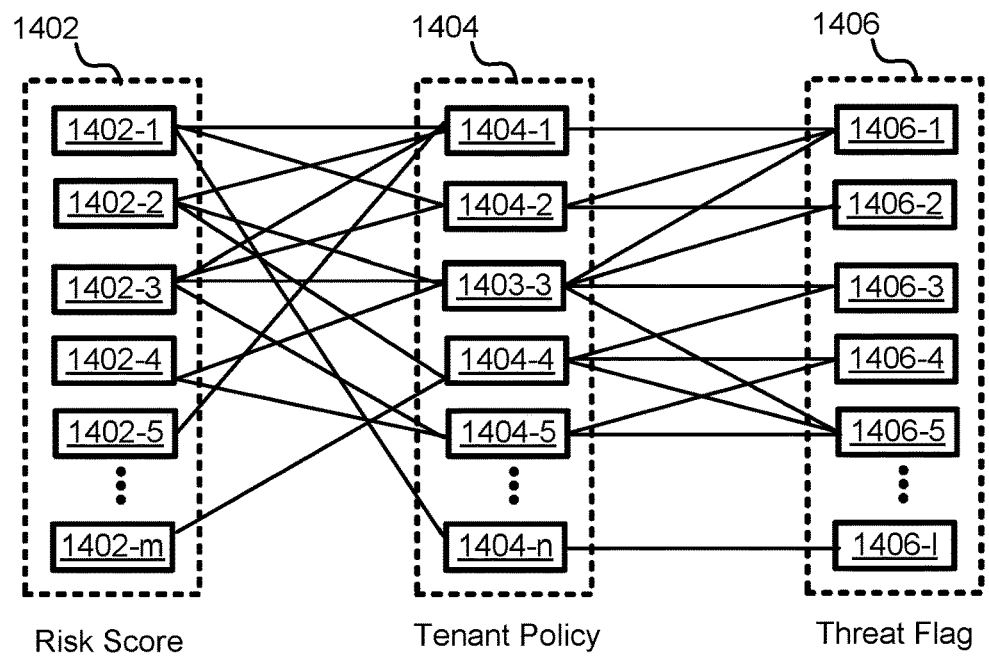
FIG. 14 shows mapping between risk scores of user endpoints, respective policies and resulting threat flags.

Referring next to FIG. 14, that shows a mapping 1400 between the risk score 1402, a tenant policy 1404 and the threat flag 1406. The risk scores 1402 (1402-1, ..., 1402-*n*) of different subjects like the end-link servers 104, the user endpoints 102 accessing the end-link server 104 and data objects, are regulated by several policies. The risk score of the user endpoints 102 is evaluated with respect to the policy. Hence, a total risk score associated with the user endpoint 102 is regulated by several policies. The risk score 1402 of data objects and the end-link servers 104 is associated with number of tenant policies 1404 (1404-1, ..., 1401-*n*) that defines the roles and rules of these subjects. The combination of these tenant policies 1404 (1404-1, ..., 1401-*n*) triggers the threat flags 1406 (1406-1, 1406-*n*). A single tenant policy 1404-*n* also triggers the threat flag 1406-1 which indicates that policy defines a significant rule that is followed.

Figure 15:
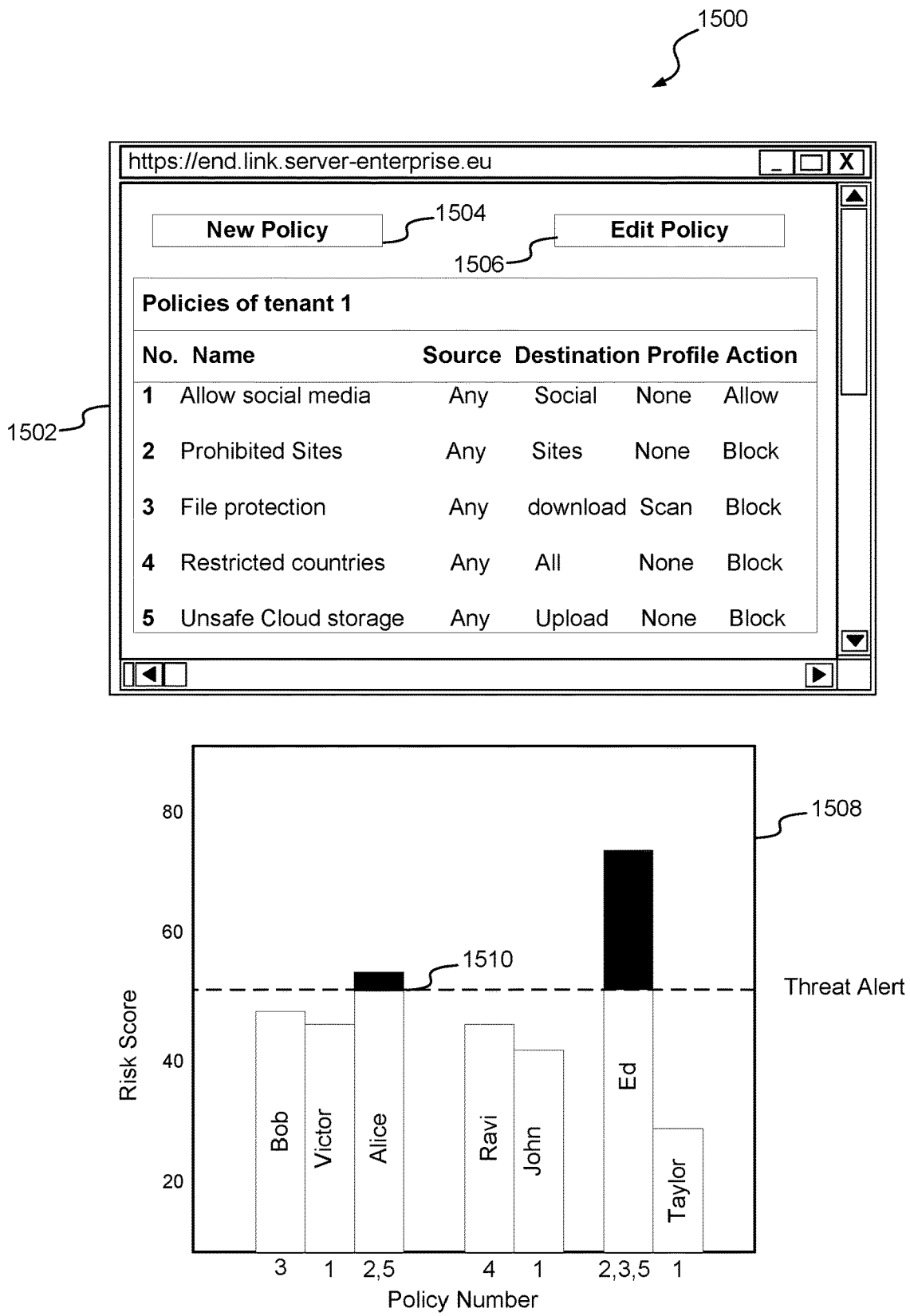
FIG. 15 shows a GUI representation of a tenant policy and graphical representation of the risk scores of each user endpoint along with the policies that were breached.

Referring next to FIG. 15, that shows a GUI representation 1500 of the tenant policy 1404. FIG. 15 also shows the graphical representation 1502 of the risk scores 1402 of the user endpoint 102 along with the policies that were breached at 1508. The mapping of policies with the risk scores 1402 and threat level is also shown in Table II.

TABLE II

Risk scores and level of threat posed based on policies of tenant of end-link server

| Policy no. | Policies of tenant 1 | Action | Policy breached | Risk score | Threat Level |
|---|---|---|---|---|---|
| 1 | Allow social media | Allow | No | 2 | Low |
| 2 | Prohibited sites | Block | Yes | 7 | High |
| 3 | File protection | Block | No | 0 | None |
| 4 | Restricted countries | Block | No | 1 | Low |
| 5 | Unsafe cloud storage | Block | Yes | 8 | High |

The GUI representation 1502 showing the tenant policies 1404 also includes features like adding a new policy as shown at section 1504 or editing an existing policy shown in section 1506. The enterprise can add or edit policies, as their terms and conditions are renewed. Policies are also edited by the forensic investigator. Activities of the user endpoint 102 or the tenant are scored using different scoring mechanisms. One such representation of the risk scores 1402 of the user endpoints 102 is shown in graphical representation 1508. The horizontal axis represents the number of policies from 1502 that are violated by the user endpoints 102 while vertical axis shows the risk scores 1402 of each of the user endpoint 102. After some pre-defined threshold is crossed, the threat flag 1406 is generated. At 1510, it is said that some policy has been triggered. The policy remediation actions are taken for the user endpoint 102 or tenant of the end-link server 104 that has triggered a policy. Take the example of Alice from 1508. Alice has breached policy number 2 and 5, which means that Alice has been trying to access/work on the prohibited sites and Alice has also uploaded some company documents on unsafe cloud storage. Alice has the risk score of 52, which is greater than the threshold value and thus, policy is triggered, and the threat flag 1406 is generated for Alice, at 1510. The forensic engine 112 of the mid-link server 110 will now follow policy remediation steps, the explanation of which shall be discussed next.

Figure 16:
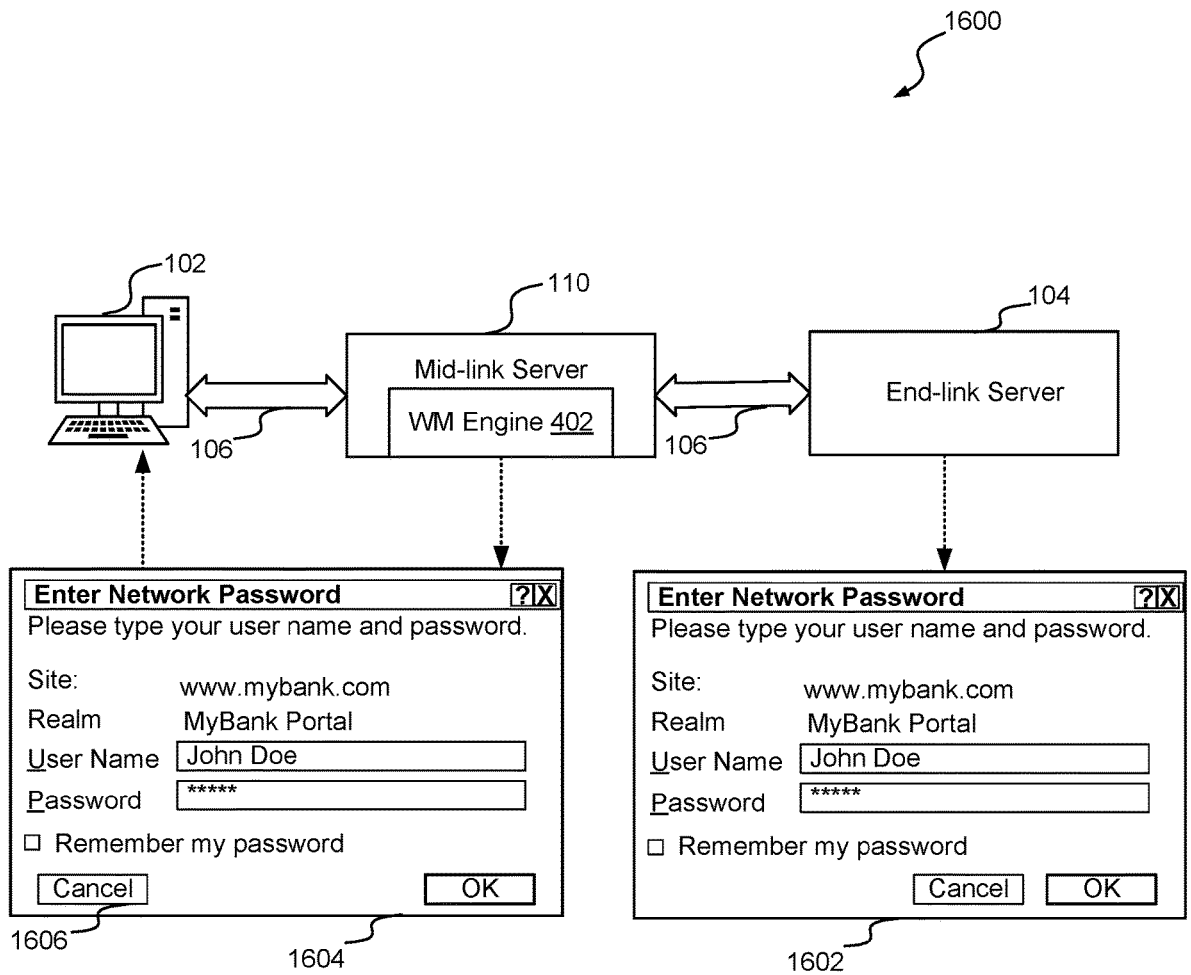
FIG. 16 shows a representation of embedding of a unique marker in a data object using a model of an application layer at the mid-link server.

Referring next to FIG. 16, that shows a GUI representation 1600 of embedding of the unique marker in the data object using the model of the application layer 902 at the mid-link server 110. One example of modelling of the data objects in the GUI 1600 is shown through the embedding of the unique marker by the WM engine 402 of the threat analyzer 312. The exemplary representation of the GUI 1600 includes the user endpoint 102 accessing the end-link server 104 via the tunnels 106, where the mid-link server 110 acts as a middle-mile and sits in between the communication path. The WM engine 402 is integrated within the threat analyzer 312 with other components but shown explicitly in 1600 for clarity. The WM engine 402 is employed to model data objects using the model of the application layer 902. For example, embedding the unique marker in web display of the application or in hypertext markup language (HTML) of the data object present on the end-link server 104. This data object is to be accessed by the user endpoint 102 later.

As an example, the user interface of the application running on instance of the end-link server 104 is shown in 1602. While the user endpoint 102 accesses the application, the mid-link server 110 sitting in-between loads the tenant policies 1404. The rendering engine 410 determines if the web display or any other data object being accessed by the user endpoint 102 needs to be embedded with the unique marker. If the web display 1602 is required to be uniquely marked according to the policies, the WM engine 402 of the mid-link server 110 creates the unique marker and embeds it in the web display. The WM engine 402 then makes the uniquely marked data object accessible to the user endpoint 102, at section 1604. The unique markers can be visible (logo, copyright) or invisible (spatial and frequency watermarking etc.) in the data object. Notice in the web display shown in section 1602 that has been uniquely marked, the unique marker is embedded on pixel level. It refers to the placement of cancel command 1606 is changed in section 1604, as compared to the one in 1602. The presence of unique marker is unknown to the user endpoint 102. Now, consider the case where the user endpoint 102 takes picture of some data object from its cell phone and leaks it to the network 202, to inflict harm. The mid-link server 110 compares the uniquely marked data object that is leaked, with the unique markers stored in the meta database 324 and pinpoints the source who leaked that data object.

Figure 17:
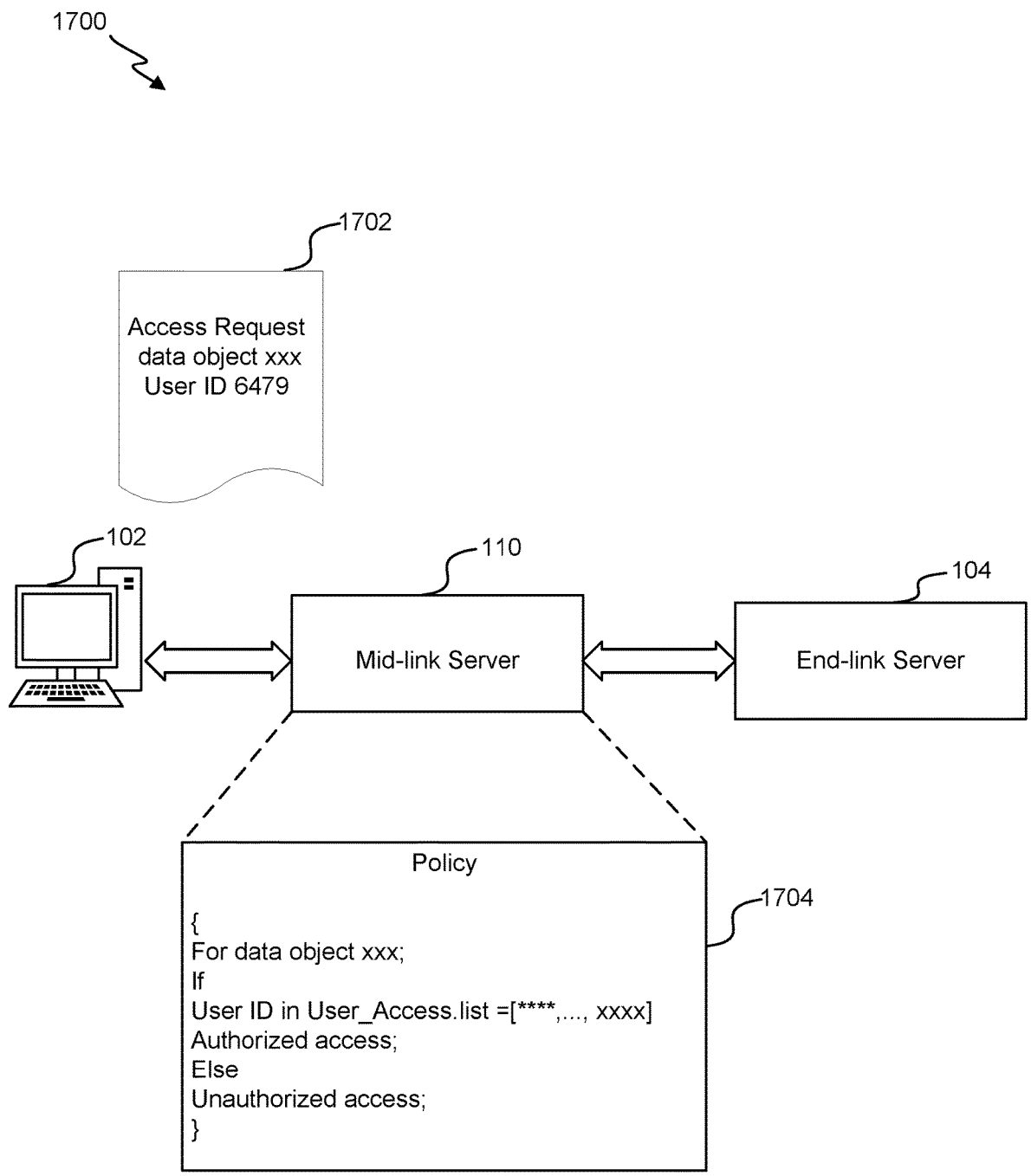
FIG. 17 shows a flow diagram of policy enforcement by the mid-link server.

Referring next to FIG. 17, a flow diagram 1700 of the policy enforcement by the mid-link server 110 is shown. The flow diagram 1700 shows the user endpoint 102 that is attempting to access some data object. Since the mid-link server 110 intercepts the communication between the user endpoints 102 and the end-link server 104. The access request 1702 of the user endpoint 102 is analyzed by the mid-link server 110.

The mid-link server 110 retrieves the policy governing this particular interaction from the policy database 326. The policy for accessing the data object xxx 1704 has list of user IDs that permitted to access this data object. If the user ID 6479 is present in the User_Access.list, the mid-link server 110 will categorize it as an authorize access and vice versa. If the access is unauthorized the mid-link server 110 will assign the risk score according to the gravity of the case and follow the remediation steps that are also governed by the policies.

Figure 18:
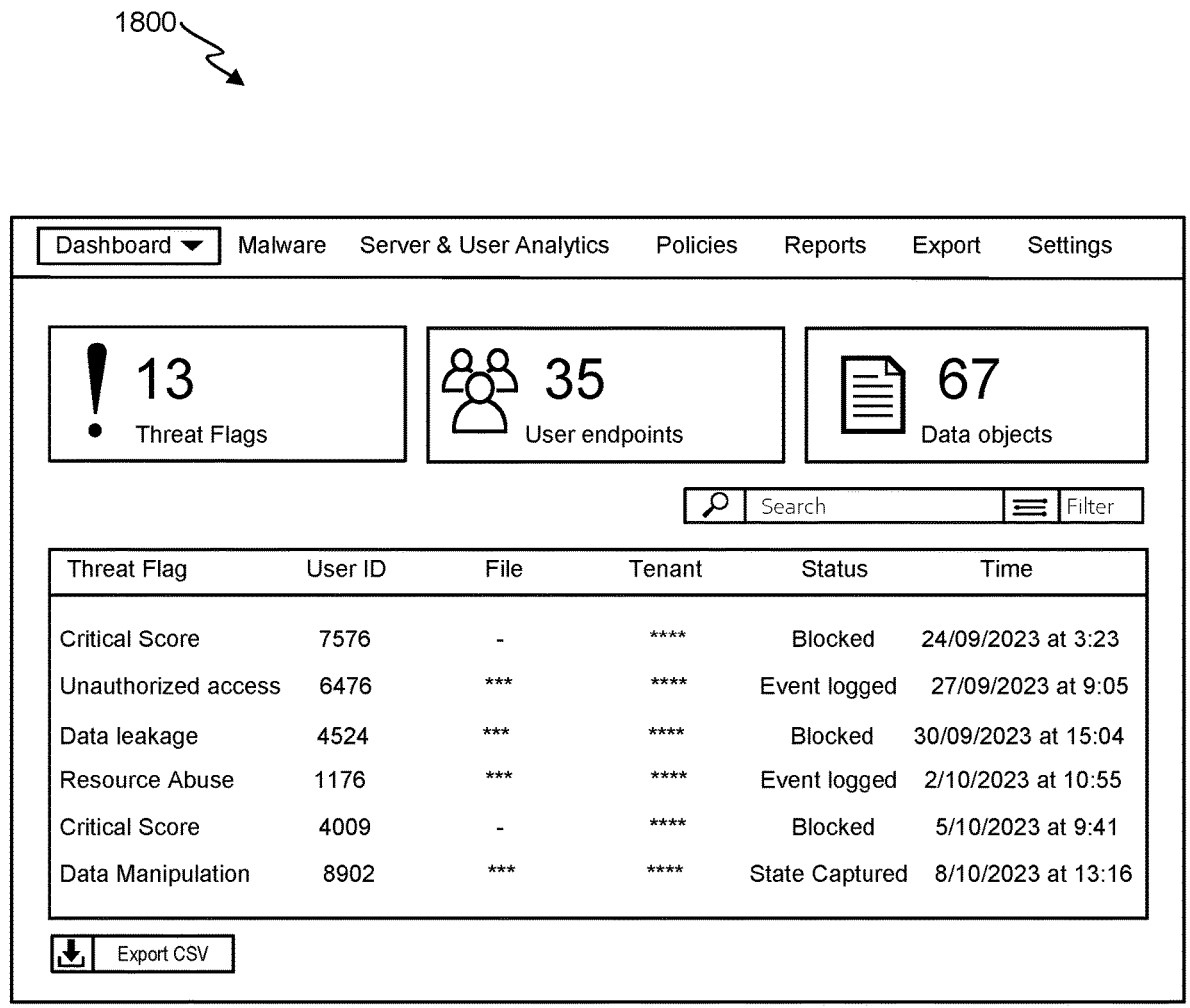
FIG. 18 shows a dashboard for a forensic interface for electronic inspection.

Referring next to FIG. 18, that shows a dashboard 1800 for the forensic interface 212 for electronic inspection. The dashboard 1800 illustrates a list of the threat flags 1406, that requires attention of the forensic investigator on the forensic interface 212 of the forensic engine 112. In the dashboard 1800, a total of 13 threat flags were raised by the forensic engine 112 that concerns 35 user endpoints 102, and total of 67 data objects altogether. The dashboard 1800 also provides a detailed list that entails information of the threat flags 1406. The detailed list provides specifications like time, what user it concerns, the relevant data object, tenant the user belongs to, and the action taken by the forensic engine 112 mentioned under the status heading.

Figure 19:
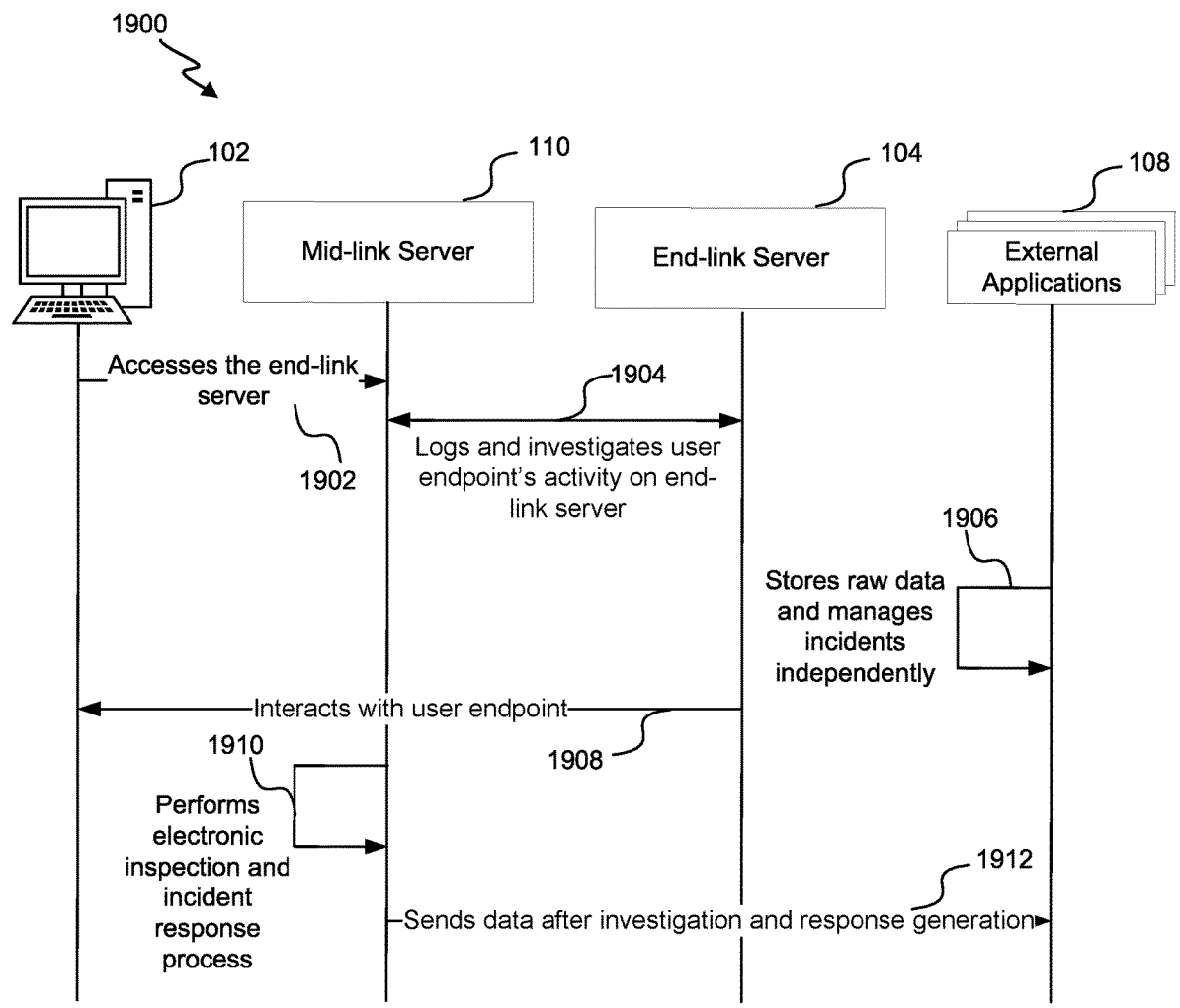
FIG. 19 shows a swim lane diagram for flow of instructions in the electronic inspection system.

Referring next to FIG. 19 that shows a swim lane diagram 1900 for flow of instructions in the electronic inspection system 100. The swim lane diagram 1900 includes the user endpoint 102, the mid-link server 110, the end-link server 104 and the external applications 108. The swim lane diagram 1900 emphasizes the configuration of the mid-link server 110 as an intermediary between the user endpoint 102 and the end-link server 104. The user endpoint 102 accesses the end-link server 104 for its activity in 1902.

Each incoming and outgoing information and data is passed through the forensic engine 112 of the mid-link server 110. The mid-link server 110 tracks any potential security threats and logs and investigates activities of the user endpoint 102 on the end-link server 104, in step 1904.

The logging and investigating provides artifacts that are used in electronic inspection and performing the IR process. The external applications 108 are configured with the mid-link server 110, store the raw or processed data and manage security incidents on their own as shown in step 1906. The end-link server 104 interacts with the user endpoint 102 like any other cloud-based application would do, with the mid-link server 110 sitting in the middle as shown at step 1908. At step 1910, the mid-link server 110 performs electronic inspection and generates an incident response. Finally in step 1912, the mid-link server 110 exports the data objects to the external applications 108.

Figure 20:
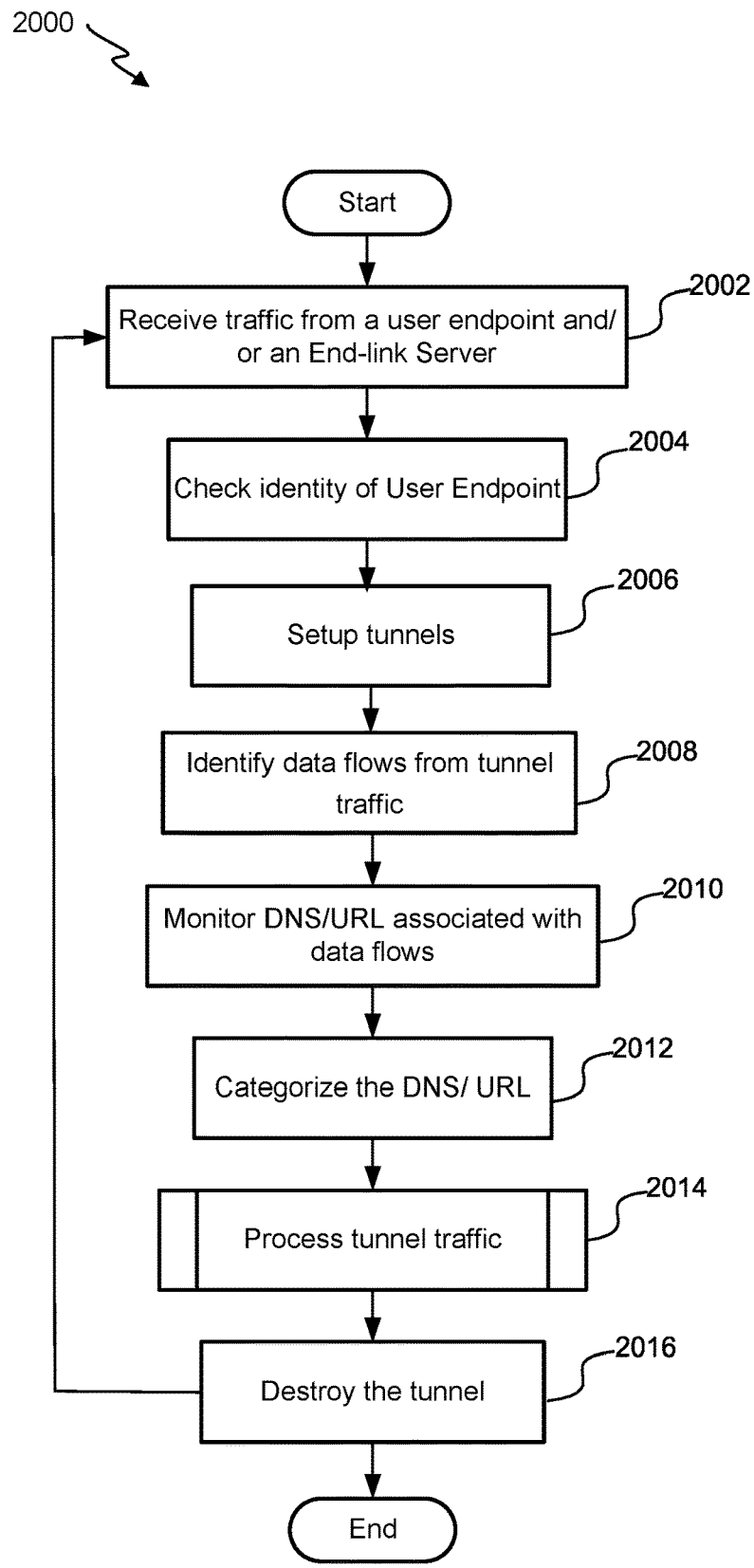
FIG. 20 shows a flowchart of steps involved in setting up tunnels for communication via the mid-link server.

Referring next to FIG. 20, a flowchart 2000 of steps involved in setting up the tunnels 106 for communication via the mid-link server 110 is shown. The process starts at block 2002, the traffic travelling across the user endpoints 102 and the end-link servers 104 is diverted towards the mid-link server 110. The communication is done through the mid-link server 110 that models and stores the data objects from the interactions. The application layer 902 of the cloud OSI model 900 places a header (encapsulation) field that contains information, such as screen size and fonts, and passes the data objects to the mid-link server 110. In this way at block 2002, the mid-link server 110 receives traffic from the user endpoint 102 and/or the end-link server 104.

At block 2004, the mid-link server 110 checks the identity of the user endpoint 102 with the user IDs stored in the policy database 326. The mid-link server 110 then determines whether the user endpoint 102 is allowed to make a connection or not. At block 2006, if the user endpoint 102 is an authorized user and is allowed to make a connection, the mid-link server 110 sets up the tunnels 106. The mid-link server 110 employs the data flow services 606 of the remote guard 302 to decide routes and construct the tunnels 106 for traffic of the user endpoint 102 or the tenant.

At block 2008, the mid-link server 110 identifies the data flows from tunnel traffic and monitors a domain name system (DNS) or uniform resource locator (URL) associated with these data flows. The DNS or the URL is the source of content of the end-link server 104 accessed by the user endpoint 102. The data objects in the application layer 902 flow in various ways including web browsing-sending hypertext transfer protocol (HTTP) request to the end-link server 104 using HTTP protocol. The data objects also flow by sending and receiving emails using simple mail transfer protocol (SMTP), pop office protocol (POP3) or Internet message access protocol (IMAP). The data objects flow using other protocols of video streaming, file transfer such as file transfer protocol (FTP), secure file transfer protocol (SFTP), voice over internet protocol (VOIP) etc.

At block 2010, the DNS or the URL associated with websites, links, sites, browsing, installing, downloading applications is monitored. The traffic of the network 202 is monitored to identify traffic patterns.

At block 2012, the DNS or the URL based on information collected from various sources, like websites, national vulnerability database (NVD) etc., are categorized to help determine the risk score 1402 of data objects of the corresponding DNS or the URL.

At block 2014, the tunnel traffic is processed by which policy controlled electronic inspection is performed on the end-link server 104 via the mid-link server 110. As a result of policy remediation, if the tunnel 106 is no longer in use or is blocked, the tunnel 106 is torn down permanently or for some specific time period at block 2016. The tearing-down of the tunnels 106 means that the tunnels 106 are destroyed or removed if there is no communication between the user endpoints 102 and the end-link server 104. If a new access request comes from the user endpoint 102, or the mid-link server 110 receives new traffic from the user endpoint 102 or the end-link server 104, then the said process is repeated at block 2002.

Figure 21:
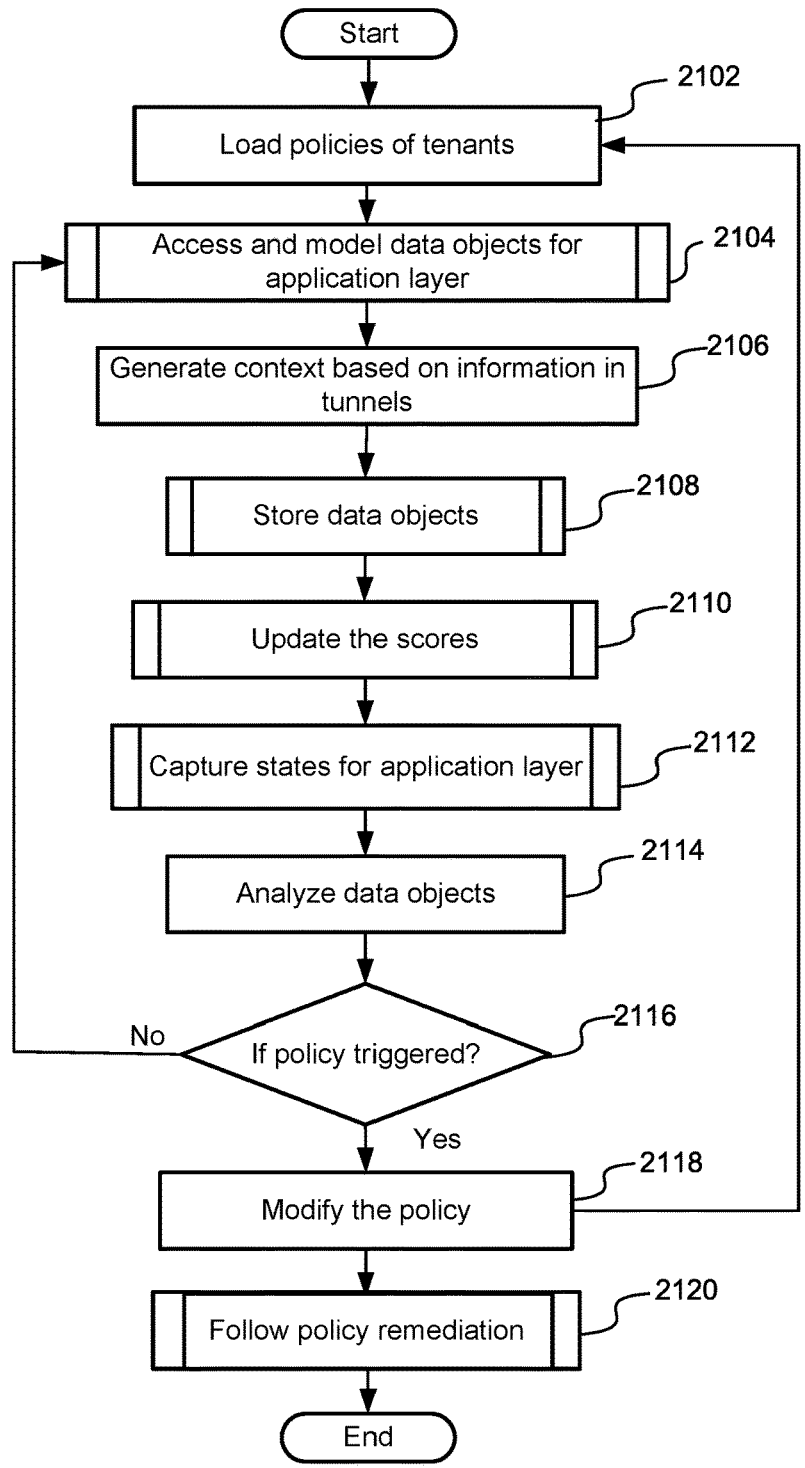
FIG. 21 shows a flowchart of processing tunnel traffic with the mid-link server.

Referring next to FIG. 21, a flowchart 2100 for processing tunnel traffic 2014 with the mid-link server 110 is shown. At block 2102, the mid-link server 110 loads the tenant policies 1404 from the policy database 326. Based on the policies, the data objects for the application layer 902 are accessed and modelled at block 2104. At block 2106, the mid-link server 110 generates context based on information in the tunnels 106. The context is used for logging and is formed by the data objects and interactions of the model of the application layer 902. Note that if a single data object has two connections in the end-link server 104 simultaneously, each connection would be handled by a separate instance of process. For example, the data objects edited by multiple tenants of the end-link server 104 at a time will be stored relative to their user information. It will be stored in the separate tenancies subjected to their own modelling, policies, and logging.

At block 2108, based on the context from the tunnels 106 and the policies from the policy database 326, the data objects are stored by the mid-link server 110 for the tenancy. Multiple types of data objects are stored in different repositories in the forensic logger 308, where frequencies of logging data objects may differ for different tenants of the end-link server 104.

At block 2110, the scores for the user endpoints 102, the end-link servers 104 and the data objects are updated. Multiple mechanisms are used for assigning scores including machine learning algorithms, probability calculation algorithms, and rule breaching scores. The scores indicate the risk imposed by activities and behavior of each user endpoint 102, the data objects, and the end-link server 104. If the risk scores 1402 triggers the policy governing risk scores, the threat flag 1406 is generated by the mid-link server 110 indicating the policy breach.

Upon generation of the threat flag 1406 at block 2112, states are captured for the application layer 902. The frequency and time period of capturing the states 1202 depends on the policies. The stored data objects, in correspondence with the respective scores and captured states, are analyzed to detect anomalous activity or threat at block 2114.

At block 2116, the threat analyzer 312 analyzes the data objects and checks if the policy is triggered. If the policy is not triggered, the mid-link server 110 accesses and models the data objects again at block 2104 and repeats the following steps repeatedly until the policy trigger is detected. On the other hand, if the policy is triggered, the policy is modified at block 2118. The newly modified policy is loaded again at block 2102 at the mid-link server 110, and the said process is run again.

At block 2118, the policies are modified only if the enterprise permits. For example, if there is some policy that users can only access a website from 3 pm to 6 pm. But the mid-link server 110 detects that this particular policy is breached repeatedly which is affecting the scores of the user endpoints 102 and the triggering policies. However, if this breach in policy is not imposing any threat to the enterprise, the mid-link server 110 modifies the policy and adjusts the timings from 1 pm to 6 pm.

At block 2120, policy remediation steps are taken after the policy modification to reduce the impact of policy breach and to alert the user or the enterprise of a potential threat or security attack.

Figure 22:
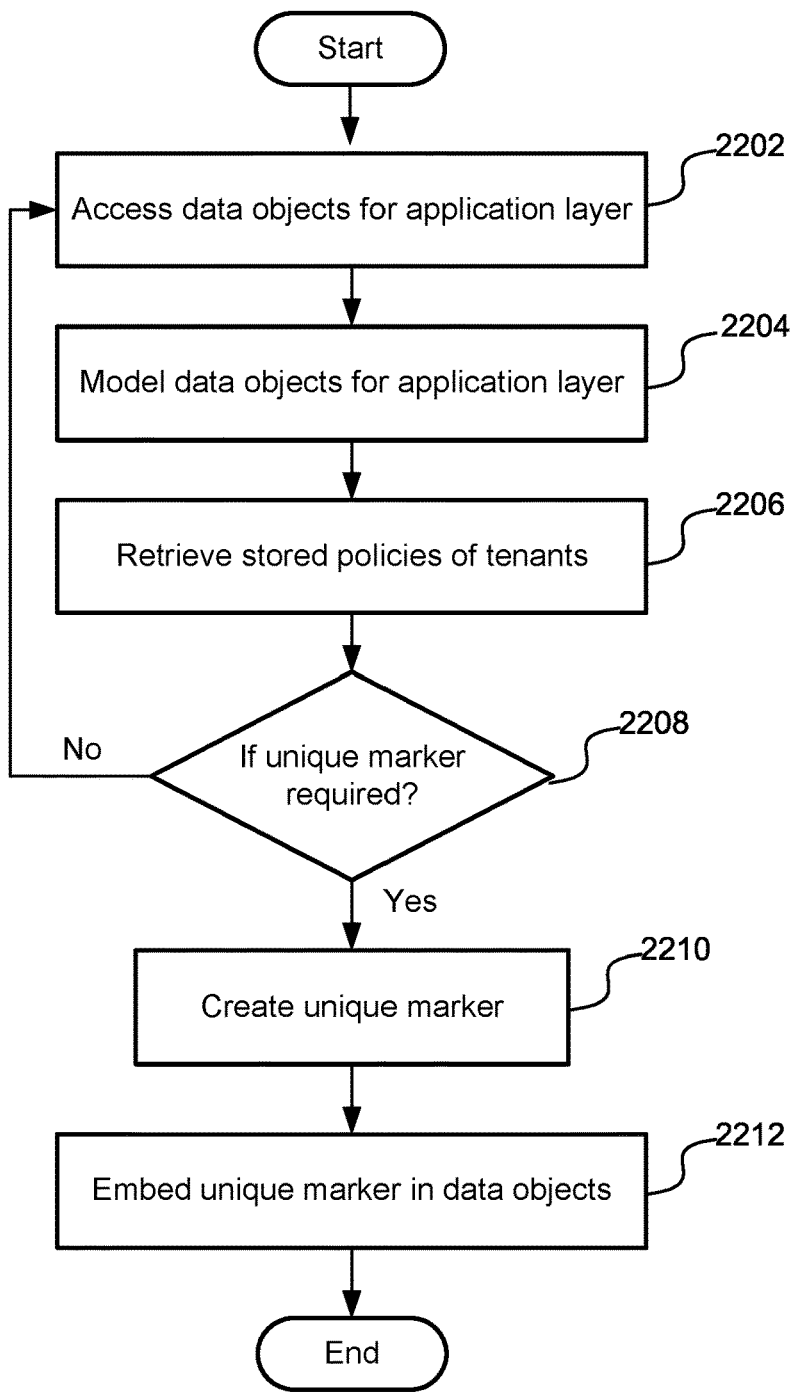
FIG. 22 shows a flowchart of accessing and modelling data objects using the model of the application layer at the mid-link server.

Referring to FIG. 22 that shows a flowchart 2104 of accessing and modeling the data objects using the model of application layer 902 at the mid-link server 110. At block 2202, the mid-link server 110 accesses data objects from the tunnels 106 for the model of the application layer 902. At block 2204, the mid-link server 110 models the data object for the application layer 902. The modelling of the model of the Application layer 902 is done using dynamic or static HTML, JavaScript (JS), or document object model (DOM) protocols. At block 2206, based on the data object and the activity of the user endpoint 102 or tenant, related Tenant policies 1404 are retrieved from the policy database 326.

At block 2208, the tenant policies 1404 dictate whether the data object is to be uniquely marked or not. For example, the policy declares the data object as confidential or sensitive, and so it is embedded by the unique marker. If the data object is not required to be uniquely marked, the mid-link server 110 keeps on accessing and modelling the next data objects.

At block 2210, if the data object is required to be uniquely marked by the policy, the WM engine 402 of the threat analyzer 312 creates the unique marker. At block 2212, the unique marker is embedded in the data object. The unique markers associated with the data object are stored in the meta database 324.

Figure 23:
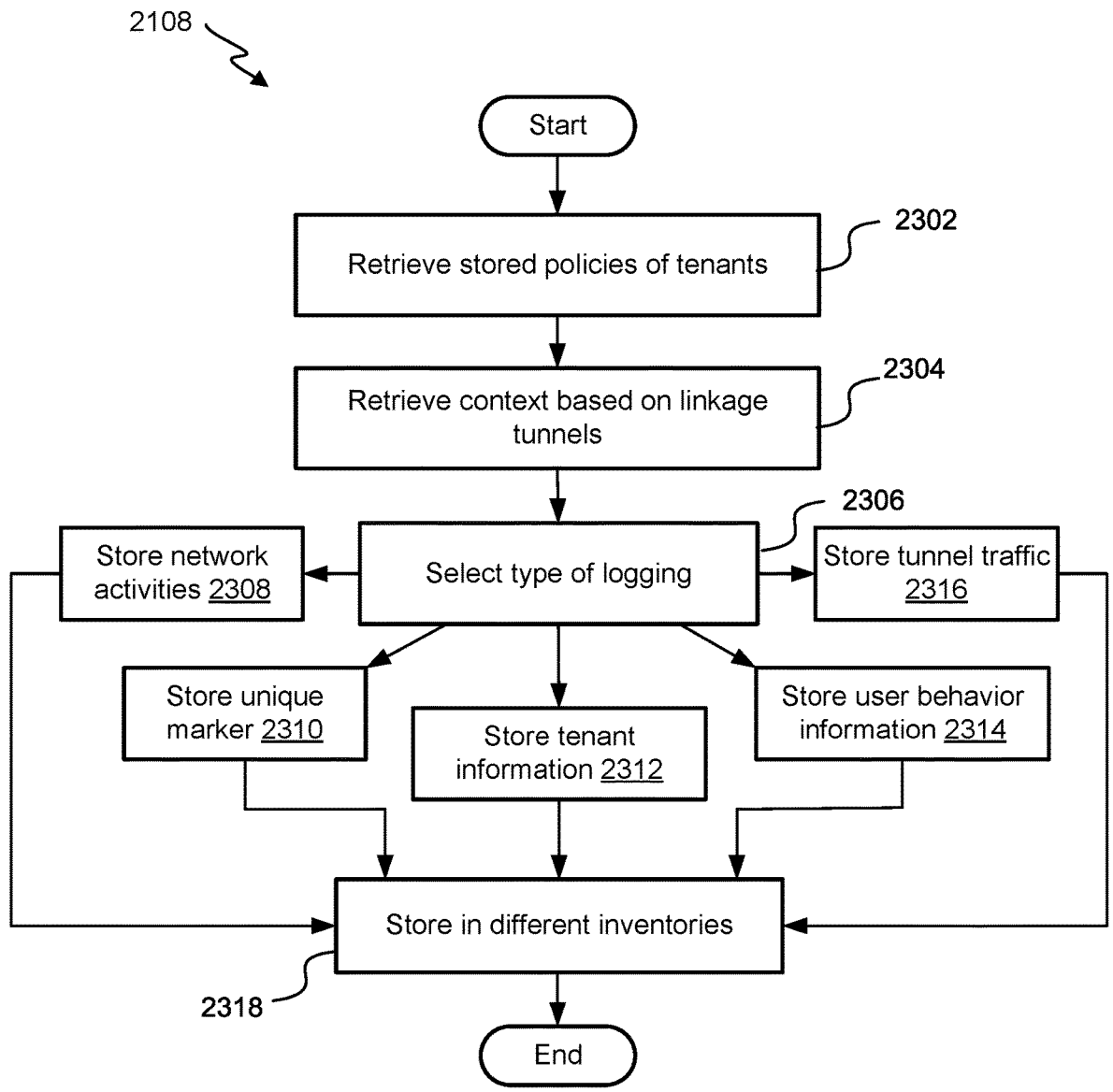
FIG. 23 shows a flowchart of storing the data objects based on policies using the mid-link server.

Referring next to FIG. 23 that shows a flowchart 2108 of storing the data objects based on policies with the mid-link server 110. The data objects at the mid-link server 110 are stored in the forensic logger 308. At block 2302, the policies stored in the policy database 326 of the forensic engine 112 are retrieved. The policies define the frequency of logging of the data objects. According to each policy dictating the interaction, the mid-link server 110 determines the type of data object to log and its frequency. The policies differ for each tenant and subsequently for each end-link server 104.

At block 2304, the context of data objects travelling through the tunnels 106 is retrieved. In case of storing the data objects, the context is helpful where a single file is being edited or saved etc. across multiple tenants of the end-link server 104.

At block 2306 based on the policies and the context retrieved in the logging process described at block 2302, the type of logging is determined. Different types of logging are performed at the forensic logger 308. The forensic logger 308 stores one or more types of the data objects at a time, as instructed by the policy. The storing includes storing the activities being performed over the network 202 at block 2308 and storing unique markers of the data objects at block 2310.

At block 2312, the tenant information associated with the end-link server 104 is stored. The tenant information is the user ID of the tenant, roles, and responsibilities of the tenant which affects the storing of tenant information in the forensic logger 308. Hence, frequency of storing data objects for a tenant may differ from frequency of logging data objects for another tenant.

At block 2314, the behavior information of the user endpoint 102 is stored in the forensic logger 308. The traffic of the tunnels 106 between the user endpoint 102 and the end-link server 104 is stored at block 2316, while the mid-link server 110 sits in-between the interactions and creates logs of data objects and other relevant information. By being associated with the forensic logger 308 at the mid-link server 110 (middle mile), the forensic logger 308 performs the logging for the end-link server 104, which is not possible for any ordinary logger. At block 2318, the data objects are stored, maintained, and updated in their relevant inventories.

Figure 24:
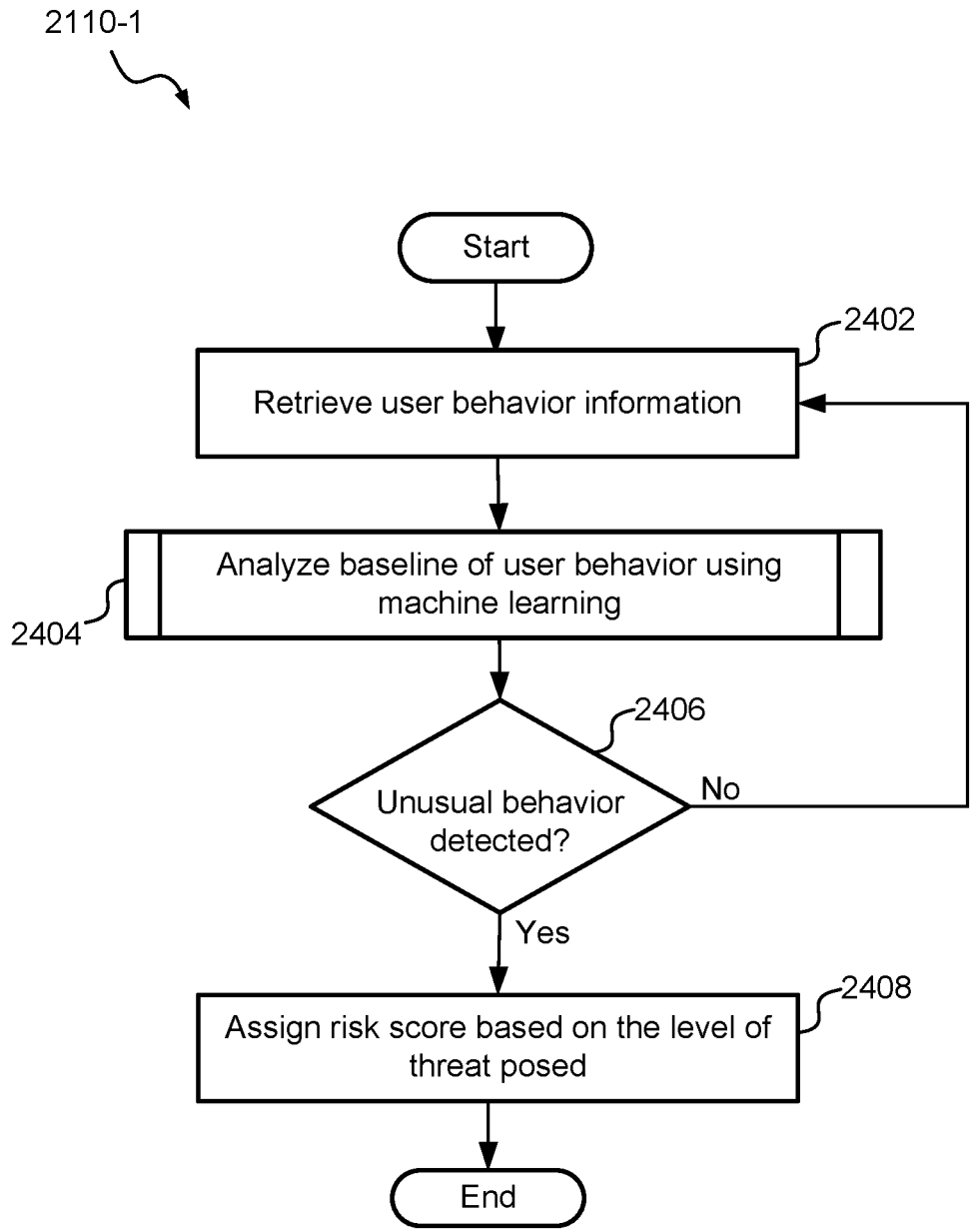
FIG. 24 shows a flowchart of scoring user behavior based on the threat posed by an unusual behavior of user endpoint.

Referring next to FIG. 24, is a scoring method 2110-1 for the user endpoint 102 based on the threat posed by an unusual behavior of the user endpoint 102. At block 2402, the UEBA 316 receives the user behavior information, for a given policy or several different policies using the score. The policy may look at multiple different scores before triggering the threat flag.

At block 2404, the UEBA 316 uses machine learning algorithms to construct the baseline for the pattern of the user endpoint 102 interactions with the end-link server 104. The machine learning algorithm is trained on historical patterns of baseline user behavior and historical logs retrieved from the meta database 324 and the forensic logger 308 respectively.

When the user endpoint 102 exhibits unusual behavior that is not in accordance with the behavior pattern that the user endpoint 102 previously displayed, the UEBA 316 categorizes it as an anomaly in block 2406. If no unusual behavior is detected the UEBA 316 moves on to next user endpoint 102. At block 2408, the indexing module 1108 assigns the risk score 1402 that reflects the level of threat posed by the new behavior of the user endpoint 102.

For instance, consider a user which has the behavior pattern of logging into the system within two login attempts typically. If this user ever deviates from this pattern and takes more than two attempts to successfully login to the system, the UEBA 316 will categorize it as an anomaly. Furthermore, depending upon the amount of deviation of the activity from the baseline behavior, the indexing module 1108 modifies the risk score 1402 for the user endpoint 102. If the user takes three attempts, for example, unlike the usual number of attempts (i.e., two attempts to login), the chances of a foreign party impersonating the authorized user are low.

Consequently, the indexing module 1108 will assign the risk score according to the threat posed. Here, the score would be calculated based on the probability of the foreign party impersonating the authorized user and the data objects the foreign party would have access to if they successfully login. If the user takes seven attempts to login unlike the usual two, the possibility of foreign party impersonating the authorized user is greater with the score being high. The risk score 1402 assigned indicates the acuteness of the threat posed. Other embodiments could score any user behaviors whose deviation would indicate a threat for a particular policy.

Figure 25:
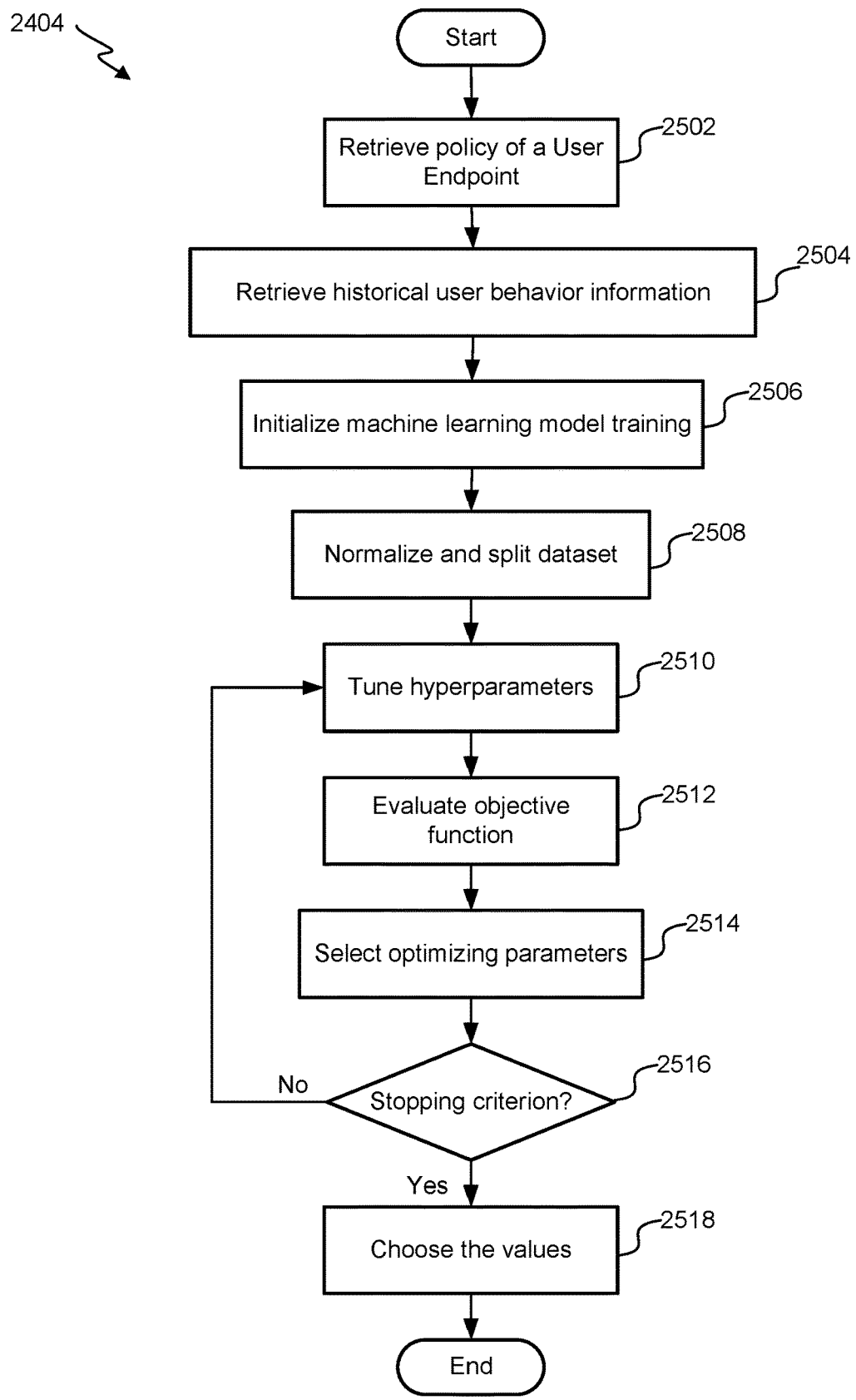
FIG. 25 shows a flowchart comprising of method of training a machine learning algorithm of FIG. 24.

Referring next to FIG. 25, a flowchart of the block 2404 for training the machine learning algorithm is shown. The flowchart 2404 shows a manner in which the machine learning is utilized by the forensic engine 112 to construct the baseline for the user endpoint 102 for the given policy. At block 2502, the UEBA 316 retrieves the policy corresponding to the user endpoint 102 from the policy database 326.

At block 2504, the UEBA 316 fetches the historical interactions and user behavior information from the meta database 324 corresponding to this particular policy.

At block 2506, the UEBA 316 then initializes the machine learning model for the training. The machine learning model can be any machine learning algorithm designed to recognize patterns like random forest algorithms, k-means clustering, neural networks etc.

At block 2508, the machine learning algorithm functions by normalizing the variables and splitting a dataset. The dataset is typically divided into two or more subsets: a training set and a validation set. The training set is used to train the machine learning model while the validation set helps in model selection and hyperparameter tuning. The machine learning models often have hyperparameters that are tuned to optimize performance.

At block 2510, the hyperparameters are tuned for optimized performance. Note that the hyperparameters are not learned from the data but are set before training. Techniques like grid search, random search, or Bayesian optimization are used to find the optimal combination of hyperparameters. The machine learning model has an objective function, which depends on the specific problem and the goals of the optimization task. The objective function typically takes one or more parameters or variables as input and produces a scalar value as output.

At block 2512, the machine learning model learns to capture patterns and relationships in the dataset while training by adjusting and optimizing its internal parameters. This is often an iterative process and various optimization algorithms are used to update model parameters.

At block 2514, the optimization process finds the parameters or configurations that minimize or maximize the value of the objective function. Various optimization algorithms are used to iteratively adjust the parameters to improve performance of the machine learning model. These algorithms can include gradient descent, stochastic gradient descent (SGD), genetic algorithms, or Bayesian optimization.

At block 2516, the machine learning model is run in loops for tuning hyperparameters, evaluating objective function, and optimizing parameters until a specified stopping criterion is achieved. The objective function is often evaluated using the training dataset, which includes input data and their corresponding ground truth or target values. At block 2518, the values are chosen at which the stopping criterion is met.

Figure 26:
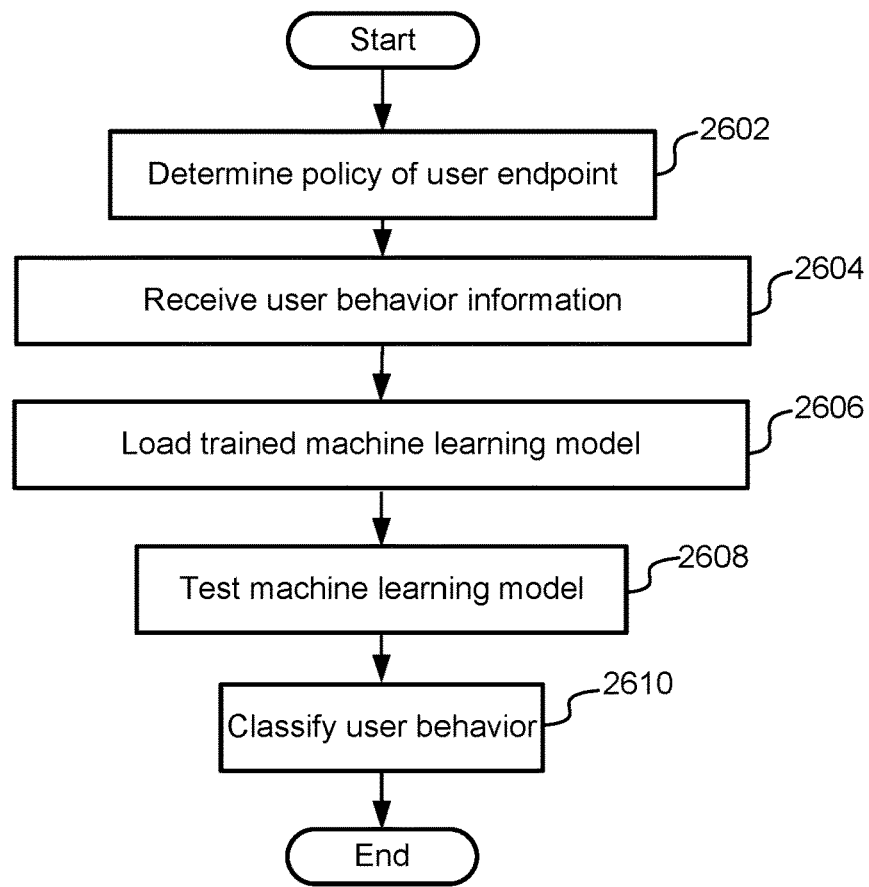
FIG. 26 shows a flowchart for classification of user behavior using the machine learning algorithm of FIG. 24.

Referring next to FIG. 26, a flowchart 2406 for classification of user behavior using the machine learning algorithm is shown. At block 2602, the mid-link server 110 determines the policy that dictates the user endpoint 102 interaction. At block 2604, the retro analyzer 318 receives the user behavior information. The UEBA 316 loads the trained machine learning model from the meta database 324, at block 2606.

At block 2608, the UEBA 316 tests the activity of the user endpoint 102 to evaluate if the activity is in accordance with the behavior pattern previously observed in the user endpoint 102. The model then classifies the activity as an unusual behavior if it does not fit with the behavior pattern of the user endpoint 102, at block 2610.

Figure 27:
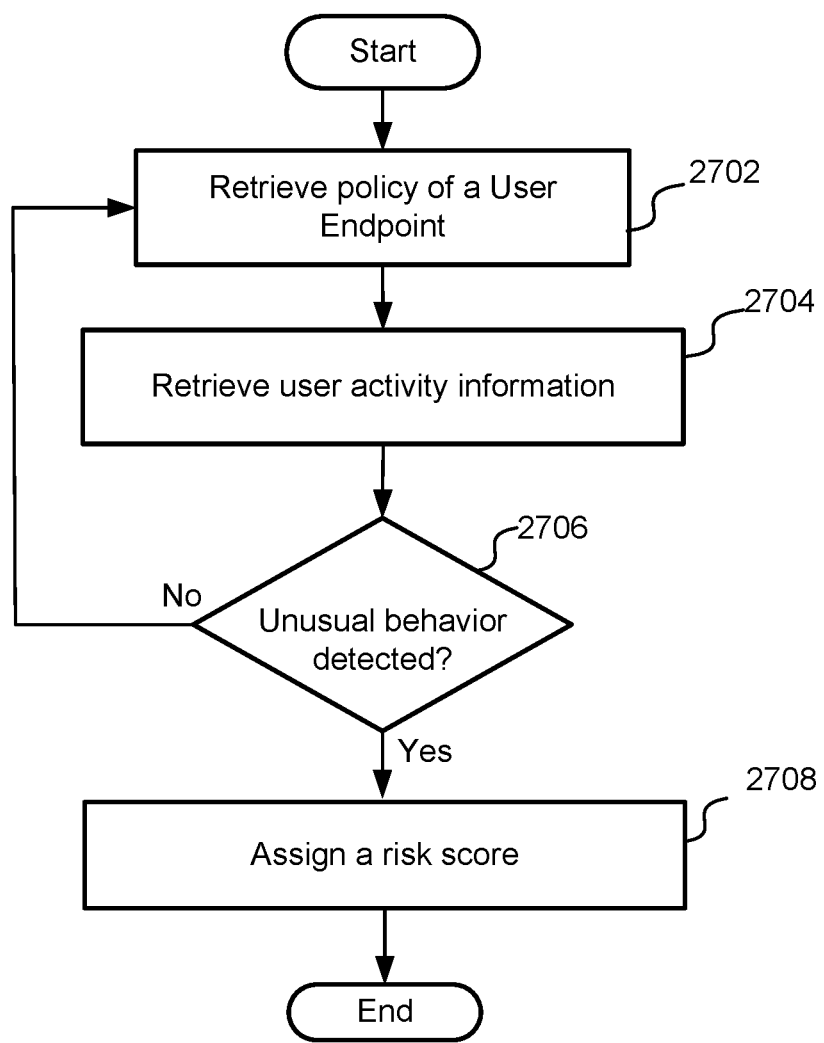
FIG. 27 shows a flowchart of scoring of the user behavior according to the rules.

Referring next to FIG. 27, a flowchart of the scoring 2110-2 of the user endpoint 102 behavior according to the rules is shown. In flowchart 2110-2 of assigning the scores, the unusual behavior is determined based on the rules defined by the policies for the user endpoint 102. The rules do not require the machine learning models because rules are followed by every user endpoint 102 to be considered the baseline behavior of the user endpoint 102. At block 2702, the retro analyzer 318 retrieves the policy defining the rule for the interaction from the policy database 326.

At block 2704, the retro analyzer 318 retrieves the user activity information from the forensic logger 308. At block 2706, the retro analyzer 318 evaluates if the user activity is unusual based on the rule the user was supposed to follow. If the activity is in accordance with the rule defined in the policy, the retro analyzer 318 moves on to the next interaction. Otherwise, the indexing module 1108 of the retro analyzer 318 assigns the risk score 1402 to the user activity at block 2708.

For instance, the enterprise has defined the rule that does not permit the users of the end-link server 104 from the research and development department to comment on any social media platforms. But the users of the marketing department are allowed to comment on the social media platforms. The mid-link server 110 differentiates the user activity depending upon the roles of each of the users of the user endpoints 102 and evaluates the activity based on the rule. If the user endpoint 102 does not belong to marketing department comments on social media, the retro analyzer 318 considers it as the anomaly. The retro analyzer 318 then assigns the risk score 1402 to the user endpoint 102, for violating the rule.

Figure 28:
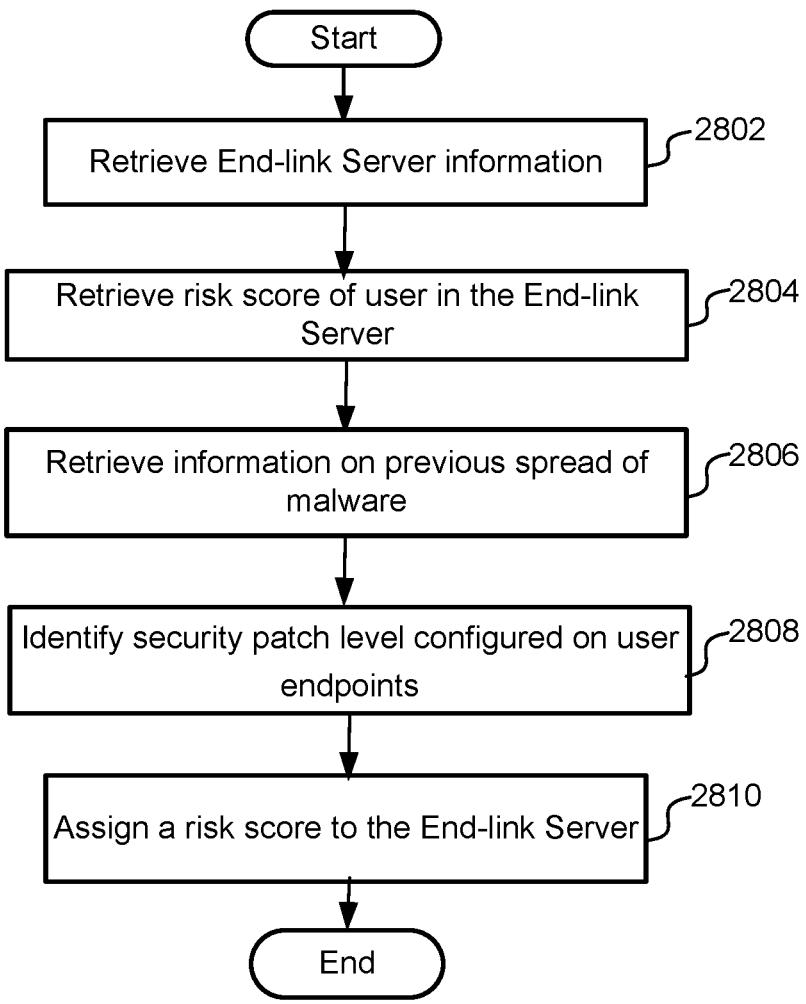
FIG. 28 shows a flowchart of an exemplary method of assigning a risk score to the end-link servers.

Referring next to FIG. 28 a flowchart of the scoring method 2110-3 of assigning the risk score 1402 to the end-link servers 104 is shown. The process of scoring 2110-3 assigns the risk score 1402 to the end-link server 104 based on different attributes. The mid-link server 110 considers multiple attributes in the calculation of the risk score 1402 of the end-link server 104. At block 2802, the retro analyzer 318 retrieves the end-link server 104 information from the meta database 324. At block 2804, the retro analyzer 318 fetches the risk scores 1402 of the user endpoints 102 belonging to the end-link server 104. An aggravated risk score of the user endpoints 102 suggests increased probability of threat to the end-link server 104 therefore, the risks scores 1402 are significant factor for the risk score of the end-link server 104.

At block 2806, the retro analyzer 318 retrieves the information of any previous malware spread, severity, and source of the malware spread. At block 2808, the security patch level configured on user endpoints 102 of the end-link server 104 is used in determining the possibility of the threat. Finally at block 2810, the indexing module 1108 assigns the risk score 1402 to the end-link server 104, depending upon the above attributes.

Figure 29:
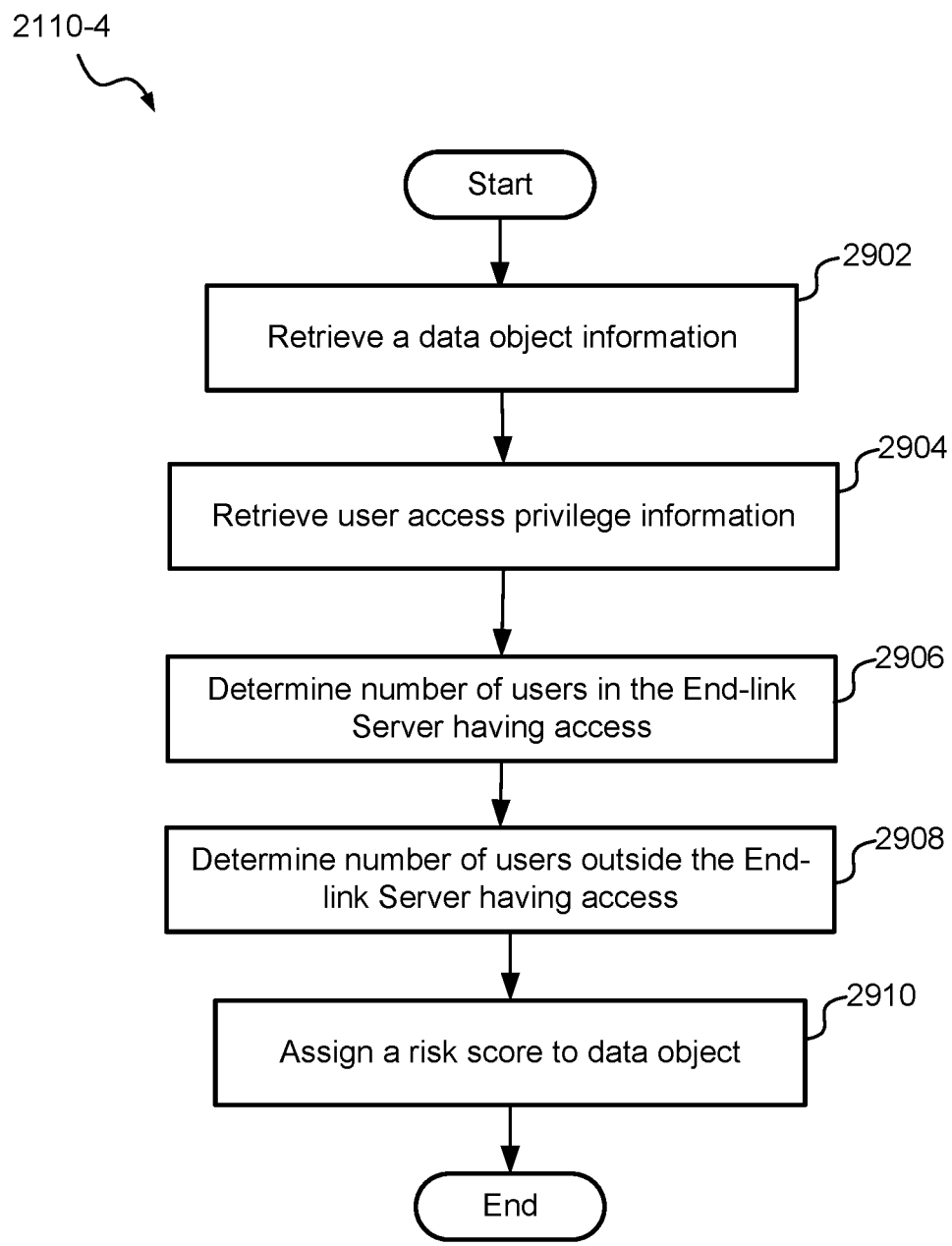
FIG. 29 shows a flowchart of assigning the risk score to the data objects within a tunnel.

Referring next to FIG. 29, a flowchart 2110-4 of assigning the risk scores 1402 to the data object within the tunnels 106 is shown. At block 2902, the retro analyzer 318 retrieves the information for the data object from the forensic logger 308. The retro analyzer 318 retrieves the user access privilege information for the data object, at block 2904. If the user has written privileges over a shared data object the risk of malware spreading is increased as compared to read-only privileges. The degree to which the file is shared internally or externally also impacts the risk score 1402.

The identities of users sharing the data objects and the user access privilege information is used to determine the number of users in the end-link server 104 having access to the data object, at block 2906.

At block 2908, the identities of users sharing the data objects and the user access privilege information are used to determine the number of users outside the organization having access to the file object. The indexing module 1108 evaluates these factors and assigns the risk score 1402 accordingly, at block 2910.

Figure 30:
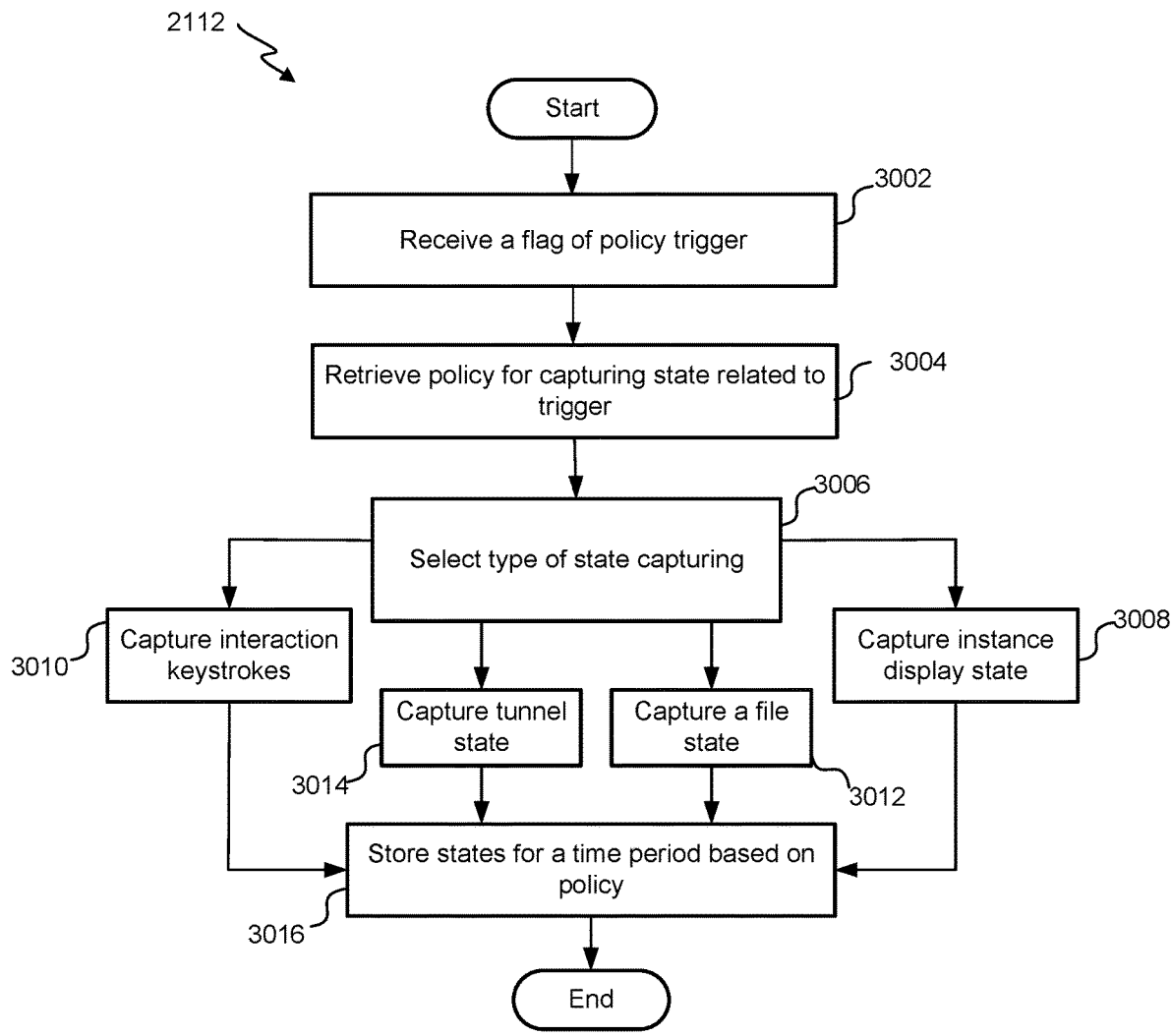
FIG. 30 shows a flowchart illustrating a method of capturing states for the model of the application layer based on policy.

Referring next to FIG. 30, a flowchart 2112 illustrating the method of capturing the states 1202 for the model of the application layer 902 based on the policy in an embodiment. Either by triggering of the policy or the risk score 1402 of the user endpoint 102, the threat flag 1406 is raised by the mid-link server 110. At block 3002, the capturing module 314 receives the threat flag 1406. At block 3004, the mid-link server 110 retrieves the policy that was triggered from the policy database 326. At block 3006, the policy dictates what type of state capturing is required. The capturing module 314 can capture one or more types of states depending on the policy that is triggered.

The capturing module 314 captures various types of states of the end-link server 104 or the user endpoint 102. For example, capturing the display states of an instance of the user endpoint 102 or the end-link server 104 at block 3008.

At block 3010 capturing the interaction keystrokes between the end-link server 104 and the user endpoint 102. The state capturing by the capturing module 314 further includes capturing states of file at block 3012 and capturing states of the tunnels 106 at block 3014.

At block 3016, the states are stored for a specific time period as defined by the policy. The frequency of storing the states 1202 is also instructed by the policy. The states 1202 captured by the capturing module 314 of the mid-link server 110 are stored in the meta database 324.

Figure 31:
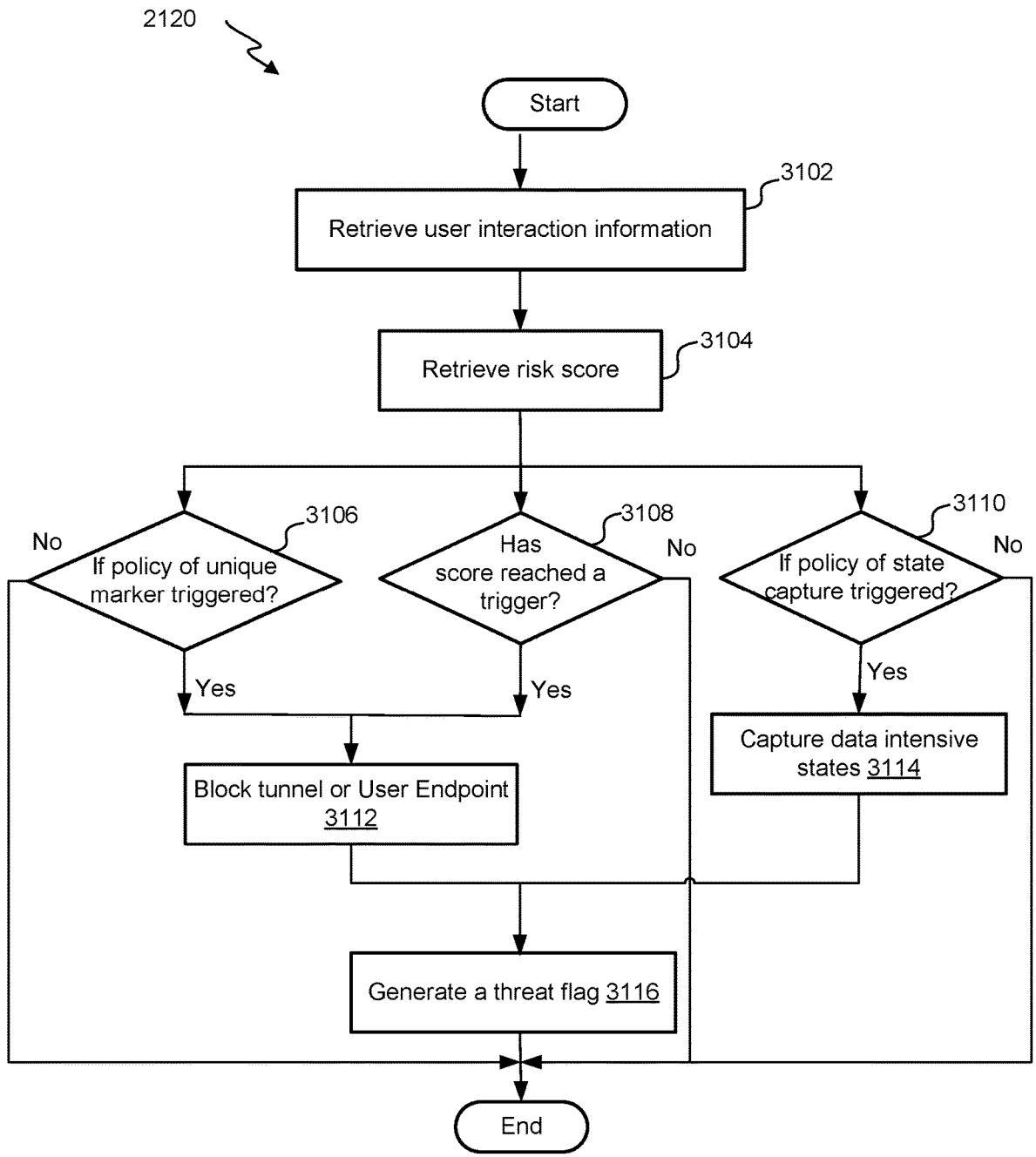
FIG. 31 shows a flowchart illustrating the remediation steps of the mid-link server as dictated by the policies.

Referring next to FIG. 31, remediation steps of block 2120 of the mid-link server 110 as dictated by the policies is shown. At block 3102, the mid-link server 110 retrieves the user interaction information. At block 3104, the risk scores 1402 corresponding to the user interaction are also fetched from the meta database 324. The mid-link server 110 analyzes the user interaction and determines if the user endpoints 102 trigger any policies.

At 3106, the policies of the unique marker are determined if the user interacted with the data object having the unique marker. If not, the remediation process is terminated. At 3108, the risk scores relevant to the user endpoint 102, and the data objects the user interacted with, and the end-link server 104 the user belongs to are considered. The risk scores are further analyzed to determine if they have reached some trigger. If not, the remediation process is terminated.

At block 3112, if the policy for the unique marker or the risk score is triggered, the mid-link server 110 blocks the access of the user endpoint 102 by tearing-down the tunnel 106 thus limiting the threat propagation.

At block 3110, the policies for the state capture are evaluated. At block 3114, the states 1202 are analyzed to determine if the user endpoint 102 or the tenant was engaged in suspicious activity and whether a data intensive state capture is required or not. If not, the remediation process is terminated. At block 3116, the forensic engine 112 generates the threat flag that is later analyzed by the forensic investigator.

Figure 32:
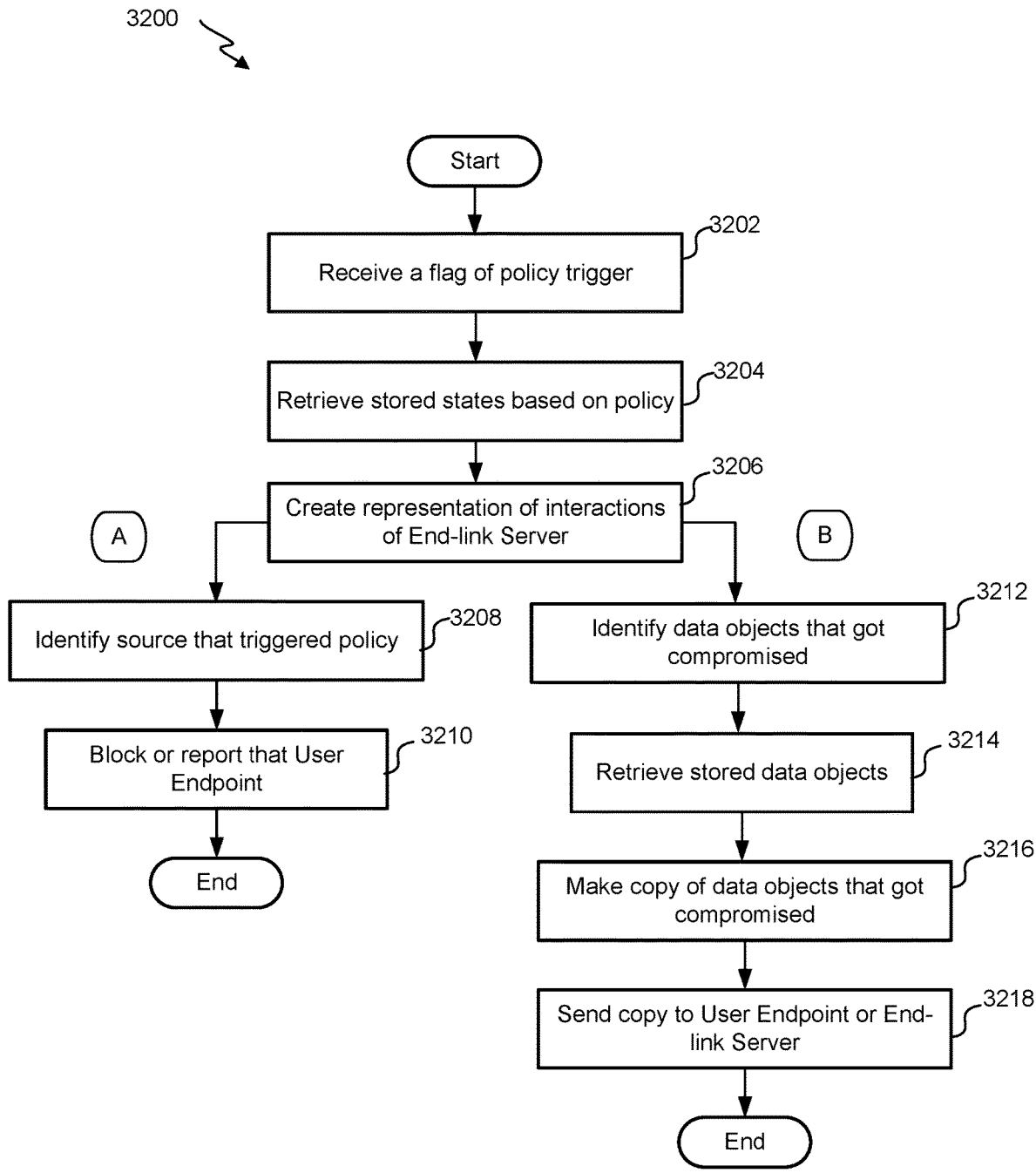
FIG. 32 shows a flowchart of method of electronic inspection through captured states.

Referring next to FIG. 32, a flowchart 3200 of a method of electronic inspection through the states 1202 is shown. At block 3202, according to one implementation of an electronic inspection through captured states, the mid-link server 110 receives the threat flag 1406. At block 3204 based on the policy that was triggered, the states 1202 relevant to the tenant or the user endpoint 102 are retrieved from the meta database 324.

At block 3206, an exemplary representation of interactions and activities on the model of the application layer 902 is created which is helpful in determining what went wrong, from where and when. For example, the ransomware enters the enterprise network 1102 and decapacitates some instances. The mid-link server 110 raises the threat flags for presence of malware. Since the mid-link server 110 has stored states of tunnel traffic, as discussed at 3014, in the meta database 324. The mid-link server 110 uses the states of tunnel traffic to create the representation of what was travelling in the tunnels 106 at a particular instant. At block 3208, the representation is used to locate the source from where ransomware entered the enterprise network 1102.

At block 3210, the enterprise determines if the tunnels 106 or the user endpoints 102 entails to be blocked and/or the user endpoints 102 are reported to the concerned authorities. In another embodiment B, at block 3212, while inspecting the end-link server 104 through stored states, the forensic investigator uses the representation created from the states to identify the data objects that got compromised or deleted. For example, the user endpoint 102 has deleted some files of the end-link server 104 permanently but now needs those files.

At block 3214, the forensic investigator retrieves the stored data objects that are to be recovered and matches the hash of deleted file, from the file states 3012, with the hash of files stored in the forensic logger 308. Finally at 3218, the forensic investigator makes copies of the deleted data objects and sends them to the user endpoint 102. In this way, the user endpoint 102 restores and recreates the files that were deleted on the end-link server 104 via the mid-link server 110. This application of the mid-link server 110 also helps the enterprises to recover and recreate its data objects that were compromised or got deleted by the activity of a rogue employee or the ransomware.

Figure 33:
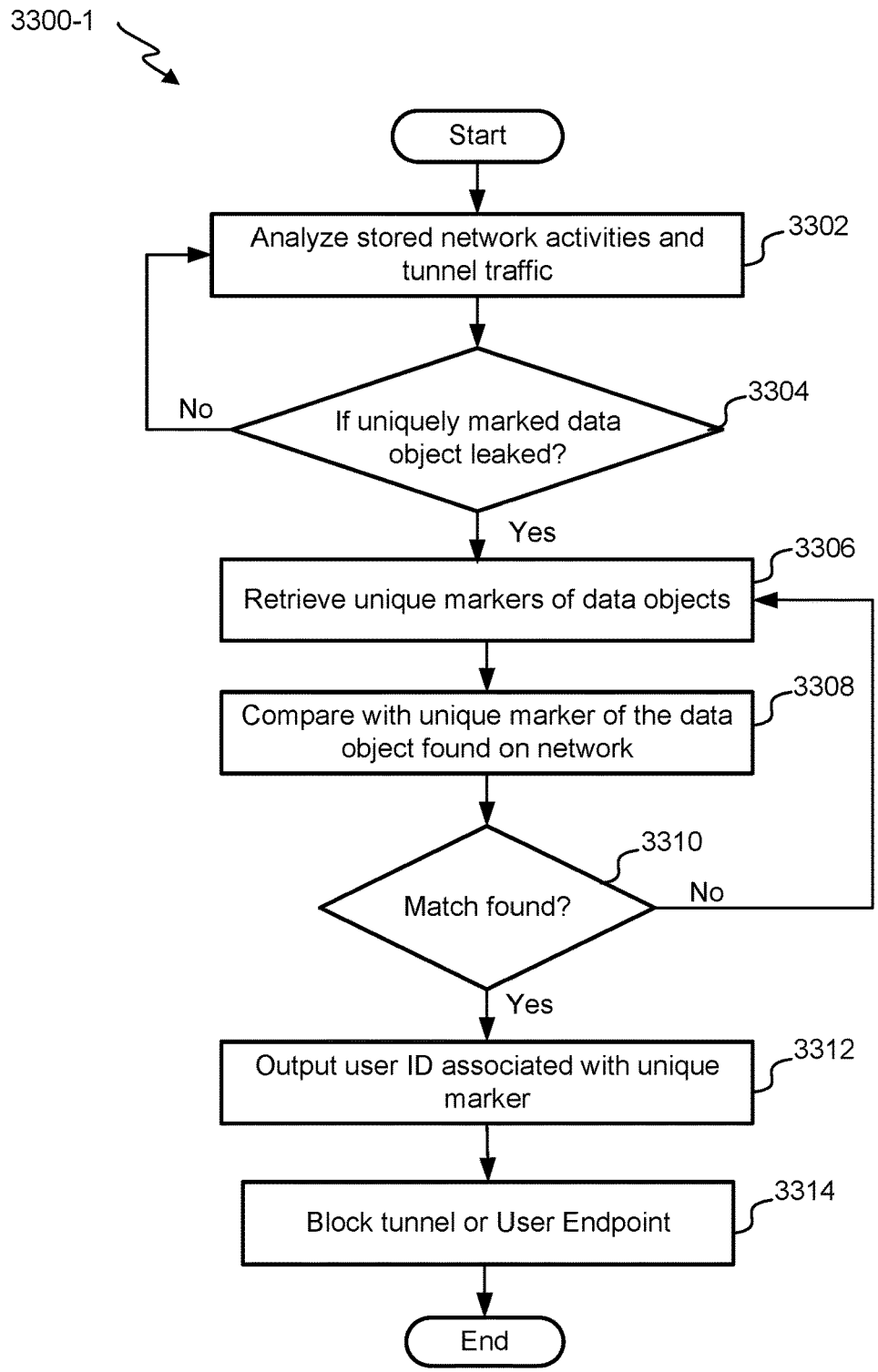
FIG. 33 shows a flowchart of method of electronic inspection through unique markers carried out by the mid-link server.

Referring next to FIG. 33, a flowchart 3300 that represents the process of electronic inspection through the unique markers carried out by the mid-link server 110 is shown. At block 3302, the mid-link server 110 searches the network traffic and the tunnels 106 for the unauthorized sharing of the uniquely marked data object. If the mid-link server 110 finds such data object, it investigates at block 3304 else, the mid-link server 110 continues with the searching.

At block 3306, the threat analyzer 312 analyzes the data object and retrieves the unique marker from the data object. The threat analyzer 312 retrieves the unique marks stored in the meta database 324. At block 3308, the correlator 408 compares the stored unique markers with the unique marker of the data object found on the network 202. If the correlator 408 finds a match based on the comparison, it implies the data object was leaked and the breach will be mitigated, at 3310. The match may be same as the unique marker found on the network data object, but match may be the unique marker with inarguably similar appearance. The mid-link server 110 retrieves the user ID of the user endpoint 102 that was the source of the uniquely marked data object that was leaked and reports it to the forensic investigator, at block 3312. The mid-link server 110 tracks the network traffic to identify the source that leaked the data object and blocks the tunnel 106 of the corrupt source, at block 3314.

Figure 34:
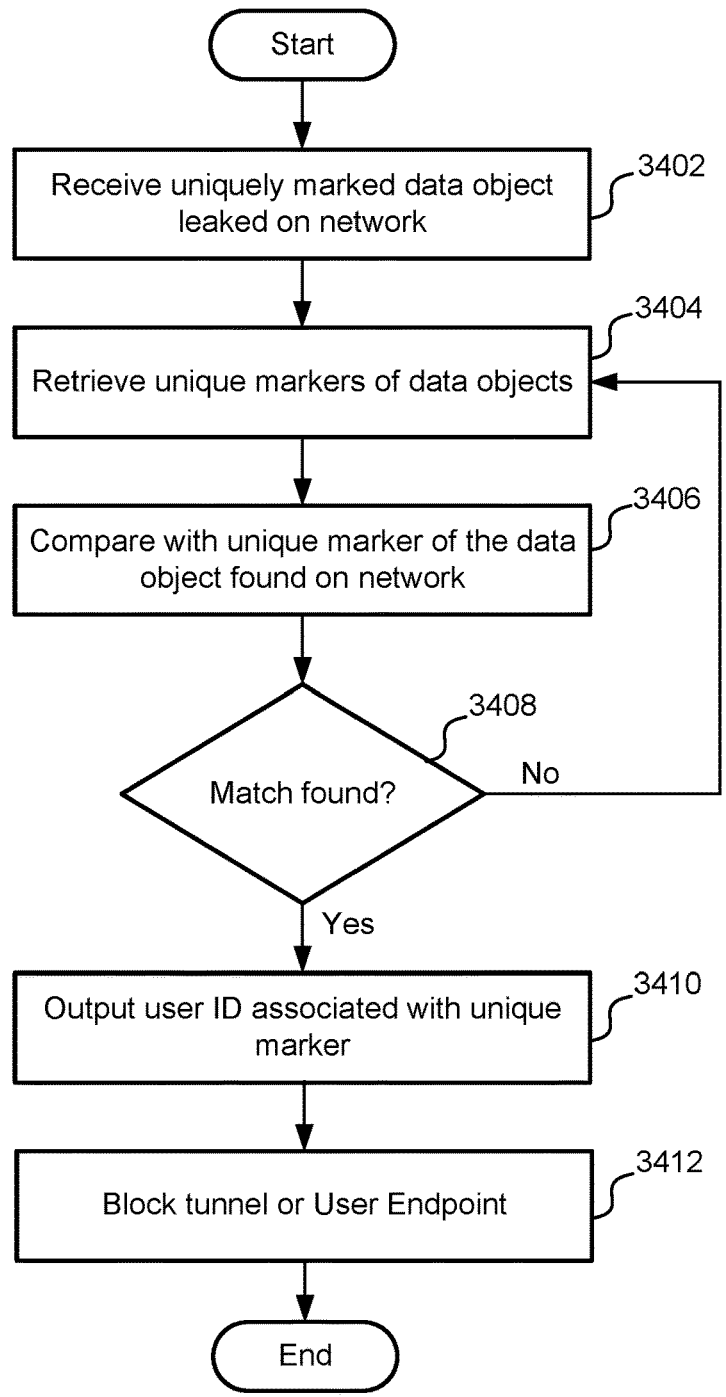
FIG. 34 shows a flowchart that comprises a method of electronic inspection through unique markers carried out by a forensic investigator.

Referring next to FIG. 34, a flowchart 3400 that represents the process of electronic inspection through the unique markers carried out by the forensic investigator is shown. At block 3402, a determination of searching for the leakage of the uniquely marked data object. The forensic investigator provides the uniquely marked data object that was found on the network 202. At block 3404, the threat analyzer 312 retrieves the unique marker from the leaked data object.

At block 3406, The unique marker is compared with the unique markers stored in the meta database 324. If a match is found it implies that the data object belongs to the end-link server 104 and was indeed leaked, at block 3408. If the match is not found the mid-link server 110 moves on to the next unique marker. The image of data object when subjected to editing tempers with the unique marker. The match found does not have to be same as the unique marker on the document, but significant similarity is enough to imply that they are the same unique markers. At block 3410, the mid-link server 110 retrieves the user ID of the user endpoint 102 that was the source of leaking the uniquely marked data object. Finally at block 3412, the mid-link server 110 tracks the network traffic to identify the source that leaked the data object and blocks the tunnel 106 for the corrupt source of the user endpoint 102.

Specific details are given in the above description to provide a thorough understanding of the embodiments. However, it is understood that the embodiments may be practiced without these specific details. For example, components may be shown in block diagrams in order not to obscure the embodiments in unrequired detail. In other instances, well-known circuits, processes, algorithms, structures, and techniques may be shown without unrequired detail in order to avoid obscuring the embodiments.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

In the embodiments described above, for the purposes of illustration, processes may have been described in a particular order. It may be appreciated that in alternate embodiments, the methods may be performed in a different order than that described. It may also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. Moreover, as disclosed herein, the term "storage medium" may represent one or more memories for storing data, including read memory (ROM), random access memory (RAM), magnetic RAM, core memory, magnetic disk storage mediums, optical storage mediums, flash memory devices and/or other machine-readable mediums for storing information. The term "machine-readable medium" includes but is not limited to portable or fixed storage devices, optical storage devices, and/or various other storage mediums capable of storing that contain or carry instruction(s) and/or data. These machine-readable instructions may be stored on one or more machine-readable mediums, such as compact disc read-only memory (CD-ROMs) or other type of optical disks, solid-state drives, tape cartridges, magnetic or optical cards, flash memory, or other types of machine-readable mediums suitable for storing electronic instructions. Alternatively, the methods may be performed by a combination of hardware and software.

Implementation of the techniques, blocks, steps and means described above may be done in various ways. For example, these techniques, blocks, steps and means may be implemented in hardware, software, or a combination thereof. For a digital hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. For analog circuits, they can be implemented with discreet components or using monolithic microwave integrated circuit (MMIC), radio frequency integrated circuit (RFIC), and/or micro electro-mechanical systems (MEMS) technologies.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the required tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to some configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, the technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate when discussing the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate when discussing the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art. While the principles of the disclosure have been described above in connection with specific apparatuses and methods, it is to be clearly understood that this description is made by way of example and not as limitation on the scope of the disclosure.

We claim:

1. A method for an electronic inspection between a plurality of end-link servers and a plurality of user endpoints of a plurality of tenants by a mid-link server, the method including:

receiving a communication at the mid-link server passing between the plurality of end-link servers and the plurality of user endpoints using a plurality of tunnels, wherein
the mid-link server is configured between the plurality of user endpoints and the plurality of end-link servers;
modeling a plurality of interactions in the plurality of tunnels using a model of an application layer hosted by the mid-link server, wherein the model of the application layer records a plurality of data objects;
differentiating a data object among the plurality of data objects with respect to information and activities of each of the plurality of user endpoints;
analyzing the model and the plurality of data objects within the plurality of tunnels based on a plurality of policies;
determining a context that is a function of the plurality of data objects and the model;
triggering of a policy of the plurality of policies based on the context; and
storing the plurality of data objects and the plurality of interactions upon the triggering of the policy of the plurality of policies.

2. The method of claim 1, wherein the triggering of the plurality of policies determines a frequency of scoring, raising of a flag, and storing the plurality of data objects by the mid-link server.

3. The method of claim 2, wherein the frequency of storing the plurality of data objects according to the context is different for:

the plurality of user endpoints of an end-link server from the plurality of user endpoints of other end-link servers depending on the plurality of policies of the end-link server; and the plurality of user endpoints of a tenant from the plurality of user endpoints of other tenants depending on the plurality of policies of the tenant.

4. The method of claim 3, wherein the frequency of storing is determined by a metric associated with the plurality of user endpoints, and the metric is a data point that indicates an unusual activity of the plurality of user endpoints.

5. The method of claim 4, wherein the metric is determined by a machine learning model that is trained for the plurality of policies to learn a baseline behavior of the plurality of user endpoints, the model is trained on a plurality of historical interactions between the plurality of user endpoints and the plurality of end-link servers, and the unusual activity is a deviation from the baseline behavior of the plurality of user endpoints.

6. The method of claim 5, wherein the triggering of the plurality of policies lead to raising the flag that enables the electronic inspection of the end-link, wherein the flag is raised for:

the plurality of user endpoints interacting with the end-link server when the metric indicates increased unusual activity; and for the plurality of user endpoints interacting with the end-link server when a rule, defined in the policy, is breached.

7. The method of claim 1, wherein the plurality of data objects stored at the mid-link server includes a states of the plurality of tunnels, the states of a plurality of files, the states of a display of an instance and the states of interactions between the plurality of user endpoints and the plurality of tenants.

8. The method of claim 1, wherein the mid-link server is further operable to:

creating a representation of interactions at the application layer from the plurality of data objects stored in the mid-link server:

recreating the data object that is compromised or deleted on an end-link server from the representation; and identifying a corrupt source from the representation.

9. The method of claim 1, wherein the mid-link server provides an access of a threat vector across the plurality of tenants facing a risk of getting compromised, wherein the threat vector represents a known threat.

10. A system for an electronic inspection between a plurality of end-link servers and a plurality of user endpoints of a plurality of tenants by a mid-link server, the system comprising:

a first tunnel between a user endpoint and the mid-link server;

a second tunnel between the end-link server and the mid-link server, the first tunnel and the second tunnel are operable to:

transmit a communication from the user endpoint and the end-link server to the mid-link server; and the mid-link server is operable to:

receive the communication at the mid-link server passing between the plurality of end-link servers and the plurality of user endpoints using a plurality of tunnels, model a plurality of interactions in the plurality of tunnels using a model of an application layer hosted by the mid-link server, wherein the model of the application layer records a plurality of data objects, differentiate a data object among the plurality of data objects with respect to information and activities of each of the plurality of user endpoints, analyze the model and the plurality of data objects within the plurality of tunnels according to a plurality of policies, determine a context that is a function of the plurality of data objects and the model, trigger of a policy from the plurality of policies based on the context, store the plurality of data objects and the plurality of interactions upon the triggering of the policy from the plurality of policies, and establish the plurality of tunnels for transmitting the communication from the mid-link server to the plurality of user endpoints and the plurality of end-link servers; and tear-down the plurality of tunnels after the electronic inspection is completed in the mid-link server.

11. The system for the electronic inspection of claim 10, wherein the triggering of the policy from the plurality of policies determines a frequency of scoring, raising of a flag, and storing the plurality of data objects in the mid-link server.

12. The system for the electronic inspection of claim 11, wherein the frequency of storing the plurality of data objects according to the context is different for:

the plurality of user endpoints of an end-link server from the plurality of user endpoints of other end-link servers depending on the plurality of policies of the end-link server; and the plurality of user endpoints of a tenant from the plurality of user endpoints of other tenants depending on the plurality of policies of the tenant.

13. The system for the electronic inspection of claim 12, wherein the frequency of storing is determined by a metric associated with the plurality of user endpoints, wherein the metric is a data point that indicates an unusual activity of the plurality of user endpoints.

14. The system for the electronic inspection of claim 13, wherein a machine learning model is trained for the plurality of policies to learn a baseline behavior of the plurality of user endpoints, the model is trained on plurality of historical interactions between the plurality of user endpoints and the plurality of end-link servers, and the unusual activity is a deviation from the baseline behavior of the plurality of user endpoints.

15. The system for the electronic inspection of claim 13, wherein the triggering of the policy from the plurality of policies lead to raising the flag that enables the electronic inspection of the end-link server, wherein the flag is raised for:

the plurality of user endpoints of interacting with the end-link server when the metric indicates increased unusual activity; and for the plurality of user endpoints interacting with the end-link server when a rule, defined in the policy, is breached.

16. The system for the electronic inspection of claim 10, wherein t the plurality of data objects stored in the mid-link server includes states of the plurality of tunnels, the states of a plurality of files, the states of a display of an instance and the states of interactions between the plurality of user endpoints and the plurality of tenants.

17. The system for the electronic inspection of claim 10, wherein the mid-link server is further operable to:
- create a representation of interactions at the application layer from the plurality of data objects stored in the mid-link server;
- recreate the data object that is compromised or deleted on an end-link server from the representation, and
- identify a corrupt source from the representation.

18. The system for the electronic inspection of claim 10, wherein the mid-link server provides visibility of a threat vector across the plurality of tenants facing a risk of getting compromised, wherein the threat vector represents a known threat.

19. A non-transitory computer-readable media having computer-executable instructions embodied thereon that when executed by one or more processors, facilitate a method for an electronic inspection system between a plurality of end-link servers and a plurality of user endpoints of a plurality of tenants by a mid-link server, the computer-readable media comprising:
- receiving a communication at the mid-link server passing between the plurality of end-link servers and the plurality of user endpoints using a plurality of tunnels, wherein the mid-link server is positioned between an interaction of the plurality of user endpoints and the plurality of end-link servers;
- modeling a plurality of interactions in the plurality of tunnels using a model of an application layer hosted by the mid-link server, wherein the model of the application layer records a plurality of data objects;
- differentiating a data object among the plurality of data objects with respect to information and activities of each of the plurality of user endpoints;
- analyzing the model and the plurality of data objects within the plurality of tunnels according to a plurality of policies;
- determining a context that is a function of the plurality of data objects and the model;
- triggering of a policy of the plurality of policies based on the context; and
- storing the plurality of data objects and the plurality of interactions upon the triggering of the policy of the plurality of policies.

20. The non-transitory computer-readable media of claim 19, wherein the mid-link server provides visibility of a threat vector across the plurality of tenants facing a risk of getting compromised, wherein the threat vector represents a known threat.

* * * * *